United States Patent [19]

Newman et al.

[11] Patent Number: 4,862,355

[45] Date of Patent: Aug. 29, 1989

[54] SYSTEM PERMITTING PERIPHERAL INTERCHANGEABILITY DURING SYSTEM OPERATION

[75] Inventors: Bruce E. Newman, North Plainfield, N.J.; Steven D. DiPirro, Holliston, Mass.

[73] Assignee: Digital Equipment Corporation, Maynard, Mass.

[21] Appl. No.: 85,105

[22] Filed: Aug. 13, 1987

[51] Int. Cl.[4] .......................... G06F 3/04; G06F 13/22

[52] U.S. Cl. ...................................................... 364/200

[58] Field of Search ... 364/200 MS File, 900 MS File

[56] References Cited

U.S. PATENT DOCUMENTS

| | | | |
|---|---|---|---|
| 4,025,906 | 4/1977 | Riikonen | 364/200 |
| 4,086,627 | 4/1978 | Bennett et al. | 364/200 |
| 4,485,437 | 11/1984 | Kinghorn | 364/200 |
| 4,562,535 | 12/1985 | Vincent et al. | 364/200 |
| 4,750,136 | 6/1988 | Arpin et al. | 364/200 |
| 4,760,553 | 7/1988 | Buckley et al. | 364/900 |

FOREIGN PATENT DOCUMENTS

| | | | |
|---|---|---|---|
| 83109090.7 | 4/1984 | European Pat. Off. | 364/200 |

*Primary Examiner*—Jerry Smith
*Assistant Examiner*—James J. Kulbaski
*Attorney, Agent, or Firm*—Kenyon & Kenyon

[57] ABSTRACT

In a system including a processor and at least one connector for providing inputs to the processor, which one of a plurality of different types of peripherals is plugged into the connector is determined by sensing any change in the connection of a peripheral to said connector, upon initial start-up of the system and each time a change from not plugged in to plugged in is detected interrogating the peripheral to obtain its type and storing the type of peripheral which is plugged in.

6 Claims, 16 Drawing Sheets

FIG. 5

| CHANNEL NUMBER | DEFAULT BAUD RATE |
|---|---|
| 0 | 4800 |
| 1 | 4800 |
| 2 | 4800 |
| 3 | 9600 |
| 4 | 9600 |
| 5 | 9600 |
| 6 | 1200 |
| 7 | 19200 |

FIG. 6

| BAUD RATE | TIMER VALUE (IN HEX) |
|---|---|
| 50 | FF |
| 75 | FF |
| 110 | D6 |
| 134.5 | AA |
| 150 | 80 |
| 300 | 40 |
| 600 | 20 |
| 1200 | 10 |
| 1800 | 0C |
| 2000 | 0A |
| 2400 | 08 |
| 3600 | 06 |
| 4800 | 04 |
| 7200 | 02 |
| 9600 | 02 |
| 19200 | 02 |

SYSTEM PERMITTING PERIPHERAL INTERCHANGEABILITY DURING SYSTEM OPERATION

RELATED APPLICATIONS

This application is related to the following applications filed on even date herewith, the disclosure of which is hereby incorporated by reference. These applications contain, at least in part, common disclosure regarding an embodiment of a peripheral repeater box. Each, however, contains claims to a different invention.

Peripheral Repeater Box (Ser. No. 085,097)
D.C. Power Monitor (U.S. Pat. No. 4,797,608)
Tri-State Function Indicator (Ser. No. 084,845)
Method of Changing Baud Rates (Ser. No. 085,084)
Communications Protocal (Ser. No. 085,096)
Method of Packetizing Data (Ser. No. 085,098).

BACKGROUND OF THE INVENTION

This invention relates to computer systems in general and more particularly, to a system which permits interchanging peripherals connected to a peripheral repeater box to which a plurality of peripherals can be connected.

In large computer systems, and particularly in systems which provide graphics displays, a plurality of different types of peripheral devices for providing input to the computer system are provided. For example, a single system may have as inputs a keyboard, a mouse, a tablet, a light pen, dial boxes, switch boxes and so forth. In a system with a plurality of such peripherals it is advantageous to have a device which can collect inputs from each of these peripherals and then retransmit the various inputs over a single line to the computer system. Such a device is referred to herein as a peripheral repeater box in that it acts as a repeater for each of the individual peripherals.

Very often, different peripherals have the same type of plug. In typical systems of the prior art there is a requirement that each peripheral be plugged into a specific connection. If by mistake two different peripherals which have the same type of plug are mixed up, the inputs no longer react properly. There is thus, a need for in a peripheral repeater box the ability to plug different type of peripherals into the same connector and still be able to recognize which peripheral is connected.

Various peripherals are capable of operating at different baud rates. It is sometimes necessary to change baud rates. In systems using a peripheral repeater box, resetting of baud rates must be done both in the peripheral and the peripheral repeater box. In particular, there is a need to provide a system in which baud rates can be reset when peripherals are changed.

SUMMARY OF THE INVENTION

The system of the present invention permits interchanging peripherals.

The Peripheral Repeater box (PR Box) of the present invention is, first of all, used to allow the peripherals to be powered at the Monitor site. The PR box collects the various peripheral signals using, a conventional RS-232-C or RS-423 connection, from seven peripheral channels, which are then, packetized and sent to a host, e.g. a computer and/or graphics control processor, using RS-232-C signals. Transmissions to the peripherals are handled in a like manner from the host, i.e., receiving packets from the host, unpacking the data and channeling data to an appropriate peripheral serial line unit (SLU).

The peripheral repeater box of the present invention is particularly suited for use in a graphics system of the type disclosed in copending application Ser. Nos. 084,930 and 085,081, entitled Console Emulation For A Graphics Workstation and High Performance Graphics Workstation, filed on even date herewith, the disclosure of which is hereby incorporated by reference.

The communications between the PR Box and host are carried out with a novel protocol, which provides for reliable error free transmission.

The PR Box uses a system with circular queues and buffers to buffer incoming and outgoing messages to and from the peripherals. Messages are arranged in packets for transmission. The completion of a message from a peripheral is detected by counting bytes. Alternatively if the time between received bytes exceeds a predetermined amount, this is used to sense the end of a message. To keep communications active between the PR Box and the system, a "Keep alive" timer is used. This causes a "keep alive" message to be sent if there has been no other communication within a predetermined amount of time.

Peripherals which are supported by the disclosed embodiment of the PR box include:

- a keyboard;
- a mouse;
- a tablet; and
- a dial box.

In addition, in the illustrated embodiment, three other channels are provided for future expansion to provide for a button box channel, a spare keyboard channel and a general spare RS-232-C channel.

The PR box of the present invention permits interchangeability of the different peripherals. In other words, peripherals with the same type plug can be plugged into any of the peripherals ports and it is not necessary to ensure that a particular peripheral is plugged into a particular port. On power-up and each time a peripheral is plugged in or removed, the host checks the peripherals to determine what type of device it is and keeps track of that information.

A further feature of the present invention is the ability to change baud rates when peripherals are changed. In accordance with the present invention, a command from the host to change baud rates automatically resets the baud rate of the receiver in the peripheral box for the particular channel and another command sets the baud rate of the peripheral itself. First, a message is sent through the PR box to the peripheral. Then a command is sent to the PR box to change the baud rate of a UART (Universal Asynchromous Receiver/Transmitter) associated with that peripheral.

BRIEF DESCRIPTION OF THE DRAWINGS

FIG. 5 is a table tabulating the default baud rates for the different peripherals used in the preferred embodiment of the present invention.

FIG. 6 is a table showing the character times associated with each baud rate for use in interpacket timing according to the present invention.

DETAILED DESCRIPTION

System Overview

Figure 1:
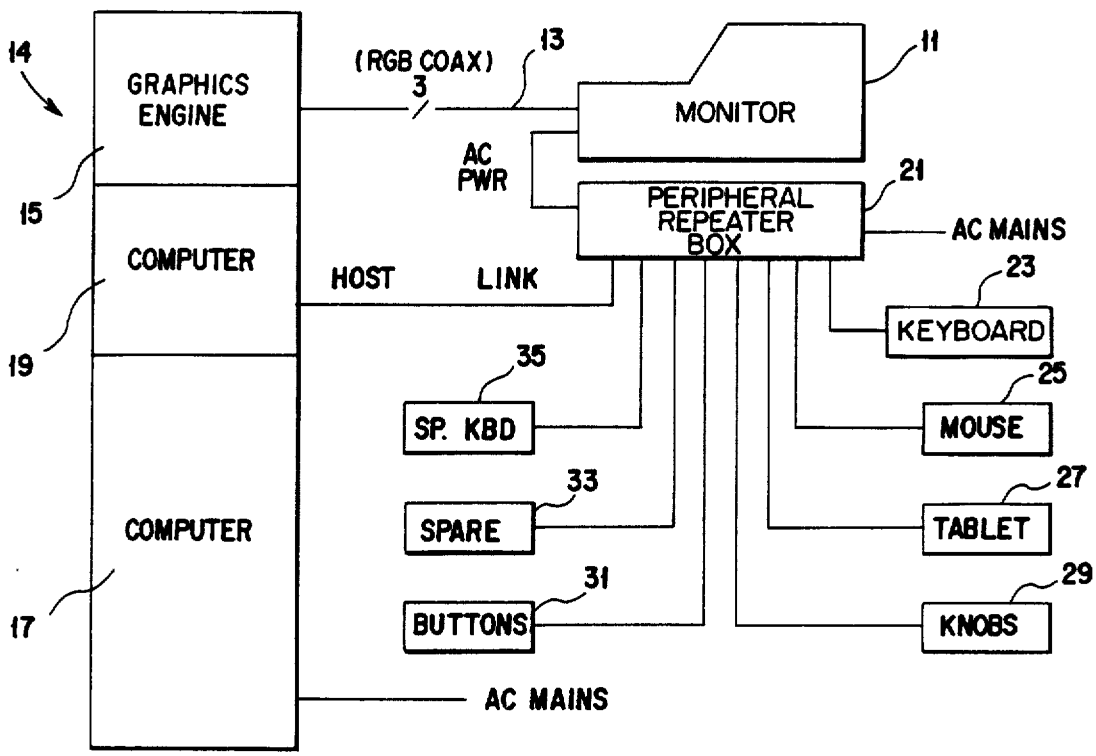
FIG. 1 is a block diagram of a computer system in which the PR box of the present invention may be used.

FIG. 1 is a block diagram of a computer system showing where the peripheral repeater box of the present invention fits into the system. The illustrated system is a graphics system. However, the present invention is applicable to other computer systems. Thus, there is illustrated a monitor 11 which receives video input from a RGB coax 13 which is coupled to computing apparatus 14 which does the graphic computations. Included in apparatus 14, as illustrated, is a graphics engine or graphics processor 15, a main computer 17, e.g. a Vax 8250 system, and a computer 19 acting as a control processor, which may be a Microvax computer. Computer 17 is host to computer 19 and computer 19 is host to the PR box 21 described below. Thus, hereinafter, where reference is made to a host, the reference is to computer 19. The operation of this part of the system is more fully described in Applications Ser. Nos. 084,930 and 085,081, entitled Console Emulation For A Graphics Workstation and High Performance Graphics Workstation, filed on even date herewith. The peripheral repeater box 21 is illustrated in FIG. 1 along with the various peripherals which may be plugged into it. These include a keyboard 23, a mouse 25, a tablet 27, knobs 29, i.e. a dial box, buttons 31, a spare RS232 channel 33 and a spare keyboard input 35.

The peripheral repeater box is a self-contained microprocessor system which, in the illustrated embodiment, is located underneath the monitor. It is responsible for handling information flowing between the host and peripheral devices. This is a free running sub-system that performs a self-check of its own internal status at power up. After completing this task it initializes itself and continuously scans for activity from the host or peripherals.

Four peripheral channels (for keyboard 23, mouse 25, tablet 27 and knobs 29) and one command channel (for communications with the host) are provided to connect all the supported peripherals. In addition three spare channels for future expansion or special peripherals, e.g. the spare keyboard 35, button box 31, and spare 33 of FIG. 1 have been provided.

Figure 2:
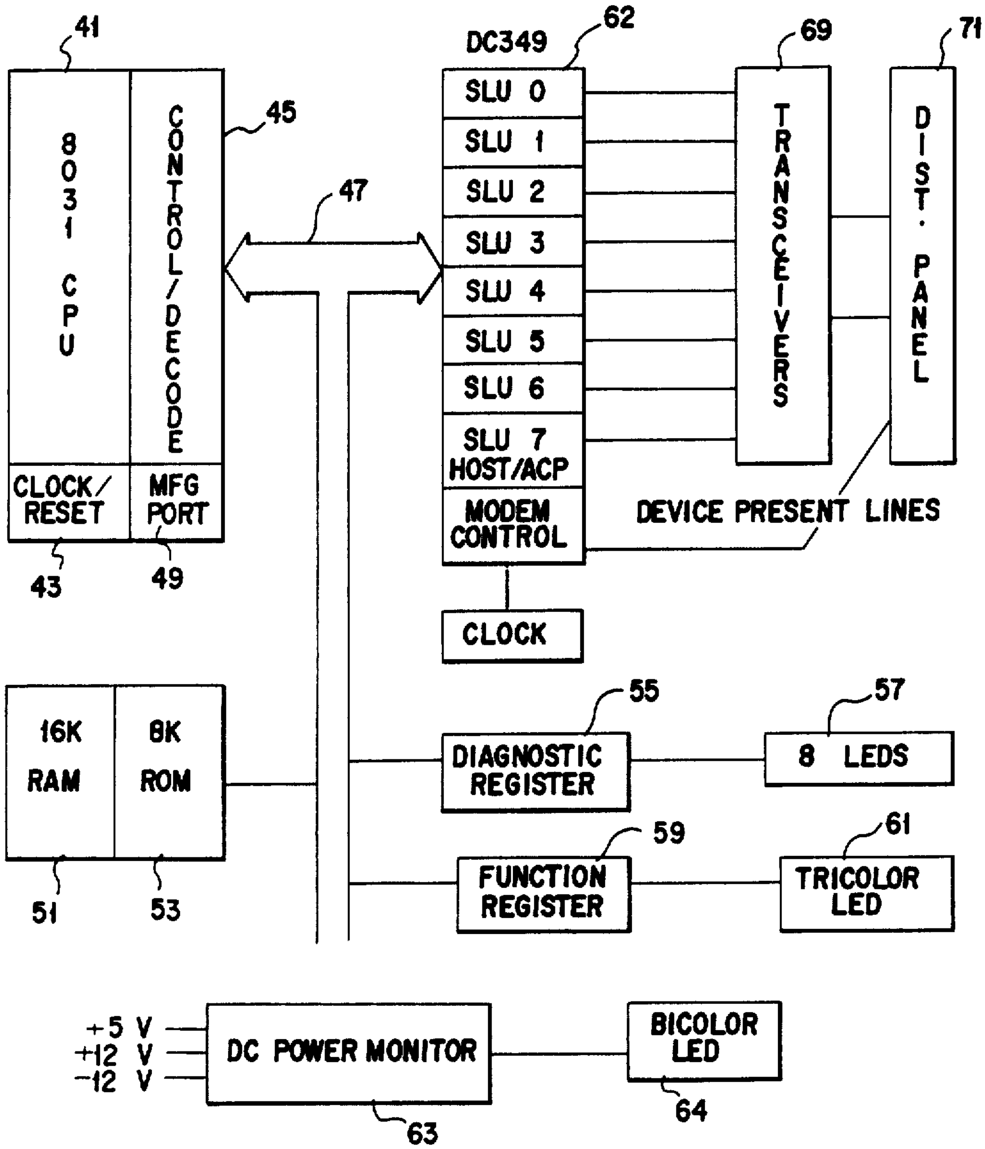
FIG. 2 is a basic block diagram of the PR box of the present invention.

The sub-system is composed of a minimal system as shown in FIG. 2. Thus, there is illustrated an 8031 microprocessor CPU 41 which, in conventional fashion has a associated with it a clock/reset unit 43 with a 12 mHz crystal oscillator. Coupled to the 8031 CPU is a conventional control decode block 45 which couples the CPU to a bus 47. Bus 47 couples the CPU to memory 49 which includes 16K of RAM 51 and 8K of ROM 53. The 8031 has no chip ROM and insufficient on chip RAM. For this reason, the 8031 is used in an expanded bus configuration utilizing three of the four available general purpose ports for address, data and control.

These are coupled through block 45 to bus 47. Enabling the external addressing capability for the expanded bus configuration is accomplished by grounding (through a jumper) the EA, external access, pin.

The low order address and data are multiplexed on the 8031, the address is latched during address time with a 74LS373 Octal latch strobed via the ALE (address latch enable) signal output from the 8031.

Bus 47 is also connected to a diagnostic register 55. Diagnostic register provides an output to a display 57 comprising 8 LEDs. Also coupled to bus 47 is a function register 59 which provides its output to a tricolor LED 61 to be described in more detail below. Also shown in FIG. 2 is the DC power monitor 63 which provides its output to a bicolor LED 64 to indicate under or over voltage conditions as explained in detail below.

Bus 47 also connects to Serial Line Units (SLU) 0-7 along with a modem control contained in block 62. Block 62 is what is known as an octal asynchronous receiver/transmitter or OCTALART. Such a device is manufactured by Digital Equipment Corporation of Maynard, Mass. as a DC 349. Basically, the OCTALART comprises eight identical communication channels (eight UARTS, in effect) and two registers which provide summary information on the collective modem control signals and the interrupting channel definition for interrupts. Serial line units 0-6 are coupled to the seven peripherals indicated in FIG. 1. SLU 7 is the host link shown in FIG. 1. The outputs of the SLUs are coupled through transceivers 69, the outputs of which in turn are connected to a distribution panel 71 into which the various connectors are plugged. Block 69 includes EIA Line drivers, 9636 type, operating off a bipolar supply of +/−12 volts which translate the signals from TTL levels to a bipolar RS-232-C compatible signal level of approximately +/−10 volts.

The host channel (SLU 7), keyboard channel and spare channel do not have device detection capability. The other five channels have an input line that is connected to the DCD (Data Carrier Detect) pin of the corresponding SLU of the OCTALART 62. When the pin is at the channel connector side is grounded the input side of the OCTALART is high indicating that a device is present on that channel.

A data set change summary register in block 62 will cause an interrupt if the status of one of these pins changes, i.e. high to low, or low to high level change. This indicates a device being added or removed after the system has entered operating mode. On power up the 8031 reads this register to determine which devices that have this capability are connected and enter this information into a configuration byte (a storage area in software) and is sent to the host as part of the self test report. This capability permits knowing which peripherals are connected to which ports and thus allows interchangeability of peripherals. The PR box, each time a peripheral is plugged in or unplugged, sends a message to the host allowing it to interrogate a peripheral and update a table which it maintains.

In the free running operational mode the PR box accepts data packets from the host through SLU 7 and verifies the integrity of that data. If the data is good then the PR box sends an ACK to the host, strips out the data or command from the packet and channels it to the designated peripheral through its associated SLU. If the data is bad, i.e. checksum error, the PR box sends a NAK to the host to request a re-transmission and throws away the packet it had received. These communications are described in detail below in connection with FIGS. 5C through 11C.

The PR box can also receive commands to test itself and report status/configuration to change the diagnostic LEDs and to change baud rates while in operational mode.

Self-test mode verifies the integrity of the microprocessor sub-system. After termination of the internal loopback of the OCTALART, the sub-system will reinitialize itself and return to operational mode. Self-test is entered on power-up or by receipt of an executed self-test command from the host. This will check the functionality of the PR box logic.

An internal loopback sub-test is provided in the self-test, allowing the system to verify the integrity of the PR box logic under software control. While the self test is in operation there is no logical connection between the host and the PR box. This is true only during self-test. There is no effect on the peripherals when the PR box is running the internal loopback portion of self-test because no data is output at the transmit pins of the UART lines in OCTALART 67. Additionally data coming in from the peripherals will have no effect on the PR box during loopback test since all data at the UART receive pins of OCTALART 67 is ignored.

External loopback testing may be performed on an individual peripheral channel using the appropriate loopback on the channel to be tested. This is done from the host firmware. The peripheral repeater is transparent from this operation. This is the testing, explained further below which allows peripheral interchangeability.

A manufacturing test mode is provided by a jumper in the host channel loopback connector. This jumper is sensed on an 8031 on the power-up. In this mode the module runs all tests (as in self-test) on all channels and a device present test, and an external peripheral channel loopback test, continually. Loop on error functionality has been implemented to aid in repair.

The eight bit diagnostic register 55 with eight LEDs 57 attached provides the PR box status and some system status, (assuming some basic functionality of the main system). This register is used by the PR box to indicate its dynamic status during self-test or manufacturing test, to indicate, on entry to operational mode, any soft or hard error that may have occurred. The MSB,.(bit 7) is used to indicate that a PR box error has occurred, bit 6 is used to indicate that a system error is displayed. If bit 6 is lit then the error code displayed is the system error, regardless of bit 7. This leaves bits for providing encoded error responses. LED Error Codes are listed below.)

The Power Monitor Circuit

The circuitry 63 to monitor the plus and minus 12 v supplies operates from the +5 v. supply. A single red/green bicolor led 64 is connected to the output of the power monitor circuit 63. The output indicators are as follows:

| LED Indication | Description |
|---|---|
| Green | All voltages present and within range |
| Red | Either plus, minus or both 12 volt supplies are approximately 15% out of spec or dropped out completely |
| None | +5 v supply, all supply voltages dropped out or no AC |

The DC power monitor is a set of four comparators to check undervoltage and overvoltage out of range approximately 15% at nominal for the plus and minus 12 volt supply. The circuit runs from plus five and uses a plus two volt precision reference applied to the appropriate reference input of each comparator. The output is connected to bicolor LED 64. Precision resistor dividers connected to the other input of each comparator, scale the test voltage down to the same range as the reference input.

The Function Monitor

As shown in FIG. 2, a tristate LED 61 is connected to the output of two bit function register 59. This is used to give visual indication of what mode or function the PR box is performing at that time.

| LED Indication | Description |
|---|---|
| Yellow | Self-test mode being executed |
| Red | Manufacturing test being performed |
| Green | Operational mode active |

PR Box Operation Overview

Figure 3A:
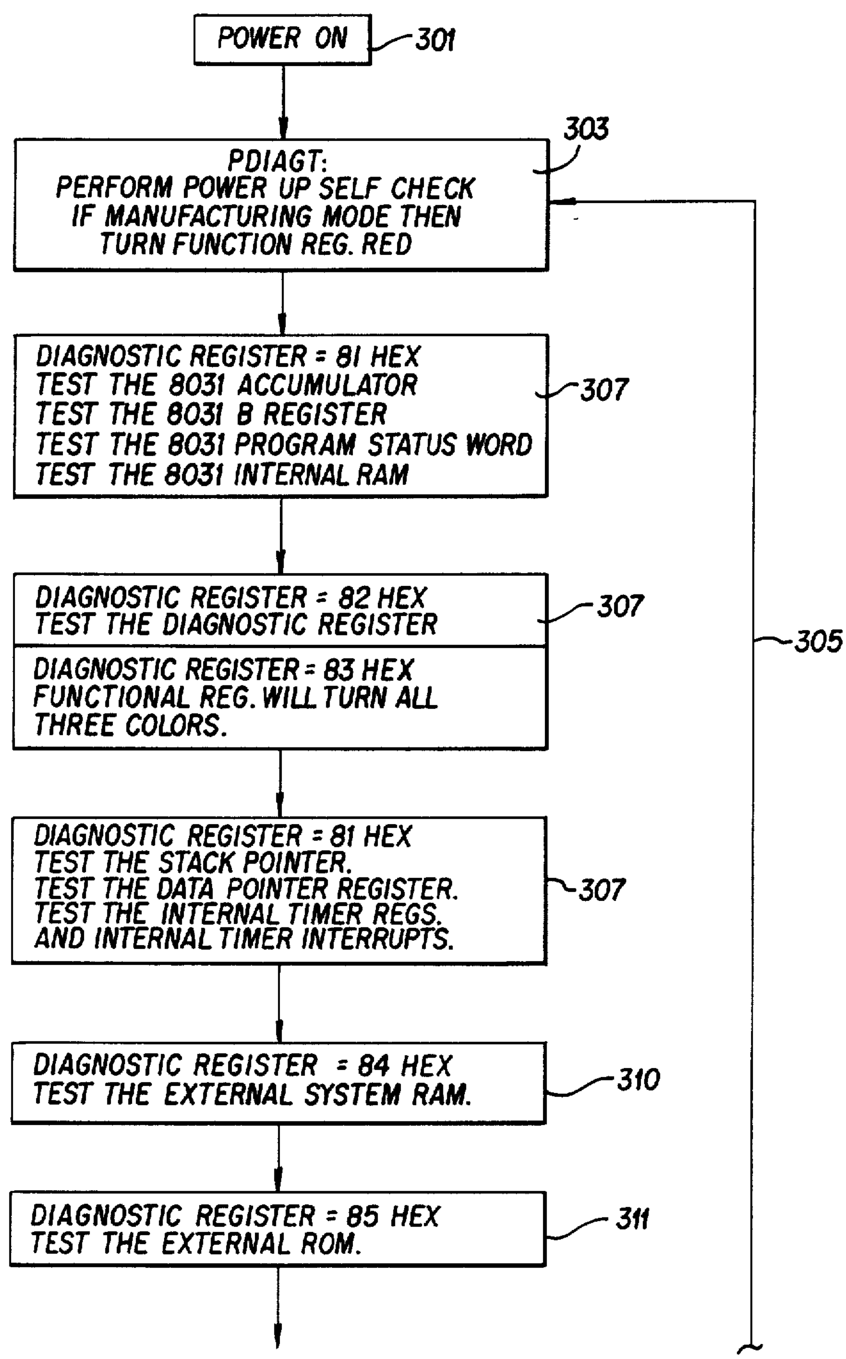
FIGS. 3A-C are a flow diagram of the firmware running in the PR box of the present invention.
Figure 3B:
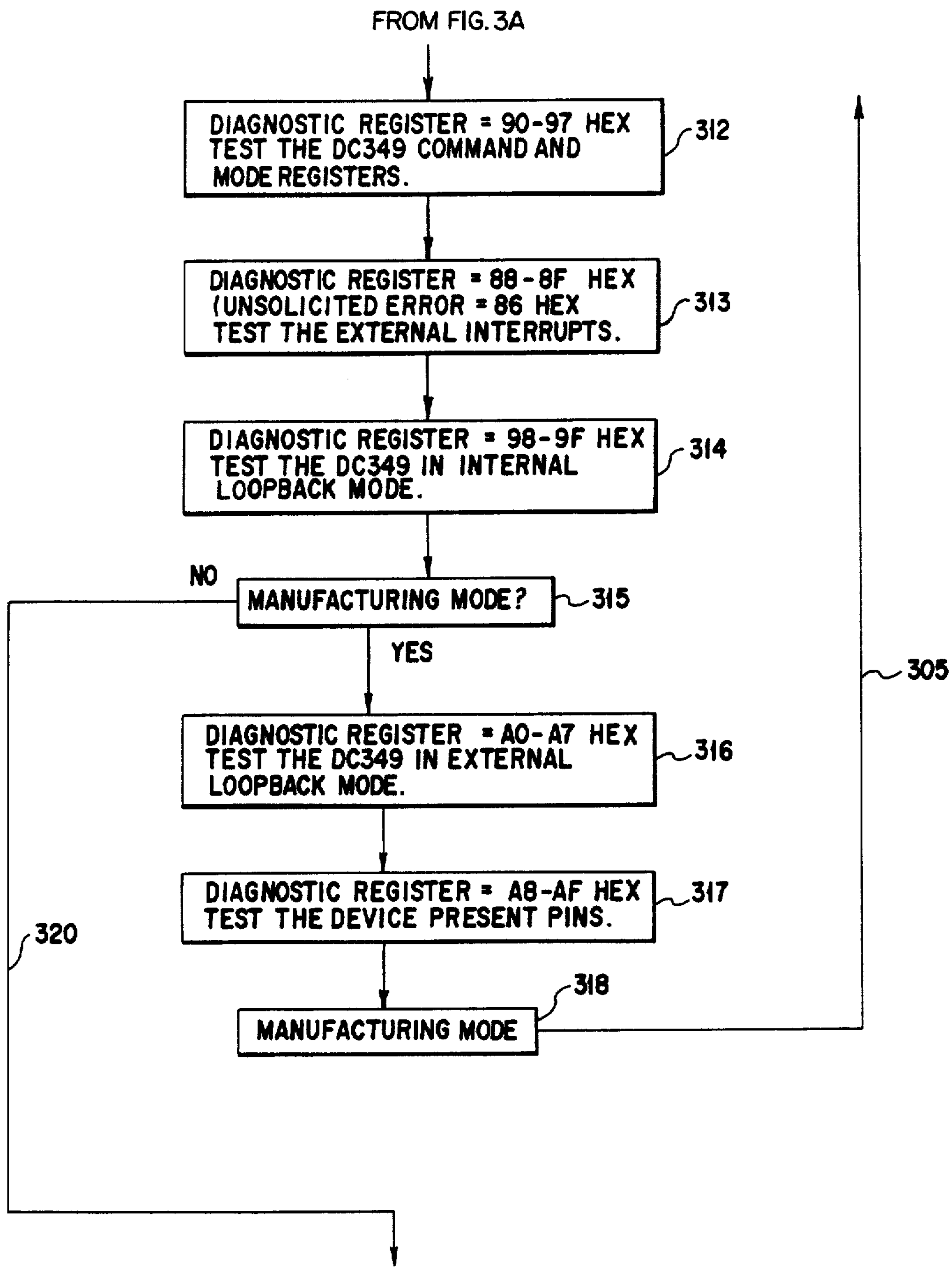

The PR box ROM 53 contains self-test and operational firmware. This firmware is contained in 4K bytes of ROM, though there is 8K bytes reserved for it. A listing of the firmware is set out in Appendix A. A flow diagram for the firmware is set out in FIGS. 3A-C.

On power-up indicated by block 301, the on board diagnostics will have control of the PR box as indicated in block 303. The diagnostics will perform tests on the PR box logic and do an external loopback and test if pin 7 on the 8031 port 1 is grounded (signifying manufacturing mode). In manufacturing mode the diagnostics will loop forever via loop 305 and not go into operational mode. This is done via detection of the loopback connector (pin 7) on power up. If an error is encountered during manufacturing mode, the diagnostics will loop forever on the test that encountered the error.

Registers 55 and 59 with LEDs 57 and 61 (see FIG. 2) attached can be viewed from the outside of the system box. Diagnostic register 55 as noted above is 8 bits wide with Red LEDs. These LEDs report errors for the PR box and/or the system. As also described, the function register 59 is two bits wide with a single red/yellow/-green LED. When in manufacturing mode, the function LED is red as indicated in block 303. On power-up, during other than manufacturing mode, the function LED will be yellow. In operational mode it will be green.

The various tests performed on power up are indicated by blocks 307-314. If in manufacturing mode, as checked in block 315 of FIG. 3B, the test of blocs 316 and 317 are also performed before entering block 318 to loop 305.

If, on power up, the PR box has an error that will make the PR system unusable, i.e. interrupt, 8031 errors, the function LED will stay yellow, an attempt to put the error code in the diagnostic register will be made, and the PR box will not go into operational mode.

Figure 3C:
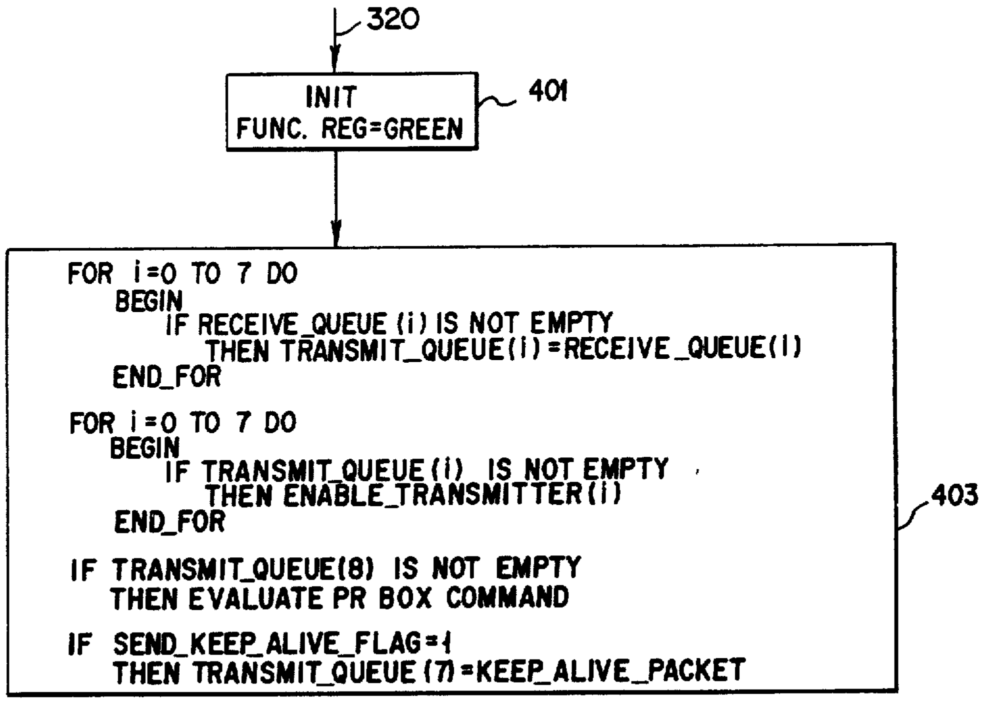

If there are no errors or errors that will not make the system unuseable, and the system is not in manufacturing mode, path 320 will be followed to block 401 of FIG. 3C and the function LED will turn green and wait for the host to ACK/NAK, the diagnostic report to establish the link between the host and the PR box. If the link is never established, the error code for NO host is placed into the diagnostic LEDs, and the PR box will go into operational mode. If the communications link is later established, the error code will be cleared.

If there are soft errors (diagnostic register or function register) the PR box will go into operational mode of FIG. 3C and carryout the background process. However, any LED indication may be incorrect. Except for a dead system, i.e. 8031 failures, the PR box will attempt to go operational mode, displaying, if possible, the point at which it failed the self-test, (test number).

After the power-up diagnostics have been completed, control is passed to the operational firmware. In this mode, the firmware will keep the link between the host and the PR box active, and mux/demux commands/-data between the peripherals and the host. This operation is described in detail below.

The diagnostics/operating system of this system are ROM based and run out of the 8031 microprocessor. The PR box firmware is compatible with the existing peripherals, and adheres to a communications protocol developed for the host PR box link discussed below.

The diagnostics are the first part of the firmware to run on power-up of the PR box. The diagnostics leave the system in a known state before passing control to the operating firmware. Upon completion of testing the PR box, the system RAM 51 is initialized, queues are cleared, the UARTs in in OCTALART 67 are set to the default speeds and data formats, the diagnostic and mode registers 55 and 57 are set with the appropriate values, and a system status area is set up that contains the status of the PR box.

Once the diagnostics are complete, the diagnostic report is sent to the host, and the PR box goes into operational mode. If there are no other messages to send, the PR box will wait 10 seconds for an ACK-/NAK before placing an error code for "No communications link" into the diagnostic register 55. An ACK-/NAK timer is provided for all other packets and times out at 20 mSec. Once operational, the UARTS are enabled to allow communications between the peripherals and the host. A keep-alive timer is also enabled in order to keep the host link active.

Operational Mode

In this mode, the PR box 21 is the central communications device sitting between the peripherals and the host 19. (Refer to FIG. 1 block diagram). Before detailing this mode, some basic terminology and memory allocation utilized on the PR box must be discussed.

A page of memory is 256 bytes in length. The low order address of the beginning page of memory is zero, the upper byte is from 0 to 255. In this description, the term "port" is used interchangeably with "channel" and refers to the peripheral port. The 8031 has bytes of on-chip RAM. Of the 128 bytes, 36 are utilized for front, rear, receive and transmit queue pointers. There is a front and rear queue pointer for each receive and transmit queue. Receive and transmit queues are allocated for each SLU port and the command queue to the PR box. There are eight ports and one command channel, thus, there are 18 queues and 36 pointers. Listed below are the names given to the respective queue pointers.

| | |
|---|---|
| REAR_RX_QUE_PTR | A table containing the rear receive queue pointers for ports 0-7, & the cmd queue 8 |
| FRONT_RX_QUE_PTR | A table containing the front receive queue pointers for ports 0-7, & the cmd queue 8 |
| REAR_TX_QUE_PTR | A table containing the rear transmit queue pointers for ports 0-7, & the cmd queue 8 |
| FRONT_TX_QUE_PTR | A table containing the front transmit queue pointers for ports 0-7, & the cmd queue 8 |

The receive and transmit queues are maintained in off-chip RAM. Each queue entry is an address of the buffer received, or the buffer ready to be transmitted. Each entry is a word in length, a word being 16 bits. The first byte is the low order address the second byte is the high order address. No buffers are moved, only buffer addresses. Listed below are the names assigned to critical memory locations.

| | |
|---|---|
| RX_i_QUE | Where i=0 to 7, and the CMD queve-1 page (256 bytes-128 msg ptrs) |
| TX_i_QUE | WHERE i=0 to 7, and the CMD queue-1 page (256 bytes-128 msg ptrs) |
| CHi_BUFFER | Where i=0 to 7. Buffer space for each port. Ports 0 to 7 are the following sizes ¾K, 2K, 2K, 1.5K, ¾K, ¾K, ¾K, 2.75K respectively. |
| RX_BUFFERS | 16 bytes (8 addresses, one for each SLU, there is no buffer associated with the command queue) - Contains the next free byte in each ports buffer. |
| TX_BUFFERS | 16 bytes (8 addresses, one for each SLU, there is no buffer associated with the command queue) - Contains the next byte to transmit for each port. (Transmitter interrupt sets this up) |
| TX_SIZE_TBL | Number of bytes left to transmit for each |

-continued

| | |
|---|---|
| | channel. (8 locations) |
| RX_TIME_OUT | Timer bytes for each receiver channel. For inter-character timing. (8 locations) |
| PORT_TIME_OUT | Timers for each channel. Set to 10 mS when a queue is overflowed. (Port is turned off for 10 mS) (8 locations) |
| KA_TIMER | Keep alive timer. A 10 second timer which is reset to 10 whenever a packet is sent to the host. If the timer times out, a keep alive packet is sent to the host. |
| ACK_NACK_TIMER | Timer set to 20 mS after the checksum on a packet is sent to the host. (The timer is cleared if it receives an ACK or a NACK in this time period. If an ACK/NACK is not received, an error LED is set on the PR Box.) |

The method by which all pointers, queues, buffers, and tables are accessed is by getting the base address (or base page), and adding in the current channel number (or a multiple of the channel number). For example, to access channel 3 queue, the base page of the receive queues are taken. The upper address e.g. BASE_Rx-_PAGE, which is the base for all front queues is taken and the channel number is added to it (3 in this case) Once this is done, the value pointed to by FRONT_RX QUE$_{13}$ PTR plus the offset of 3 is used as the for the front pointer of channel 3. The channel number is obtained easily by reading it from a register in the OCTALART which, while in an OCTALART interrupt, stores the number of the channel causing an interrupt. Thus, for example, if data comes in from channel 3, it causes an OCTALART interrupt. The channel (3) is stored in an OCTALART register. The PR box reads this register and add its value (3) to the base values and this way quickly and easily obtains the necessary addresses for the pointers etc. for channel 3. Thus, all the queues, buffers, etc. can be treated generically by common subroutines, and interrupt routines, with the exception of Channel 7, which is treated slightly differently because it is the channel to which the host is connected.

All queues and buffers are circular. The queues are circular by virtue of the fact that they are only one page in length. The upper page address is loaded directly into the P2 register of the 8031. The front/rear receiver/-transmit queue pointers are loaded directly into register R0 or R1 of the 8031 which can be used for external accesses. Since the pointers are 1 byte, (R0/R1) when they are incremented (by 2 ) from FE hex they will automatically be set to 0. (FE hex+2=100 hex, but since it is a byte value the 1 is tossed away.) No data checking is necessary because P2 and R0/R1 are separate registers and the one does not carry to the upper address byte (P2).

Once in operational mode, the PR box will initialize all the channels to default baud rates for the peripherals it expects to be on a specific channel. The default baud rates are set out in the table of FIG. 5. Upon this expectation, the PR box will also allocate buffer sizes to achieve maximum processing of data received from and transmitted to the respective peripherals. The buffer size is chosen to provide for storage of a maximum of 256 packets without overwriting buffer space. This comprises 128 packets in a queue ready to transmit to the host another 128 packets in a peripheral receive queue waiting to be moved to the host transmit queue. For example, channel φ buffer is initialized to 768 bytes, (¾K), to accommodate a keyboard which is a single character device. Each packet stored in the buffer received from the keyboard will be comprised of three bytes: channel number, size byte, and the data byte. To store 256 packets, the buffer allocated is 256×3=768 (¾K bytes K) long. Once communication is established between the host and the PR box, the host will then interrogate each peripheral to ascertain what type of peripheral is connected and make adjustments to the baud rate if necessary.

The main routine which the PR box runs is the background process noted above. FIG. 3C is a flowchart which describes the background process. First, in block 401, on entering this part of the firmware the function register output is turned to green.

Then, as shown by block 403 this process scans the receive and transmit queues to see if they are empty. It does this by comparing the front queue pointer to the rear queue pointer for each queue. If the front equals the rear, the queue is empty, if they are not equal, then some action must be taken. The value 1 used in the background routine is, of course, the channel number. In this case, i is added to the base values to get the necessary addresses for checking the front and rear pointers.

Figure 4A:
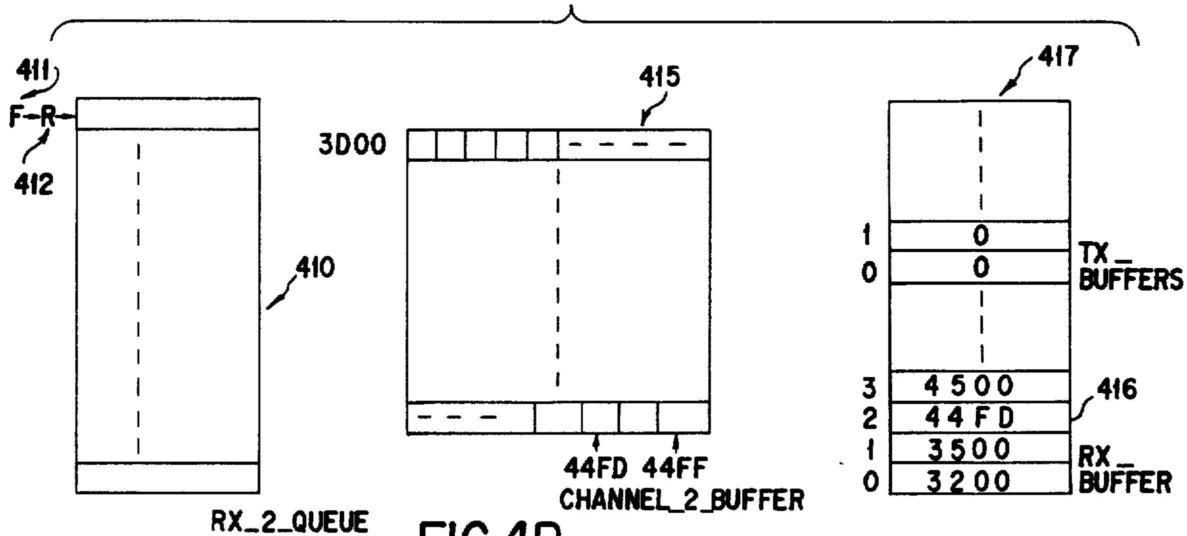
FIGS. 4A-H illustrate the transmission of packets through the use of circular queues and circular buffers according to the present invention.

FIGS. 4A-E illustrate what occurs when data is received in a receive queue from a peripheral and also illustrate the use of circular queues and circular buffers according to the present invention. FIG. 4A depicts the state the queues and buffers are in initially before a packet is received. Illustrated is the queue 410 for channel 2; the channel 2 buffer 415 and a table 417 containing pointers for the next available memory location for each of the receive channels Rx0-Rx7 and transmit channels Tx0-Tx7. As noted previously, data is not moved from buffer to buffer, only the addresses are moved from queue to queue. Thus, for channel 2, buffer 2 receives the data and it is also from this buffer that data is transmitted to the host. At the start of the receive for this packet, queue 410 is empty, i.e., the front pointer 411 equals the rear pointer 412. There may have been many packets received before the front and rear pointers 410 and 411 are at the top of the receive queue 410 (Rx_2_*Queque). The pointer* 416 *for Rx*2 *in table* 417 *is pointing to the next free buffer space in buffer* 415 *which is* 44 *FD Hex.*

Figure 4B:
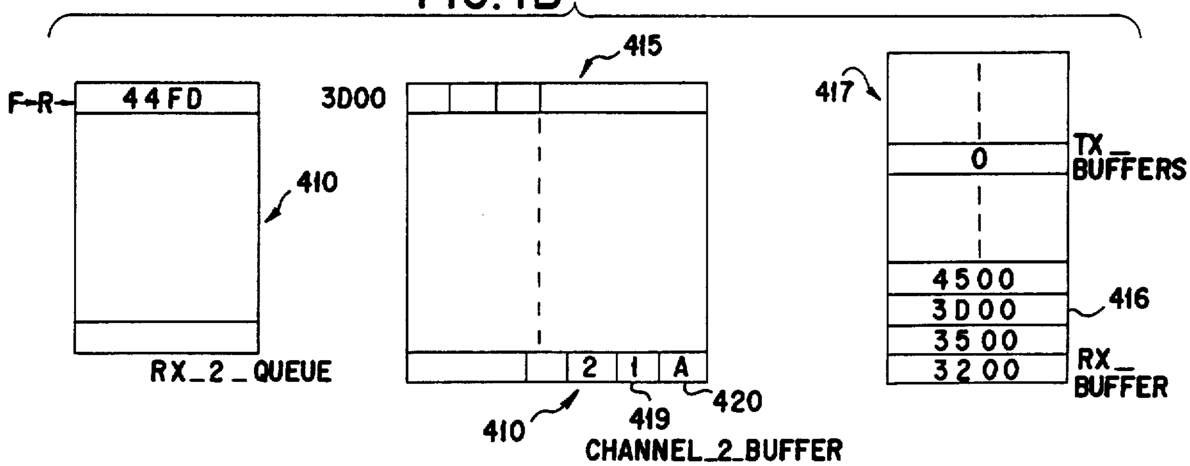

FIG. 4B depicts what occurs after the first receive interrupt on channel 2 occurs. Addresses are obtained in the manner described above by adding the channel number (2), the base addresses. A character is read, which in this example is "A". The Rx Buffer pointer 416 address is moved into the Rx_2_*Queue* 410. *The packet is loaded into Channel*_2_Buffer 415, along with the channel number 418, the size of the packet 419, which is initialized to 1, and the character read, "A" as indicated at 420. This act causes the inter-character timer, to be explained in more detail below, for channel 2 to start.

The next free buffer space is saved in table 417 of pointer 416. The next free buffer space pointer is at 3D00 Hex. The last free buffer space pointer was at 44FF Hex which was the end location of the buffer. Instead of just bumping the free buffer space pointer to 4500 Hex and thereby going into the next SLUs data space and losing data, the free buffer space is wrapped to the start of Channel_2_Buffer. No overrun will occur because of the size of the packet and number of packets allowed as described below. This demonstrates the use of circular buffers in the PR box software.

Figure 4C:
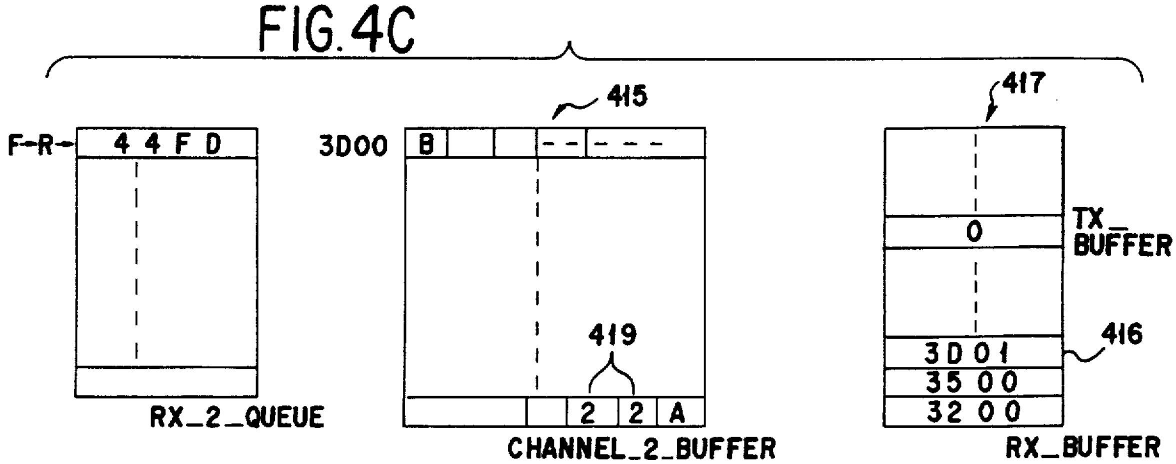
Figure 4D:
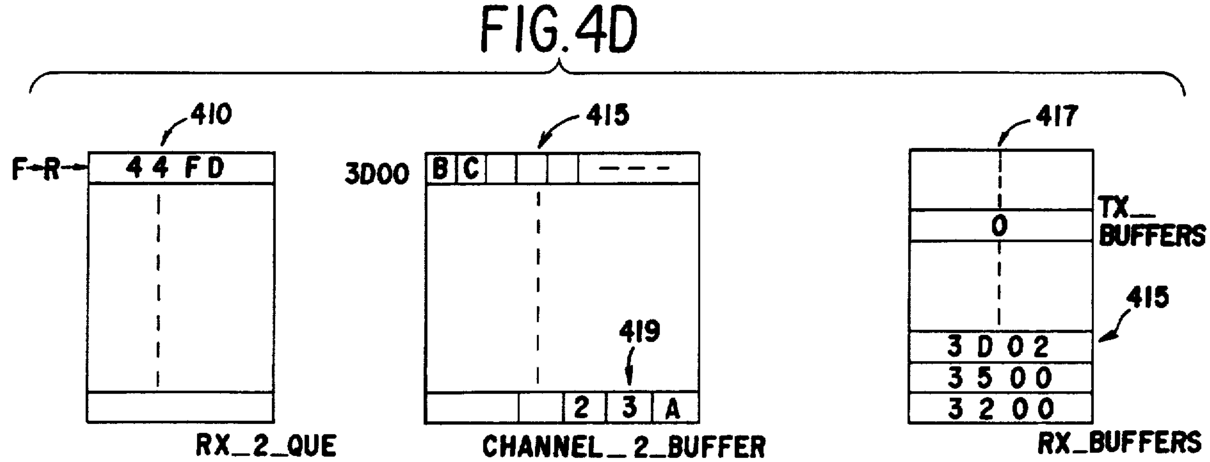

The same sequence of events as described above and depicted in FIG. 4B are repeated as shown in FIG. 4C and FIG. 4D. The character (B and C) are read and stored at the start of the channel 2 buffer 415 and the packet size 419 is incremented accordingly. Each character is moved to the address in Channel_2_Buffer 415 that pointer 416 (free buffer space pointer) of the table 417 indicates. Pointer 416 is incremented and the inter-character timer is re-started. This sequence of events continues until the inter-character timer expires.

FIGS. 4A–E have been simplified to show only one packet in each queue at a time. In reality, each queue may have multiple entries and each port may be receiving/transmitting packets concurrently. Having a transmit queue, a receive queue, a buffer and associated pointers dedicated to each channel in the PR box makes this operation possible.

Figure 4E:
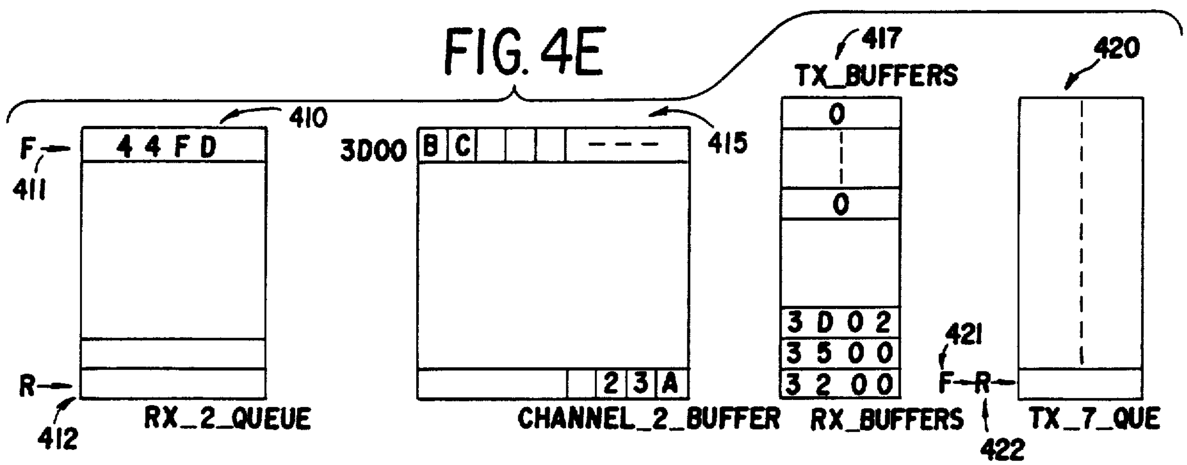

FIG. 4E shows that once the inter-character timer expires, the rear pointer, 412, is bumped to the next free location (FE Hex+2=00). This brings the rear pointer to the start of the queue thus again demonstrating the use of circular queues in PR box software as a result of the previously explained use of the P2 and R0/R1 registers.

All received and transmitted data from the PR box is handled by interrupt routines. There are routines, which occur for example, during the steps of FIGS. 4A-4E, to set up the data packets to be sent from the peripherals to the host. These packets are considered complete if the number of characters received for that peripheral equals the maximum packet size allowed, which is six bytes, or if there is a timeout of the inter-character timer for that peripheral. For example, the tablet report size is 5 bytes so after the fifth byte it will time out be a completed packet. Inter-character timeout occurs if approximately two character times pass without reception of a byte.

Peripheral timeout is handled by inter-character timers that are initialized before the initialization code starts. The value that is loaded into the timer is related to the baud rate. There is a timer location for each channel. Table of FIG. 6 contains a list of the timer values used for the different baud rates. The timer values are decremented in a timer 0 interrupt routine, described in detail below in connection with FIG. 7. For example, consider the case where the tablet sends a report which is 5 bytes long at 4800 baud. At 4800 baud and 11 bits per character, it will take approximately 2.3 msecs per character for transmission. Then in the case of this report being sent, the timer would expire after about 5 msec and the buffer would be marked as complete.

As disclosed above in connection with FIG. 4B, when the first character is received on ports 0–6 (peripheral ports), the address of the first free space in the ports' buffer 415 is stored in the queue 410. The current port number is stored in that location at 418. The next buffer location 419 is the size, and will be initialized to 1. Finally, the character which was read in e.g. A, is stored in the buffer. Subsequent bytes are be stored in the buffer 415, and the size byte 419 is incremented.

Thus, after each byte is read, a timer for that port is initialized to approximately twice the transmit time for a single character. This inter-character timer value is adjusted if the host changes the baud rate on any channel. The packet is closed, and the ith rear pointer 412 of FIGS. 4A–E is bumped by 2 when the timer counts to zero (times out), or the size equals 6, where i is the channel number, as shown in FIG. 6E.

Figure 4F:
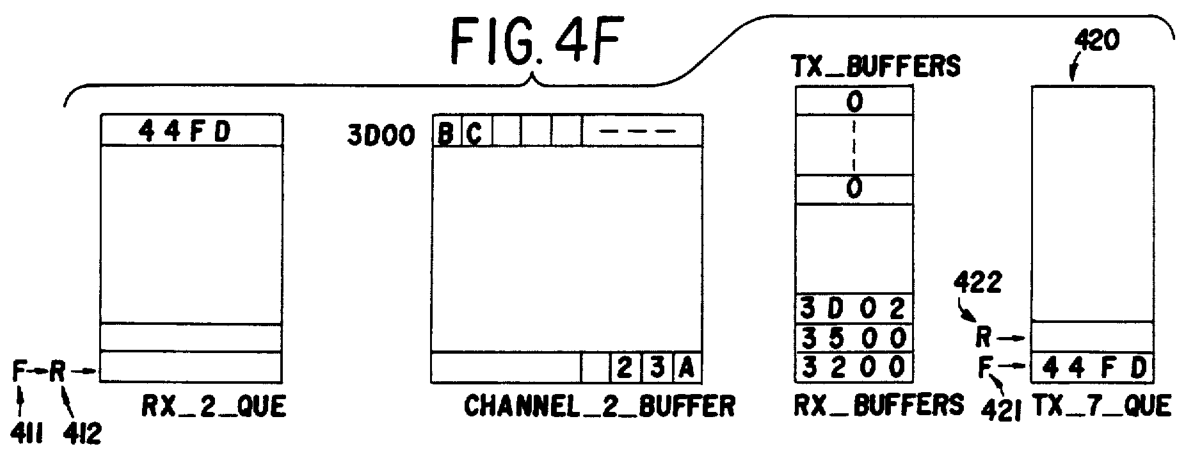

After the background process sees a non-empty Rx queue, e.g. as in FIG. 4E the buffer address at the front 411 of the receive queue is moved to the rear 422 of the Tx-7 queue (host) 420. The front receiver pointer 411 or the Rx queue is bumped to the next location (which may or may not have any more data buffers to send), and the rear 422 of the Tx_7_Que is bumped to the next free location. This is shown in FIG. 4F.

In general, the transmitter is turned on for port 7, if it is not already on, if an ACK/NACK or a Keep Alive needs to be sent, or the queue is not empty. If the command queue is not empty, then the command parser is executed. Transmitter interrupts turn themselves off when the last character is sent. The background routine, transmit, receive, and timer interrupts all run asynchronously to each other.

Thus, if the receive queue is not empty and the queue is for port 0–6 or the command queue, then the queue entry at the front of that queue is pushed onto the rear 422 of the transmit queue 420 for port 7. The front 411 of the receive queue at which the entry was just taken off is incremented by two as explained above in connection with FIG. 4F. What has just been described is how information is received from a peripheral into a buffer and the buffer locations stored in a receive (Rx) queue and then transferred to the Tx_7_Que to be transmitted to the host.

Packets from the host for the peripherals (0–6) or the PR box (the command channel) are handled in similar fashion, first with the locations stored in the RX_7 queues and then being transferred to a respective Tx queue.

If the receive queue for port 7, Rx_7_Que (the host) is not empty, then the first byte of the buffer (at the queue entry) contains the port where the entry should be directed. That port value is used to select the appropriate transmit queue, and the buffer address+1 is the value which is pushed onto that transmit queue. If the destination is for port 7 (i.e., a command to the PR Box), then this is pushed onto the command queue.

The first character received on port 7 must be an ACK, NACK, or an SOH. If it is an SOH, the PR Box will expect to receive a packet. All following characters are stored in the channel 7 buffer. After the last data character is read, the received checksum is compared with the calculated checksum. If they are equal, an ACK is sent to the host, and the rear pointer for channel 7 is bumped by 2. If the checksum does not match, or the inter-character timer expires (10 msec for the host), a NACK is sent to the host, and the rear pointer for channel 7 is not incremented (The PR Box ignores the data it stored).

Once an entry is pushed onto a transmit queue for ports 0–6 and it is not empty, the transmitter interrupt is turned on for this channel, if it is not already on.

A transmit interrupt on ports 0–6 will take the address at the ith transmitter queue front pointer for the buffer to transmit. The first byte is the size, which is not transmitted, but the subsequent bytes are transmitted until the size is zero. When the interrupt is finished transmitting all the data bytes, the front pointer for the ith transmitter is bumped by two, and the interrupt for that port is turned off.

A transmit interrupt on port 7 could be for a few reasons such as, to send an ACK, NACK, or a packet to the host. A transmit interrupt on port 7 (Host port) will reinitialize the keep alive timer to 10 seconds.

Figure 4G:
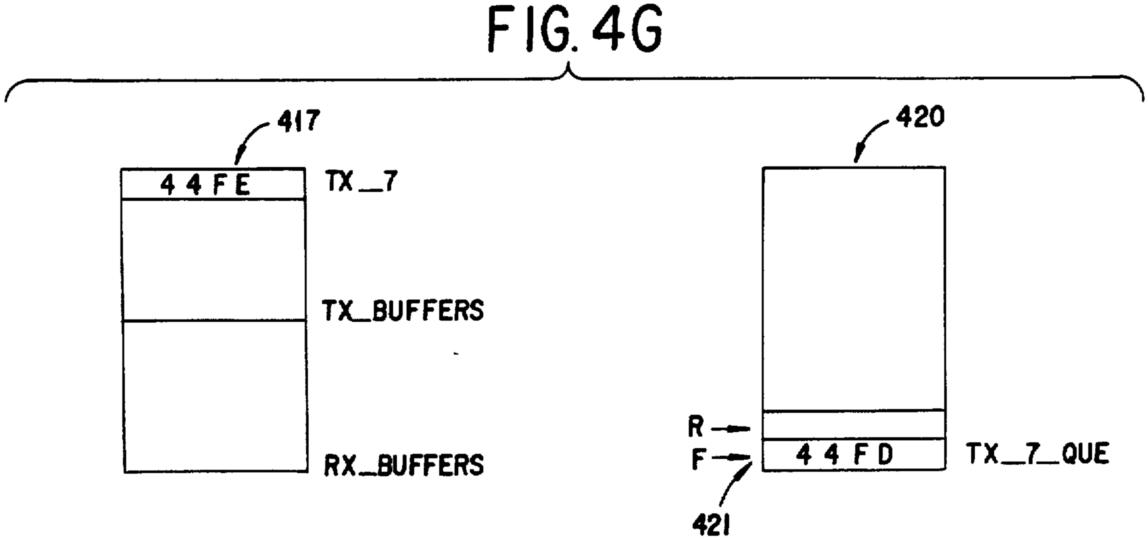
Figure 4H:
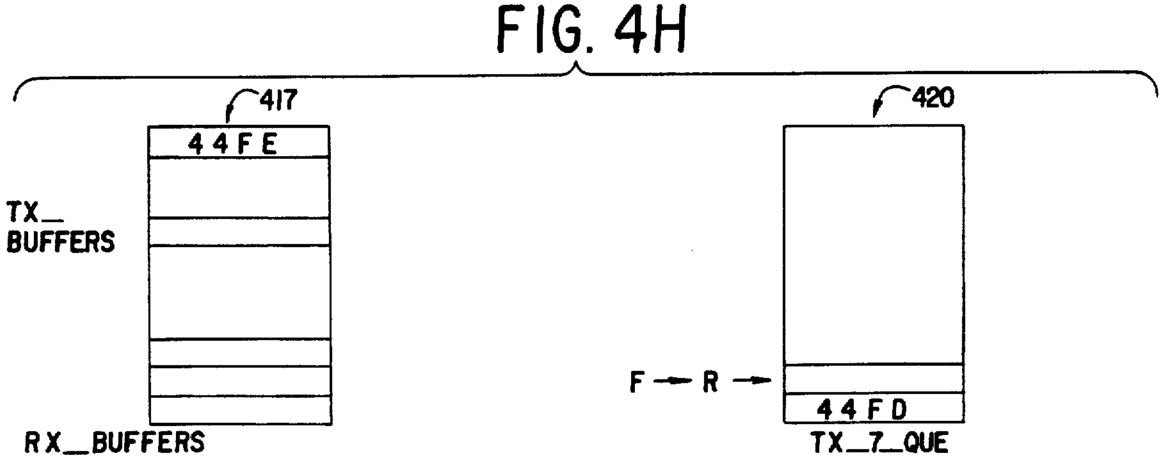
Figure 7A:
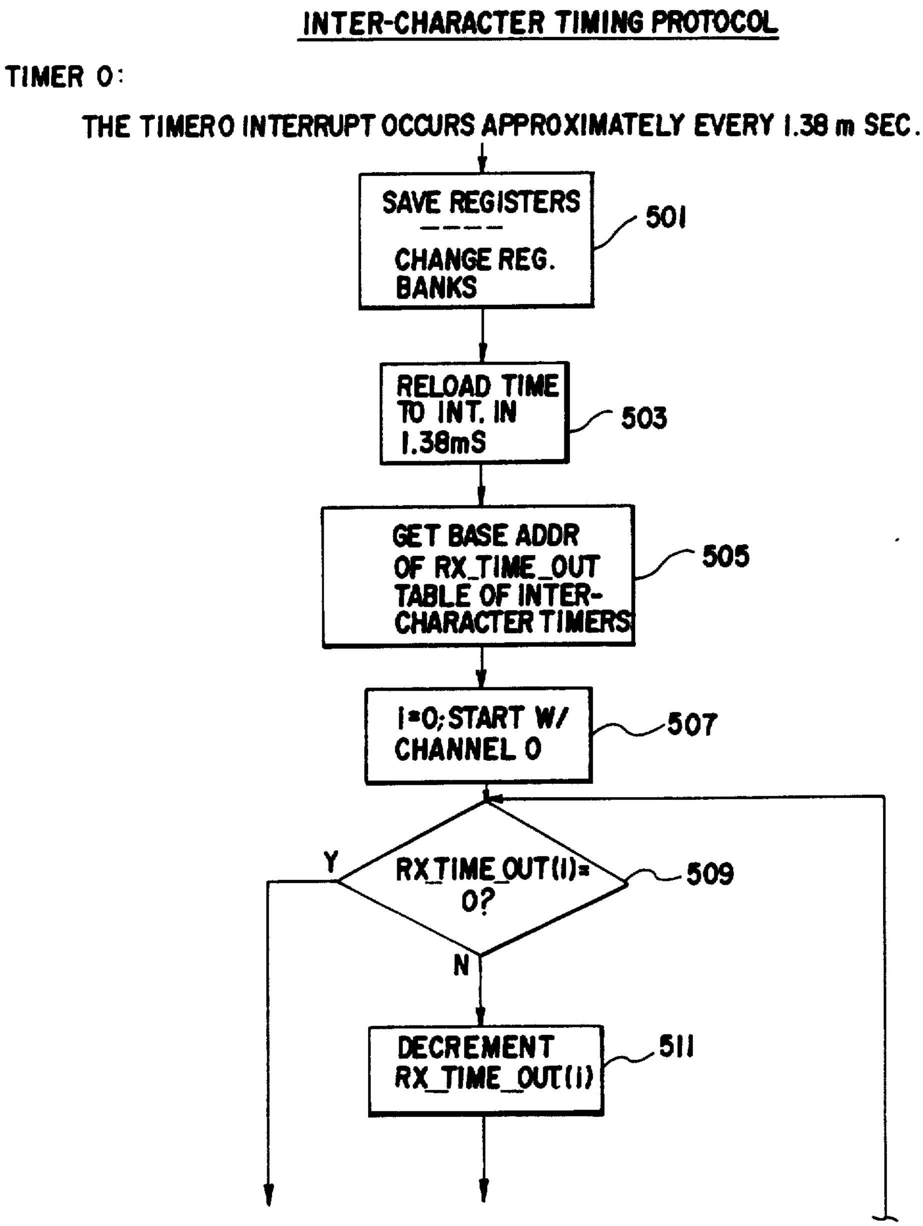
FIGS. 7A-C is a flow diagram illustrating the basic timing utilized for interpacket timing.
Figure 7A:
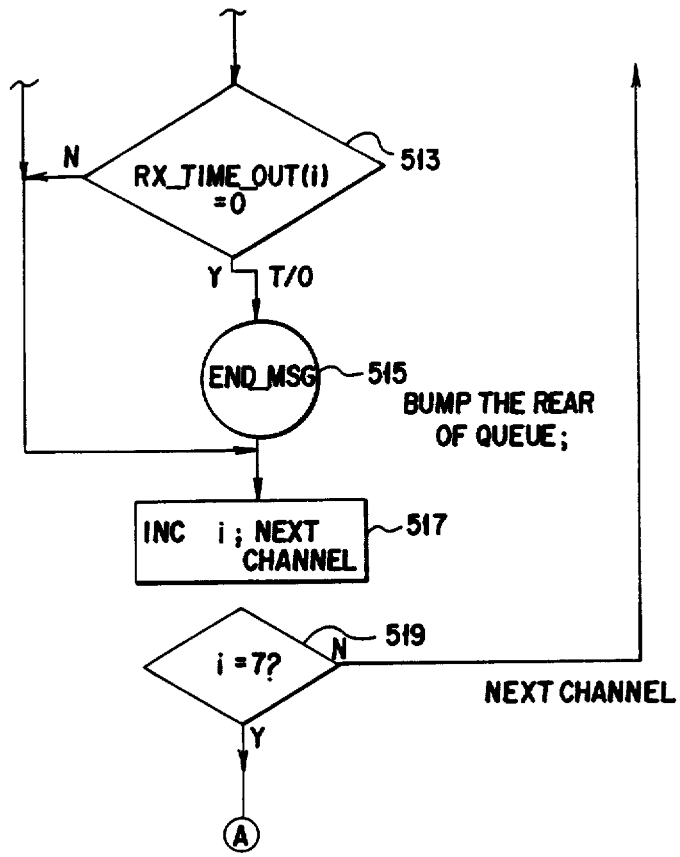
Figure 7B:
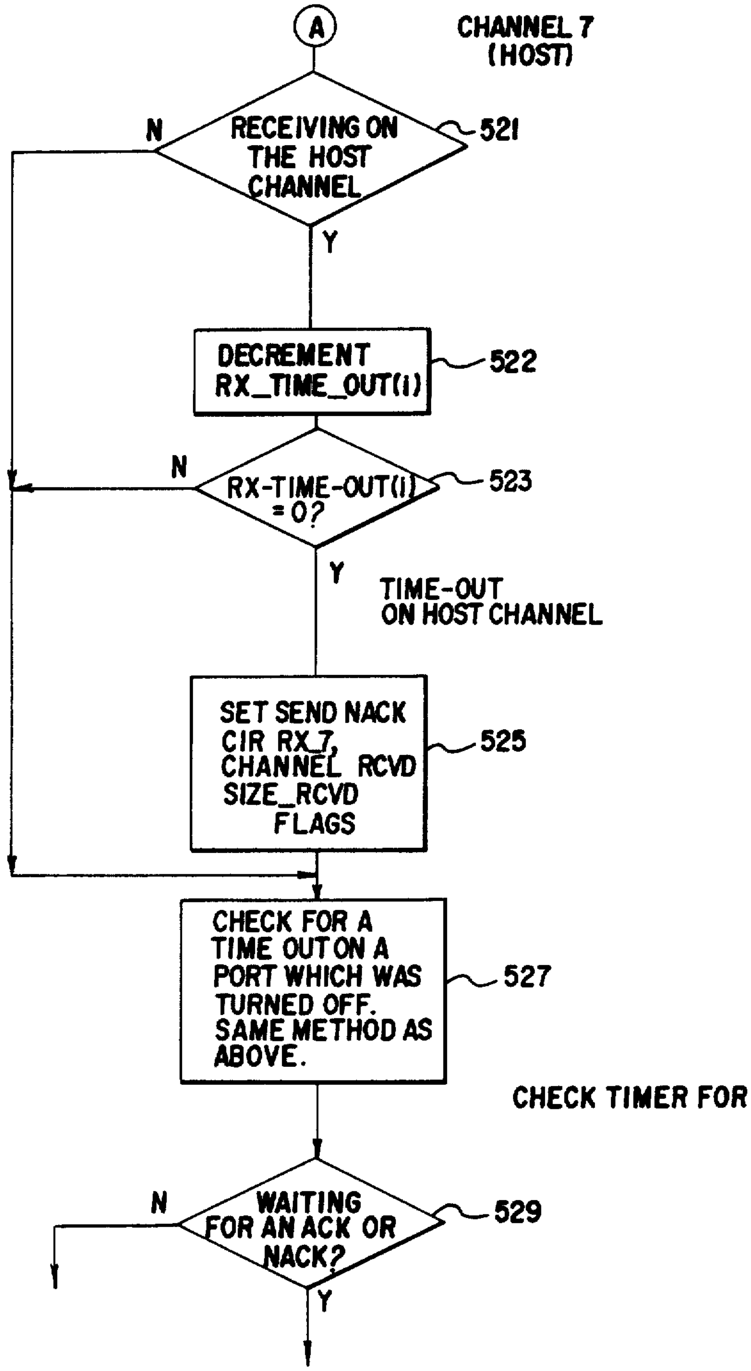
Figure 7B:
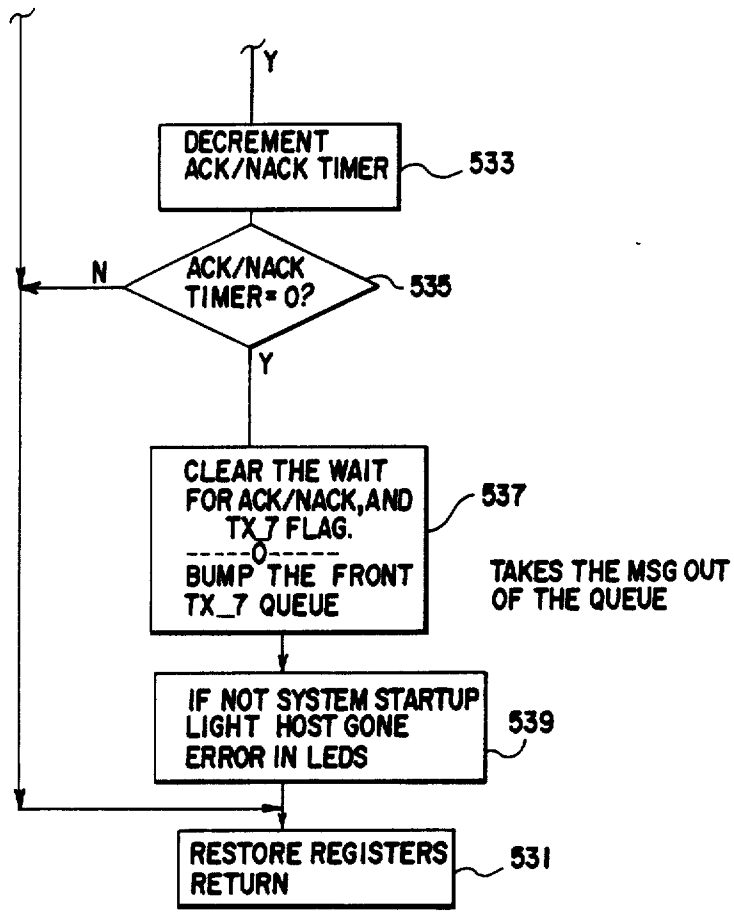
Figure 7C:
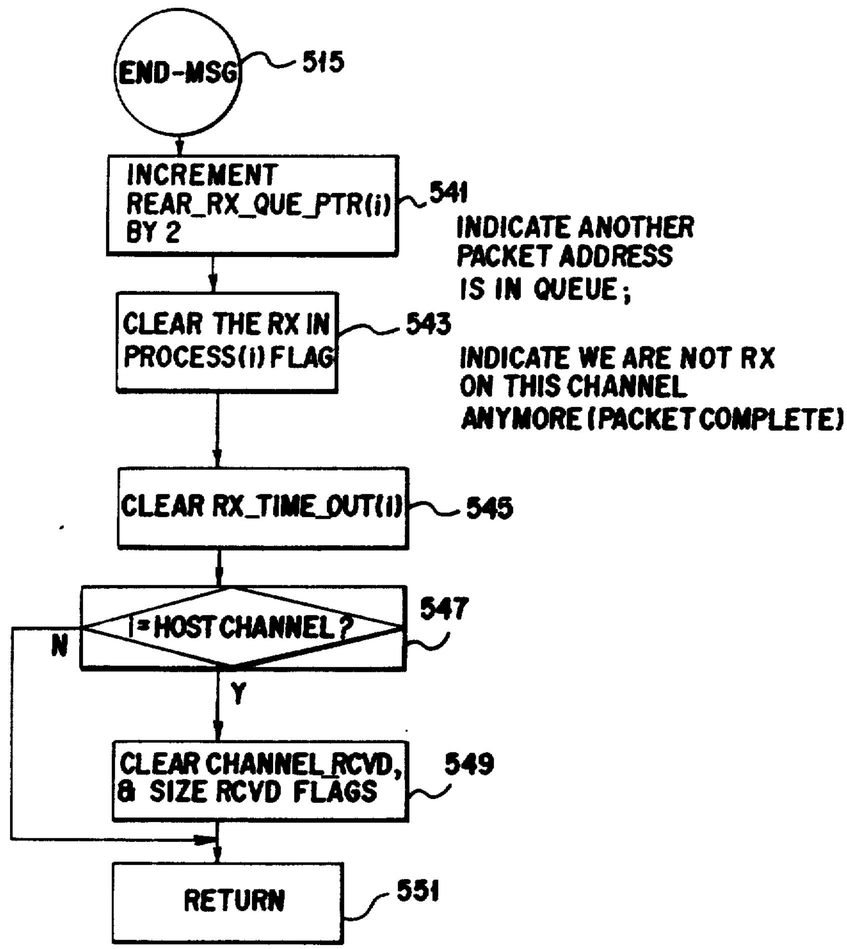

If the PR box is to send a packet to the host, the first time in the interrupt, it will send an SOH. The second time in the interrupt routine it will get the packet address pointed to by the front pointer 421 for the channel 7 transmitter queue 420 as shown in FIG. 4G. The first byte at that address will be the channel which the packet is from. The PR box takes this byte, sends it and stores the address of the next byte to send in Tx_Buffers table 417 at the location for channel 7. For example, FIG. 4G illustrates transmitting the information for channel 2 which was obtained as shown in FIGS. 4A–E. The next time in, it will send the size of the packet, and use the size to send the subsequent data bytes, until the size is zero. As each byte is sent, the Tx buffer (7) is incremented to point to the next byte. As each byte is sent, it is also calculated into the checksum, and the checksum is then sent when the size is zero. After the checksum is sent, a timer is initialized to 20 mSec in order to wait for an ACK or a NACK, and the interrupt is turned off. If an ACK is received, the front pointer for channel 7 will be bumped by two as shown in FIG. 6H. If the timer expires, this pointer will be bumped by two, and the LEDs will have the error code to indicate the host did not respond. Another packet cannot be sent to the host until an ACK/NACK is received, or the timer expires.

As noted above, the host sends data to a physical channel address. The host keeps a table indicating which device is plugged into a particular channel. The host can tell which device is on a particular channel by requesting the device to send a self-test report. This is done for devices having common connectors that can be interchanged (i.e., the mouse and tablet, dial box and digit box, etc.). The PR box tries to determine if a device is connected to a channel by looking for the device present bit. The mouse, tablet, buttons box, dial box, and spare keyboard channels have device present bits. By using these, the PR box can tell that there is a device out there, but not what device it is.

When the PR box sends the self-test report, one byte is the current configuration of the system (only those devices that have a device present bit). There is no attempt made to try to identify if there is a device on the spare channel, host channel, or the keyboard channel.

A receive interrupt will occur on channels 1–4 and 6 if a device is plugged/unplugged. If this occurs, a message is sent to the host. The host then interrogates that port to see which peripheral, if any, is present and records that information in a table. It then sets baud rates by sending a command to the peripheral and then a command to the PR box to set the UART baud rate for the port in question. Baud rates may be reset at other times by the host to, for example, slow down transmission of a data where excessive transmission errors are encountered.

The Timer 0 interrupt contains the counters for the inter-character timers, counters for a port which was previously turned off, and the ACK/NACK counter. FIG. 7 is a flow diagram illustrating the Timer 0.

As indicated by FIG. 7, the timer interrupt occurs approximately every 1.38 msec. Upon the occurrence of an interrupt, as indicated by block 501, registers are saved and the register banks changed. The time to the next interrupt is then loaded as 1.38 msec. as indicated by block 503. The next step is to get the base address of the receiver timeout table of inter-character timers. This table contains the same information which is contained in FIGS. 5 and 6 hereof, i.e. for each channel it gives the value for the inter-character timing. The next block indicates that the process starts with i equal to 0. In other words, as block 507 indicates, it starts with channel 0. A decision block 509 is entered in which, the first time through, a check is made to see if the timeout for receiver i is equal to 0. If it is not equal to 0, block 511 is entered and the timeout is decremented by 1. A check is made again in decision block 513 to see if timeout has reached 0. If the answer is yes then it is the end of the message as indicated by block 515 and, as indicated above, the rear of queue i is bumped. In decision block 509 if timeout is equal to 0 this means there is nothing to be done for this channel. If the answer in decision block 513 is no, this means that timeout has not occurred. In either case, block 517 is entered and i is incremented to the next channel. Following this a decision block 519 is entered to see if i is equal to 7. If not, the program loops back by a loop 520 to decision block 509 to check timeout for the next channel. When channel 7 is reached, as indicated by a yes answer from block 519, decision block 521 is entered. Here a check is made to find out if the PR box is receiving on the host channel. If it is, according to block 521 timeout is decremented by 1. Then in block 523 a check is made to see if timeout is equal to 0. If it is, there is a timeout on the host channel and a number of steps are taken as indicated in block 525. If timeout has not occurred, the program proceeds directly to block 527. As indicated therein, a check is then made for a timeout on a port which was turned off. This is done using the same series of steps just described.

After passing through block 527, a decision block is entered to see whether or not the PR box is waiting for an ACK or NACK. If the answer in decision block 529 is no, block 531 is entered immediately which indicates that the registers are restored and a return from the interrupt to the main program. If the PR box is waiting then block 533 is entered and the ACK/NACK timer is decremented. Next, a check is made in block 535 to see if the timer is at 0. If it is not, block 531 is entered. Otherwise, if it is 0, the wait for ACK/NACK and the transmitter 7 flag is cleared and the front pointer for the transmitter 7 queue is bumped as indicated by block 537. Next, block 539 is entered and if it is not system start up the host gone error is lighted in the LEDs 52 of FIG. 2. After this, block 531 is again entered. As shown in FIG. 9C, when end message 515 is encountered, as shown by block 541, the rear pointer for the receiver associated with the ith channel for which the message had ended is incremented by 2. Next, as indicated by block 543, the receive in progress flag is cleared followed by clearing of the receive timeout as indicated by block 545. Next, a check is made in decision block 547 to see if i is equal to the host channel. If it is, the actions taken in block 549 are carried out. When this done, or if the answer in block 547 was no, then the program returns to block 517 of FIG. 9A. (END—*MSG is used elsewhere in the firmware also.*)

A timer is only decremented if it is non-zero. If it is non-zero, and transitions to zero, some action is taken. If an inter-character timer expires, then the rear pointer 412 for the ith receiver is bumped by two. If a timer for a port which was previously off expires, then that port is turned on. A port is turned off when it gets too much data, and overflows its queue. The port is then turned off for 10 mSec. If the ACK/NACK timer expires, then the pointer 421 for channel 7 transmitter is bumped by two, and the error for the host not responding is placed in the LEDs 57.

The Timer 1 interrupt contains the counter for the "keep alive" timer. It is decremented by 1 on each entry. If it transitions to zero, a flag is set so the background process of FIG. 5C will send a "keep alive" message to the host.

The interrupt routines to receive packets from the host, thus, set them up in memory for the background process of FIG. 5C to decipher. This background process also sets up the process for the interrupt routines to send data packets to the host and the peripherals.

Packet Definition

Figure 8:
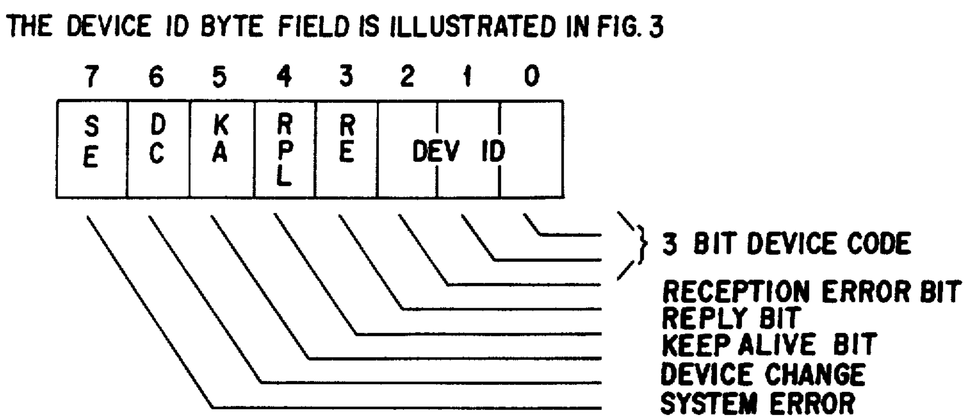
FIG. 8 is a diagram showing the configuration of the header byte field utilized with the present invention.

As noted above, bytes received by the PR box from a peripheral are grouped into a packet to be sent to the host. The packet definition is as follows:

| | | |
|---|---|---|
| SOH | 1 byte: | Decimal 1 |
| Header | 1 byte: | See FIG. 8 |
| Byte Count | 1 byte: | Number of message/ Message/Data Text data bytes |
| . . . . | | Message/Report/Data bytes, length dependent on peripheral device |
| Checksum | 1 byte: | Checksum for total transmisison |
| Response to the above packet: | | |
| ACK/NAK | 1 byte: | Decimal 6/21 |

The header byte field is illustrated in FIG. 8.

The three bit device code utilizes all available bits. There are device codes for the keyboard, mouse, tablet, dial box, button box, PR box system and two spare ports. The host channel is considered to be part of the PR box system, i.e. the host channel uses a DEV ID of 111.

| Code | Device |
|---|---|
| 000 | Keyboard (DEC LK201) |
| 001 | Mouse |
| 010 | Tablet |
| 011 | Dial Box |
| 100 | Button Box |
| 101 | Spare Channel |
| 110 | Spare keyboard |
| 111 | PR Box including Host Channel |

The reception error bit of FIG. 8 is used to indicate a problem with the associated device identified by the device code. This bit will be set when the PR box sees a parity, framing, or hardware overrun error on the UART associated with the device.

Reception Error Bit=logical 1 to indicate an error has occured.

The Reply bit is used to indicate the host that the PR box is responding to a request made by the host and that the report or data following is not being originated by the PR box or peripheral device. This bit is used for a response to the commands T and R discussed below under Self Test Command and Status Report Command, respectively.

Reply Bit=logical 1 to indicate this is a response to a previous from the host. Used only for PR box commands.

The Keep Alive bit is used to send null transmissions to the host within a specified time (e.g. 10 seconds) if there has been no transaction in that period. The host watchdog timer is set to 10 seconds. This functionality tells the host that the PR box is still connected but has not data to transmit. The host resets its watchdog timer and starts the cycle again.

Keep Alive—logical 1 to indicate keep alive function only.

The Device Change bit is set to indicate that a device with a device present bit has been connected/disconnected to/from the PR box. When this bit is set, the packet contains one message byte. This is the configuration byte. The configuration byte will have one bit set for every device that has a device present pin that is plugged into the system.

Device Change Bit—logical 1 to indicate a device has changed state.

The System Error bit is used to send error reports to the host. When this bit is set, there is one data byte in the packet. That data byte is the error code. The error codes that currently exist are:

1. 01H—Bad command sent from host.
2. 02H Device Queue has had an overflow.

Two methods of error detection are utilized:

1. Checksum for the transmission (add with carry)
2. Odd parity for each byte.

If the Keep Alive bit is set, the Reply bit and Error bit are ignored by the host. The DEV ID with Keep Alive must be the PR box device.

The Transmission Protocol

The transmission protocol is as follows:

The originating device sends its data and waits an ACK (all OK) or a NAK (something doesn't track, retransmit). Status information is a little bit different, in that the originating device, host will be expecting something other than the ASCII ACK/NAK character back. This is where the Reply bit is used.

If a NAK is received by either the PR box or the host, the source device will retransmit the previous transmission. The device which sent the NAK will flush the previous transmission and respond to the re-transmission as a new request.

Figure 9A:
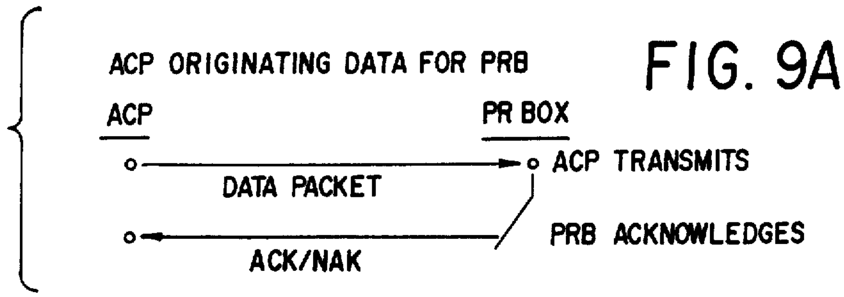
FIGS. 9A-C are diagrams showing the message transmission protocol of the present invention.
Figure 9B:
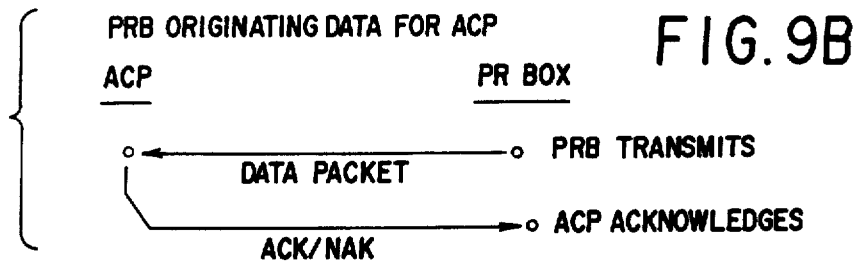
Figure 9C:
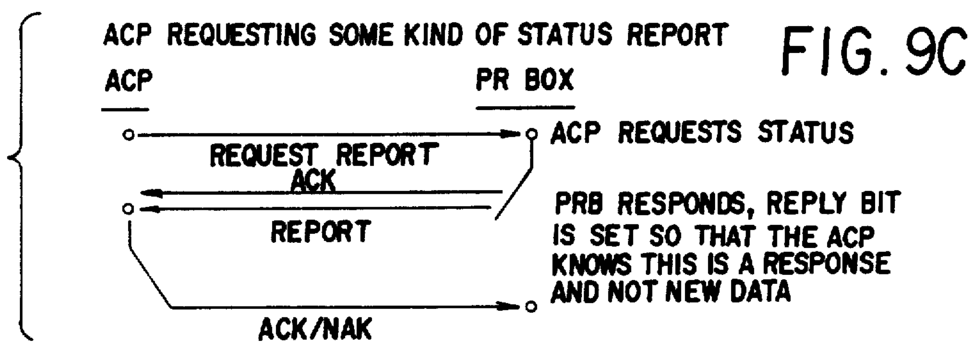

Illustrative diagrams are shown in FIGS. 9A–C which respectively show host originated data; PR box originated data and a report request by the host.

When a self-test command is transmitted directly to a peripheral, i.e. as regular data, the response coming back will be handled the same way, i.e. as data, and the Reply bit will not be set and the DEV ID will be that of the peripheral device. The PR box has no special commands to individually test individual peripherals.

When a device overrun error occurs, data may be lost. When the PR box gets an overrun error, and continues to receive data from that device before it can empty out it's queue, the receive for that device is turned off for 10 mSec.

After 10 mSec., the receive is turned on again, and the data that comes in is placed in the queue to send to the host. During the 10 mSec. that receive is off, data is lost.

Data from a peripheral is limited by the PR box to a maximum of six bytes per packet. If a peripheral sends out more than six consecutive data bytes without any null time period between the bytes, the PR box will make separate packets with a maximum of six data bytes. The packets from the host to the PR box do not have a data limit check. However, the host should limit the data size in a packet to nine data bytes for safety. The PR box can safely store up to 256 packets of nine data bytes, and warn the host on a queue overflow condition. If the host sends larger packets, it should send them less frequently, i.e. 128 packets of 18 data bytes, etc., with a bigger gap between packets.

As explained above, packeting of data from devices is handled by timers. When the PR box "sees" a "null" time period equal to two times the character length of a peripheral, the packet is closed off and placed in the queue to send to the host. (See the example above.) There is also a default for a transmission from the host of 10 mSec. null time in between two bytes of a packet. If this timer expires a NAK will be sent to the host. If the default speed of the host is changed, the timer will revert to a time period of two times the character length.

As previously described, there are also timers for the Keep Alive (about 10 SEC) and ACK/NAK (about 20 mSec)

Commands to the PR Box

Self-Test Command

T—Test PR System and send the self-test report (including the configuration).

Note: Test T will temporarily disconnect the PR Box from the host for less than 10 seconds.

Status Report Command

R—Report status of PR System, including Peripherals configuration.

Change Baud Rate Command (two forms)

0 Cnx—where "n" is the channel number (0—keyboard . . . 7-PR-Host link), and "x" is the baud rate.

0 Cnxyz—where "n" is the spare channel (5), "x" is the baud rate, "y" is the parity (ASCII O (Hex 4F)—for odd, ASCII E (Hex 45)—for even, or ASCII N (Hex 4E)—for none), and "z" is the bits/char (Hex 5, 6, 7, or 8)/.

Note: The Parity and Bits/char can only be changed on the spare port, however, the baud rate on the spare channel can be changed without changing the parity and bits/char. The other ports can only have the baud rate changed.

The following is the table of baud rates (x):

| Baud Rate | Hex Code |
|---|---|
| 50 | 00 |
| 75 | 01 |
| 110 | 02 |
| 134.5 | 03 |
| 150 | 04 |
| 300 | 05 |
| 600 | 06 |
| 1200 | 07 |
| 1800 | 08 |
| 2000 | 09 |
| 2400 | OA |
| 3600 | OB |
| 4800 | OC |
| 7200 | OD |
| 9600 | OE |
| 19200 | OF |

```
VAX/VMS VAX/VMS VAX/VMS VAX/VMS VAX/VMS VAX/VMS VAX/VMS VAX/VMS VAX/VMS VAX/VMS VAX/VMS VAX/VMS
VAX/VMS VAX/VMS VAX/VMS VAX/VMS VAX/VMS VAX/VMS VAX/VMS VAX/VMS VAX/VMS VAX/VMS VAX/VMS VAX/VMS
VAX/VMS VAX/VMS VAX/VMS VAX/VMS VAX/VMS VAX/VMS VAX/VMS VAX/VMS VAX/VMS VAX/VMS VAX/VMS VAX/VMS
VAX/VMS VAX/VMS VAX/VMS VAX/VMS VAX/VMS VAX/VMS VAX/VMS VAX/VMS VAX/VMS VAX/VMS VAX/VMS VAX/VMS
VAX/VMS VAX/VMS VAX/VMS VAX/VMS VAX/VMS VAX/VMS VAX/VMS VAX/VMS VAX/VMS VAX/VMS VAX/VMS VAX/VMS

CCCCCCCCCC   4444444444444444444444444444444444444444444444444444444444444444444444444444444444444   CCCCCCCCCC
CCCCCCCCCC   4444444444444444444444444  Digital Equipment Corporation - VAX/VMS Version V4.5  4444444444444444444444   CCCCCCCCCC
CCCCCCCCCC   4444444444444444444444444444444444444444444444444444444444444444444444444444444444444   CCCCCCCCCC
```

Appendix A

```
NEWMAN

DIAGNTS

....SRC;1
```

```
File _$12$DUA14:[RSMSS.DRS]DIAGINTS.SRC;1 (1041,30,0), last revised on 10-AUG-1987 11:12, is a 9 block sequential file owned by UIC
[DOC,RSMSQUEUE]. The records are variable length with implied (CR) carriage control. The longest record is 0 bytes.

Job DIAGINTS (871) queued to SYS$PRINT on 10-AUG-1987 11:12 by user NEWMAN, UIC [DOC,RSMSQUEUE], under account  at priority 100,
started on printer _MILES$LPC0: on 10-AUG-1987 11:12 from queue SYS$PRINT.

CCCCCCCCCC    44444444444444444444444444444444444444444444444444444444444444444444444444444444444444444444444444    CCCCCCCCCC
CCCCCCCCCC    4444444444444444444444444  Digital Equipment Corporation - VAX/VMS Version V4.5  44444444444444444444444    CCCCCCCCCC
CCCCCCCCCC    44444444444444444444444444444444444444444444444444444444444444444444444444444444444444444444444444    CCCCCCCCCC

        TITLE   DIAGNOSTIC INTERRUPT ROUTINES

;
; COPYRIGHT (C) 1986
; DIGITAL EQUIPMENT CORPORATION, MAYNARD, MASSACHUSETTS 01754
;
; THIS SOFTWARE IS FURNISHED  UNDER A LICENSE FOR USE ONLY ON A SINGLE
; COMPUTER  SYSTEM AND  MAY BE  COPIED ONLY WITH  THE INCLUSION OF THE
; ABOVE COPYRIGHT NOTICE.  THIS SOFTWARE, OR ANY OTHER COPIES THEREOF,
; MAY NOT BE PROVIDED OR  OTHERWISE MADE AVAILABLE TO ANY OTHER PERSON
; EXCEPT FOR USE ON SUCH SYSTEM AND TO ONE WHO AGREES TO THESE LICENSE
; TERMS.  TITLE TO AND  OWNERSHIP OF THE  SOFTWARE  SHALL AT ALL TIMES
; REMAIN IN DEC.
;
; THE INFORMATION IN THIS SOFTWARE IS SUBJECT TO CHANGE WITHOUT NOTICE
; AND SHOULD  NOT BE CONSTRUED  AS A COMMITMENT  BY DIGITAL  EQUIPMENT
; CORPORATION.
;
; DEC ASSUMES  NO  RESPONSIBILITY  FOR  THE USE OR  RELIABILITY OF ITS
; SOFTWARE ON EQUIPMENT WHICH IS NOT SUPPLIED BY DEC.
        NLIST
        INCLUDE EQUATES.SRC
        INCLUDE EXTERNAL.SRC
        LIST

        RSECT   PRCODE
        INCLUDE MACRO.SRC

        INTERN  TIM_SERV
        INTERN  UART_DIAGS

        EXTERN  CHANAD,CHANADR1,RX_ERROR
        EXTERN  TABLE
        EXTERN  END_TABLE

        PAGE
```

```
;**************************************************************
;                                                             *
;                       TIMER_SERV                            *
;                                                             *
;**************************************************************

TIM_SERV:

TI_0:           PUSH    ACC                     ;NO RE, SAVE ACC.

                INC     COUNT                   ;UPDATE INTERRUPT COUNT.
                MOV     A,COUNT                 ;GET TO ACC.
                CJNE    A,#04H,SERV_0           ;WAIT FOR 4 INTR.

                SETB    FLAG_1                  ;THEN SET USER FLAG.
                MOV     IE,#ZERO                ;DISABLE ALL INTERRUPTS.

SERV_0:         POP     ACC                     ;RETREIVE ACC.

                RETI                            ;RETURN.

        SUBTTL  UART_DIAGS
        PAGE

UART_DIAGS:
        PUSH    ACC
        PUSH    DPL
        PUSH    DPH
        PUSH    PSW
        MOV     PSW,#BANK_1             ; Set up the int. routine to use reg. bank 1

READ_SUM:                               ; Read the summary register
        MOV     DPTR,#INT_SUM_REG
        MOVX    A,@DPTR                 ; Read the interrupt summary register
        JB      ACC.7,10$               ; If interrupt is from DC349, then continue
        LJMP    INTR_ERROR              ; Indicate an unsolicited error

10$:    RRC     A                       ; Shift the lower bit out into the carry flag
        ANL     A,#0FH                  ; Mask out everything except for the port #
        MOV     R7,A                    ; Save the channel number in R7

        XRL     A,BNKOR7                ; Error if the current channel does not equal reg 7 of bank 0
        JZ      5$                      ; OK, continue
        SJMP    INTR_ERROR

5$:     JNC     RX_DIAGS                ; If carry is not set, then receive a character
        LJMP    TX_DIAGS                ; Else, transmit a character

RX_DIAGS:
        INC     R1                      ; Increment the int. routine table pointer
        CJNE    R1,#TABLE+END_TABLE-1H,10$ ; IS THIS THE LAST FOR THE CHANNEL?
```

```
        MOV     BNKOR3,#0AAH            ; Yes, set the indicator flag for end of channel test
10$:    MOV     DPH,#ZERO
        MOV     DPL,R1                  ; Current data pattern to compare against
        CLR     A
        MOVC    A,@A+DPTR
        MOV     R4,A                    ; Save the byte in register 4
15$:    MOV     DPTR,#BASE_STATUS       ; Read the status for the byte received
        LCALL   CHANAD
        MOVX    A,@DPTR
                                        ; Check for errors
        JNB     ACC.5,20$               ; Framing error?
        ERRORA  15$,40$                 ; Yes, If manufacturing mode, keep reading the status reg
20$:    JNB     ACC.4,30$               ; Parity error?
        ERRORA  15$,40$                 ; Yes
30$:    JNB     ACC.3,40$               ; Overrun error?
        ERRORA  15$,40$                 ; Yes

40$:    MOV     DPTR,#BASE_RX           ; Set up to read the data byte
        LCALL   CHANAD
        MOVX    A,@DPTR                 ; Read the data byte
        XRL     A,R4                    ; Was it the byte that was expected?
        JZ      DIAG_INTR_RET
        SETB    ERROR_FLAG
        CLR     PASS_FAIL

DIAG_INTR_RET:
        POP     PSW                     ; Restore the register bank
        POP     DPH
        POP     DPL
        POP     ACC
        RETI
        PAGE

TX_DIAGS:
        SETB    TX_INTR                 ; Indicate we got an interrupt

; Turn off the interrupt for this channel before leaving
        MOV     P2,#IO_PAGE             ; Upper addr. for the DC349
        MOV     R1,#LOW BASE_CMD_R      ; Address to read the command register
        LCALL   CHANADR1                ; Adjust it to the appropriate channel

        MOVX    A,@R1                   ; Read the command register

        ANL     A,#NOT  TXIE_BIT        ; Clear the transmitter interrupt enable bit
        MOV     R1,#LOW BASE_CMD_W      ; Address to write the command register back
        LCALL   CHANADR1                ; Adjust it for this channel
        MOVX    @R1,A                   ; Write the register
        SJMP    DIAG_INTR_RET

INTR_[illegible]:
        MOV     [illegible]
```

```
MOV     A,#UNSOL_INTR
MOVX    @DPTR,A                  ; Unsolicited interrupt error code
CLR     PASS_FAIL                ; Clear the pass/fail bit to indicate failure
SETB    ERROR_FLAG               ; Indicate an error was found
JB      MAN_MODE,DIAG_INTR_RET   ; If not manuf. mode, return
LJMP    READ_SUM                 ; Otherwise loop on reading the status register

END

DDDDDDDDDD    4444444444444444444444444444444444444444444444444444444444444444444444444444444444444444444444444    DDDDDDDDDD
DDDDDDDDDD    44444444444444444444444  Digital Equipment Corporation - VAX/VMS Version V4.5  4444444444444444444444    DDDDDDDDDD
DDDDDDDDDD    4444444444444444444444444444444444444444444444444444444444444444444444444444444444444444444444444    DDDDDDDDDD

                 N   N EEEEE W   W M   M  AAA  N   N
                 N   N E     W   W MM MM A   A N   N
                 NN  N E     W   W M M M A   A NN  N
                 N N N EEEE  W   W M   M A   A N N N
                 N  NN E     W W W M   M AAAAA N  NN
                 N   N E     WW WW M   M A   A N   N
                 N   N EEEEE W   W M   M A   A N   N

             DDDDDDDD    IIIIII      AAAAAA      GGGGGGGG    SSSSSSSS
             DDDDDDDD    IIIIII      AAAAAA      GGGGGGGG    SSSSSSSS
             DD      DD    II      AA      AA  GG          SS
             DD      DD    II      AA      AA  GG          SS
             DD      DD    II      AA      AA  GG          SS
             DD      DD    II      AA      AA  GG          SS
             DD      DD    II      AA      AA  GG            SSSSSS
             DD      DD    II      AA      AA  GG            SSSSSS
             DD      DD    II      AAAAAAAAAA  GG    GGGGGG        SS
             DD      DD    II      AAAAAAAAAA  GG    GGGGGG        SS
             DD      DD    II      AA      AA  GG        GG        SS
             DD      DD    II      AA      AA  GG        GG        SS
             DDDDDDDD    IIIIII    AA      AA    GGGGGG    SSSSSSSS
             DDDDDDDD    IIIIII    AA      AA    GGGGGG    SSSSSSSS

                 SSSSSSSS  RRRRRRRR      CCCCCCCC      ::::      222222
                 SSSSSSSS  RRRRRRRR      CCCCCCCC      ::::      222222
               SS          RR      RR  CC              ::::    22      22
               SS          RR      RR  CC              ::::    22      22
               SS          RR      RR  CC                              22
               SS          RR      RR  CC                              22
                 SSSSSS    RRRRRRRR    CC              ::::          22
                 SSSSSS    RRRRRRRR    CC              ::::          22
                       SS  RR    RR    CC              ::::        22
                       SS  RR    RR    CC              ::::        22
....                   SS  RR      RR  CC                ::      22
....                   SS  RR      RR  CC                ::      22
....             SSSSSSSS  RR      RR    CCCCCCCC      ::      2222222222
....             SSSSSSSS  RR      RR    CCCCCCCC      ::      2222222222
```

```
File _S12$DUA14:[RSMSS.DOS]DIAGS.SRC;2 (1061,131,0), last revised on 10-AUG-1987 11:12, is a 82 block sequential file owned by UIC
[DOC,RSMSQUEUE].  The records are variable length with implied (CR) carriage control.  The longest record is 0 bytes.

Job DIAGINTS (371) queued to SYSSPRINT on 10-AUG-1987 11:12 by user NEWMAN, UIC [DOC,RSMSQUEUE], under account   at priority 100,
started on printer _MILESSLPC0: on 10-AUG-1987 11:12 from queue SYSSPRINT.

DDDDDDDDDD    4444444444444444444444444444444444444444444444444444444444444444444444444444444444444444444444444444    DDDDDDDDDD
DDDDDDDDDD    44444444444444444444444  Digital Equipment Corporation - VAX/VMS Version V4.5  44444444444444444444444    DDDDDDDDDD
DDDDDDDDDD    4444444444444444444444444444444444444444444444444444444444444444444444444444444444444444444444444444    DDDDDDDDDD
                VAX/VMS   VAX/VMS   VAX/VMS   VAX/VMS   VAX/VMS   VAX/VMS   VAX/VMS   VAX/VMS   VAX/VMS   VAX/VMS   VAX/VMS   VAX/VMS
           VAX/VMS   VAX/VMS   VAX/VMS   VAX/VMS   VAX/VMS   VAX/VMS   VAX/VMS   VAX/VMS   VAX/VMS   VAX/VMS   VAX/VMS   VAX/VMS
                VAX/VMS   VAX/VMS   VAX/VMS   VAX/VMS   VAX/VMS   VAX/VMS   VAX/VMS   VAX/VMS   VAX/VMS   VAX/VMS   VAX/VMS   VAX/VMS
           VAX/VMS   VAX/VMS   VAX/VMS   VAX/VMS   VAX/VMS   VAX/VMS   VAX/VMS   VAX/VMS   VAX/VMS   VAX/VMS   VAX/VMS   VAX/VMS
                VAX/VMS   VAX/VMS   VAX/VMS   VAX/VMS   VAX/VMS   VAX/VMS   VAX/VMS   VAX/VMS   VAX/VMS   VAX/VMS   VAX/VMS   VAX/VMS

DDDDDDDDDD    4444444444444444444444444444444444444444444444444444444444444444444444444444444444444444444444444444    DDDDDDDDDD
DDDDDDDDDD    44444444444444444444444  Digital Equipment Corporation - VAX/VMS Version V4.5  44444444444444444444444    DDDDDDDDDD
DDDDDDDDDD    4444444444444444444444444444444444444444444444444444444444444444444444444444444444444444444444444444    DDDDDDDDDD
                                                  N   N  EEEEE  W   W  M   M   AAA   N   N
                                                  N   N  E      W   W  MM MM  A   A  N   N
                                                  NN  N  E      W   W  M M M  A   A  NN  N
                                                  N N N  EEEE   W   W  M   M  A   A  N N N
                                                  N  NN  E      W W W  M   M  AAAAA  N  NN
                                                  N   N  E      WW WW  M   M  A   A  N   N
                                                  N   N  EEEEE  W   W  M   M  A   A  N   N

                                        DDDDDDDD      IIIIII      AAAAAA      GGGGGGGG    SSSSSSSS
                                        DDDDDDDD      IIIIII      AAAAAA      GGGGGGGG    SSSSSSSS
                                        DD      DD      II      AA      AA  GG          SS
                                        DD      DD      II      AA      AA  GG          SS
                                        DD      DD      II      AA      AA  GG          SS
                                        DD      DD      II      AA      AA  GG          SS
                                        DD      DD      II      AA      AA  GG            SSSSSS
                                        DD      DD      II      AA      AA  GG            SSSSSS
                                        DD      DD      II      AAAAAAAAAA  GG    GGGGGG        SS
                                        DD      DD      II      AAAAAAAAAA  GG    GGGGGG        SS
                                        DD      DD      II      AA      AA  GG        GG        SS
                                        DD      DD      II      AA      AA  GG        GG        SS
                                        DDDDDDDD      IIIIII    AA      AA    GGGGGG    SSSSSSSS
                                        DDDDDDDD      IIIIII    AA      AA    GGGGGG    SSSSSSSS

                                          SSSSSSSS  RRRRRRRR      CCCCCCCC      ;;;;      222222
                                          SSSSSSSS  RRRRRRRR      CCCCCCCC      ;;;;      222222
                                        SS          RR      RR  CC              ;;;;    22      22
                                        SS          RR      RR  CC              ;;;;    22      22
                                        SS          RR      RR  CC                              22
                                        SS          RR      RR  CC                              22
                                          SSSSSS    RRRRRRRR    CC              ;;;;          22
                                          SSSSSS    RRRRRRRR    CC              ;;;;          22
                                                SS  RR  RR      CC              ;;;;        22
                                                SS  RR  RR      CC              ;;;;        22
                                 ....           SS  RR    RR    CC               ;;       22
                                 ....           SS  RR    RR    CC               ;;       22
                                 ....   SSSSSSSS    RR      RR    CCCCCCCC      ;;      2222222222
```

```
File _S12SOUA14:[RSMSS.DRS]DIAGS.SRC;2 (1061,131,0), last revised on 10-AUG-1987 11:12, is a 82 block sequential file owned by UIC
[DOC,RSMSQUEUE]. The records are variable length with implied (CR) carriage control. The longest record is 0 bytes.

Job DIAGINTS (871) queued to SYS$PRINT on 10-AUG-1987 11:12 by user NEWMAN, UIC [DOC,RSMSQUEUE], under account   at priority 100,
started on printer _MILESSLPC0: on 10-AUG-1987 11:12 from queue SYS$PRINT.

DDDDDDDDDD    44444444444444444444444444444444444444444444444444444444444444444444444444444444444444444444    DDDDDDDDDD
DDDDDDDDDD    4444444444444444444444444  Digital Equipment Corporation - VAX/VMS Version V4.5  4444444444444444444444444    DDDDDDDDDD
DDDDDDDDDD    44444444444444444444444444444444444444444444444444444444444444444444444444444444444444444444    DDDDDDDDDD

        nolist
        title POWERUP DIAGNOSTICS MAIN
        space 5

;
; COPYRIGHT (C) 1986
; DIGITAL EQUIPMENT CORPORATION, MAYNARD, MASSACHUSETTS 01754
;
; THIS SOFTWARE IS FURNISHED  UNDER A LICENSE FOR USE ONLY ON A SINGLE
; COMPUTER  SYSTEM AND  MAY BE  COPIED ONLY WITH  THE INCLUSION OF THE
; ABOVE COPYRIGHT NOTICE.  THIS SOFTWARE, OR ANY OTHER COPIES THEREOF,
; MAY NOT BE PROVIDED OR  OTHERWISE MADE AVAILABLE TO ANY OTHER PERSON
; EXCEPT FOR USE ON SUCH SYSTEM AND TO ONE WHO AGREES TO THESE LICENSE
; TERMS.  TITLE TO AND  OWNERSHIP OF THE  SOFTWARE  SHALL AT ALL TIMES
; REMAIN IN DEC.
;
; THE INFORMATION IN THIS SOFTWARE IS SUBJECT TO CHANGE WITHOUT NOTICE
; AND SHOULD  NOT BE CONSTRUED  AS A COMMITMENT  BY DIGITAL  EQUIPMENT
; CORPORATION.
;
; DEC ASSUMES  NO  RESPONSIBILITY  FOR  THE USE OR  RELIABILITY OF ITS
; SOFTWARE ON EQUIPMENT WHICH IS NOT SUPPLIED BY DEC.
        NLIST                           ; Don't list everything out here
        include         EXTERNAL.SRC
        INCLUDE         EQUATES.SRC
        LIST
        NLIST
        page


        SUBTTL  START
        EXTERN  TIM_SERV,UART_SERVICE,MOVE_A,CHANAD,INIT,UART_DIAGS
        EXTERN  END_CODE,ENABLE_TX,RX_ERROR,TIMER0_INT,TIMER1_INT,CHANADR1
        EXTERN  WRITE_COMMAND

;**********************************************************************;
;*M                                                                   *;
;*      Jump Table                                                    *;
;*                                                                    *;
;**********************************************************************;

;;      SECT    CODE,ABS,LOC=0H ;
```

```
RSECT   PRCODE
include         MACRO.SRC

subttl  INTPT VECTORS
page
space 1
;
;------------------------------------------------------------------
;
;       interrupt vectors and branch instructions
;
;------------------------------------------------------------------
;
;       sect    code,abs, loc = 0000h
;------------------------------------------------------------------
        org     0000h                   ; reset branch location
        ljmp    PDIAGT                  ; to start the diagnostics
;------------------------------------------------------------------
        org     0003h                   ; external interrupt 0
        jb      diag_test,10$           ; Diagnostics, use the diagnotic uart routine
        LJMP    UART_SERVICE            ; service routine for the DC349 octauart
;------------------------------------------------------------------
        org     000bh                   ; timer 0 overflow in   rupt
        JB      DIAG_TEST,20$           ; Diagnostics, go to   g intr. handler
        LJMP    TIMERO_INT              ; Timer handler for th operational code
;------------------------------------------------------------------
        org     0013h                   ; external interrupt 1
        LJMP    $                       ; No external interrupt 1
;------------------------------------------------------------------
        org     001bh                   ; timer 1 overflow interrupt
        JB      DIAG_TEST,20$           ; Diagnostics, go to diag intr. handler
        LJMP    TIMER1_INT              ; Timer handler for the operational code
;------------------------------------------------------------------
        org     0023h                   ; serial i/o interrupt
        SJMP    $                       ; Not used
;------------------------------------------------------------------
;
;       firmware interrupt routines
10$:    LJMP    UART_DIAGS      ; Uart routine for the diagnostics
20$:    LJMP    TIM_SERV        ;TEMP
;;30$:  ljmp    swintr
40$:    ljmp    TIM_SERV        ;TEMP
;;50$:  ljmp    uarts

TABLE:
        DB      06DH
        DB      006H
        DB      086H
        DB      0C3H
        DB      03CH
        DB      055H
```

```
        DB      0AAH
END_TABLE       EQU     $-TABLE

FIRMWARE_REV:   DB      REV_LEVEL       ; Firmware revision
MASK:   DB      55H             ; Used for the DTPR test

DC_TST_PTRNS:                   ; Test patters for the DC349 registers
        DB      000H,055H,0AAH
        DB      0A5H,0AAH,055H

BAUD_TO_TIME:                   ; Table of time out values for baud rates from 50 to 19200
        DB      0FFH,0FFH,006H,0AAH,080H,040H,020H,C1CH
        DB      00CH,00AH,008H,006H,004H,002H,002H,002H

        subttl  PDIAGT
        page
;**********************************************************************
;*                                                                    *
;* Name                 :  POWERUP_DIAGNOSTICS -- MAIN               *
;* Purpose              :  To run a sequence of tests during powerup or *
;*                         at the time of switch reset cr by Host    *
;*                         command to initialise the system.         *
;* Date                 :  1-JUN-86                                   *
;* Input                :  Port 1 pin 7 - Low = Manufacturing mode   *
;* Output               :                                             *
;* Called By            :                                             *
;* Variables Changed    :                                             *
;* Calls                :                                             *
;* Resources used       :                                             *
;* Reference            :  Diagnostics functional specifications     *
;**********************************************************************

        page
        subttl DIAGS
        page
        space 3

        INTERN  PDIAGT,BAUD_TO_TIME
        INTERN  TABLE
        INTERN  END_TABLE


        page
        space 3
        subttl  PDIAGT

PDIAGT:
        CLR     PASS_FAIL               ; Assume failure till it passes
        CLR     EA                      ; disable all interrupts
        CLR     RS1                     ; register bank 0 is
        CLR     RS0                     ; selected
```

```
        CLR     A
        MOV     DPTR,#DIAG_REG          ; Load led address
        MOVX    @DPTR,A                 ; Clear the LED's
                                        ; that diag. is running
        MOV     ERCODE,#0h              ; set no error
        CLR     ERROR_FLAG              ; Make sure the error flag is cleared
        SETB    DIAG_TEST               ; Indicate that we are in diagnostics

        JB      MAN_MODE,ACC_TEST       ; If it is not man. mode, go start testing
        MOV     DPTR,#FUNCT_REG         ; Else set the function register to red
        MOVX    @DPTR,A                 ; and then start testing

        subttl  ACC_TEST
        page

;*****************************************************************
;                                                                *
;       NAME: ACC_TEST                                           *
;                                                                *
;  THIS MODULE TESTS THE ACCUMULATOR REGISTER USING THE FOLLOW - *
;  ING BINARY PATTERNS:                                          *
;                                                                *
;                 - 00000000                                     *
;                 - 01010101                                     *
;                 - 10101010                                     *
;                 - 11111111                                     *
;                                                                *
;*****************************************************************

ACC_TEST:
                MOV     A,#I_8031_ERROR         ; LED pattern for the 8031 tests(assumed working for now)
                MOV     DPTR,#DIAG_REG          ; Address of the Diagnostic reg
                MOVX    @DPTR,A                 ; Light the LED's

                MOV     A,#ZERO                 ;CLEAR THE ACCUMULATOR.
                CJNE    A,#ZERO,ACC_ERR         ;OK?? - No loop forever
ACC_1:          MOV     A,#FILL                 ;YES,..SET ACCUMULATOR TO FF.
                CJNE    A,#FILL,ACC_ERR         ;OK?? - No loop forever
ACC_2:          MOV     A,#TP_1                 ;YES...PATTERN 1 TO ACC.
                CJNE    A,#TP_1,ACC_ERR         ;OK?? - No loop forever
ACC_3:          MOV     A,#TP_2                 ;YES...PATTERN 2 TO ACC.
                CJNE    A,#TP_2,ACC_ERR         ;OK?? - No loop forever
                SJMP    B_TEST                  ; Yes, end of ACC_TEST

ACC_ERR:        CLR     PASS_FAIL               ; Error was encountered
                SJMP    $                       ; Loop forever

        subttl  B_TEST
        CLR     RS1                     ; register bank 0 is
        CLR     RS0                     ; selected
```

```
        CLR     A
        MOV     DPTR,#DIAG_REG                  ; load led aderess
        MOVX    @DPTR,A                         ; Clear the LED's
                                                ; that diag. is running
        MOV     ERCODE,#0h                      ; set no error
        CLR     ERROR_FLAG                      ; Make sure the error flag is cleared
        SETB    DIAG_TEST                       ; Indicate that we are in diagnostics

        JB      MAN_MODE,ACC_TEST               ; If it is not man. mode, go start testing
        MOV     DPTR,#FUNCT_REG                 ; Else set the function register to red
        MOVX    @DPTR,A                         ; and then start testing

        subttl  ACC_TEST
        page

;*****************************************************************
;                                                               *
;       NAME: ACC_TEST                                          *
;                                                               *
;  THIS MODULE TESTS THE ACCUMULATOR REGISTER USING THE FOLLOW - *
;  ING BINARY PATTERNS:                                         *
;                                                               *
;                       - 00000000                              *
;                       - 01010101                              *
;                       - 10101010                              *
;                       - 11111111                              *
;                                                               *
;*****************************************************************

ACC_TEST:
                MOV     A,#I_8031_ERROR         ; LED pattern for the 8031 tests(assumed working for now)
                MOV     DPTR,#DIAG_REG          ; Address of the Diagnostic reg
                MOVX    @DPTR,A                 ; Light the LED's

                MOV     A,#ZERO                 ;CLEAR THE ACCUMULATOR.
                CJNE    A,#ZERO,ACC_ERR         ;OK?? - No loop forever
ACC_1:          MOV     A,#FILL                 ;YES...SET ACCUMULATOR TO FF.
                CJNE    A,#FILL,ACC_ERR         ;OK?? - No loop forever
ACC_2:          MOV     A,#TP_1                 ;YES...PATTERN 1 TO ACC.
                CJNE    A,#TP_1,ACC_ERR         ;OK?? - No loop forever
ACC_3:          MOV     A,#TP_2                 ;YES...PATTERN 2 TO ACC.
                CJNE    A,#TP_2,ACC_ERR         ;OK?? - No loop forever
                SJMP    B_TEST                  ; Yes, end of ACC_TEST

ACC_ERR:        CLR     PASS_FAIL               ; Error was encountered
                SJMP    $                       ; Loop forever
        subttl  B_TEST
        PAGE
;*****************************************************************
;                                                               *
;                       B_TEST                                  *
```

```
;                                                                      *
;  THIS MODULE TESTS THE B REGISTER USING THE SAME PATTERNS AS         *
;  IN ACC_TEST. A MULTIPLICATION IS ALSO PERFORMED TO VERIFY           *
;  THIS REGISTER OPERATION.                                            *


;                                                                      *
;  PARAMETER(S): LED_STATUS - CURRENT STATE OF THE LEDS.               *
;                                                                      *
;***********************************************************************

B_TEST:
            MOV     B,#ZERO              ; Zero the register.
            MOV     A,B                  ; Get b contents.
            CJNE    A,#ZERO,B_ERR        ; Loop forever if not ok.
B_1:        MOV     B,#TP_1              ; Pattern 1 to b reg.
            MOV     A,B                  ; Get B.
            CJNE    A,#TP_1,B_ERR        ; Loop forever if not ok.
B_2:        MOV     B,#TP_2              ; Pattern 2 to B reg.
            MOV     A,B                  ; Get B.
            CJNE    A,#TP_2,B_ERR        ; Loop forever if not ok.
B_3:        MOV     A,#40H               ; Set ACC.
            MOV     B,#02H               ; Set B reg.
            MUL     AB                   ; Multiply A and B.
            CJNE    A,#80H,B_ERR         ; Loop forever if not ok.
            SJMP    PSW_TEST

B_ERR:      CLR     PASS_FAIL            ; An error was encountered
            SJMP    $                    ; Loop forever

*******************************************************************
                                                                  *
                        PSW_TEST                                  *
                                                                  *
THIS ROUTINE VERIFIES THE OPERATION OF THE PROCESSOR STATUS       *
WORD BY DIRECT MANIPULATION OF THE ADDRESS WITH DATA PATTERNS     *
AND INDIRECTLY BY USING VARIOUS INSTRUCTIONS THAT CHANGE THE      *
STATE OF THE SYSTEM FLAGS (CY,AC,OV,P,RS0,RS1).                   *
                                                                  *
*******************************************************************

TEST:       MOV     A,#ZERO              ;CLEAR PARITY FROM LAST.
            MOV     PSW,#ZERO            ;CLEAR PSW.
            MOV     A,PSW                ;GET CONTENTS OF PSW.
            CJNE    A,#ZERO,PSW_ERR      ;IF NOT ZERO, LOOP FOREVER
```

```
0:              MOV     PSW,#TP_1                 ;SET TO ALT 1'S AND 0'S.
                MOV     A,PSW                     ;GET CONTENTS OF PSW.
                SETB    ACC.0                     ;PUT BACK PARITY.
                CJNE    A,#TP_1,PSW_ERR           ;LOOP FOREVER IF NOT SAME.
1:              MOV     PSW,#TP_2                 ;ALTERNATE 1'S AND 0'S.
                MOV     A,PSW                     ;GET PSW CONTENTS.
                CJNE    A,#TP_2,PSW_ERR           ;LOOP FOREVER IF NOT SAME.
2:              CLR     C                         ;CLEAR THE CARRY.
                MOV     A,#0BFH                   ;ACC. = 10111111B.
                ADD     A,#81H                    ;ADD     10000001B.
                JNC     PSW_ERR                   ;LOOP FOREVER IF CARRY CLEAR.
3:              SETB    C                         ;SET THE CARRY.
                CLR     OV                        ;CLEAR OV FLAG.
                MOV     A,#07FH                   ;ACC. = 01111111B.
                ADD     A,#01H                    ;ADD     00000001B.
                JNB     OV,PSW_ERR                ;LOOP FOREVER IF OV CLEAR.
                JC      PSW_ERR                   ;LOOP FOREVER IF CARRY SET.
4:              CLR     AC                        ;CLEAR AC BIT.

                MOV     A,#0FH                    ;ACC. = 00001111B
                ADD     A,#01H                    ;ADD     00000001B.
                JNB     AC,PSW_ERR                ;LOOP FOREVER IF AC CLEAR.
PSW_5:          MOV     A,#0FH                    ;ACC. = 00001111B.
                JB      P,PSW_ERR                 ;LOOP FOREVER IF PARITY SET.
PSW_6:          SETB    C                         ;SET THE CARRY.
                SUBB    A,#ZERO                   ;SUBTRACT 1.
                JNB     P,PSW_ERR                 ;LOOP FOREVER IF PARITY CLEAR.
PSW_7:          SETB    PSW.4                     ;SELECT REG.....
                SETB    PSW.3                     ;... BANK 3.
                MOV     18H,#TP_1                 ;SET PAT IN R0.
                MOV     A,R0                      ;SEE IF R0 CORRECT.
                CJNE    A,#TP_1,PSW_ERR           ;LOOP FOREVER IF R0 WRONG.
PSW_8:          CLR     PSW.4                     ;SELECT REG ...
                CLR     PSW.3                     ;... BANK 0.
                MOV     00H,#TP_2                 ;SET PAT IN R0.
                MOV     A,R0                      ;SEE IF R0 CORRECT.
                CJNE    A,#TP_2,PSW_ERR           ;LOOP FOREVER IF R0 WRONG.
PSW_9:          MOV     00H,#ZERO                 ;CLEAR R0.
                MOV     A,R0                      ;CHECK R0.
                CJNE    A,#ZERO,PSW_ERR           ;LOOP FOREVER IF NOT CORRECT.
PSW_10:         MOV     00H,#TP_1                 ;SET R0.
                MOV     A,R0                      ;CHECK R0.
                CJNE    A,#TP_1,PSW_ERR           ;LOOP FOREVER IF NOT CORRECT.
                SJMP    RAM_TEST                  ; End of the PSW test

PSW_ERR:        CLR     PASS_FAIL                 ; An error was encountered
                SJMP    $                         ; Loop forever

        subttl  RAM_TEST
        PAGE
```

```
;*****************************************************************
;                                                                *
;                          RAM_TEST                              *
;                                                                *
;  THIS MODULE TEST THE INTERNAL DATA RAM (02H-7FH). COH AND     *
;  01H HAVE ALREADY BEEN VERIFIED. ZERO AND 2 ALTERNATING 1'S    *
;  0'S PATTERNS WERE USED. A WALKING "1" AND WALKING "0" TEST    *
;  TEST IS DONE AS WELL.                                         *
;                                                                *
;*****************************************************************
RAM_TEST:       MOV     R0,#BOT_IRAM            ;ADDRESS 00 TO R0.
RAM_0:          MOV     @R0,#ZERO               ;CLEAR ADDRESS.
                MOV     A,@R0                   ;GET CONTENTS INTO ACC.
                CJNE    A,#ZERO,RAM_ERR         ;LOOP FOREVER IF NOT OK.
                INC     R0                      ;GET NEXT ADDRESS.
                CJNE    R0,#TOP_IRAM+01H,RAM_0  ;LOOP IF NOT DONE.
                DEC     R0                      ;ADJUST ADDRESS POINTER.
RAM_1:          SETB    C                       ;WALK A "1".
                MOV     R1,#09H                 ;R1 IS BIT COUNTER.
RAM_2:          MOV     A,@R0                   ;GET CONTENTS OF @R0.
                RRC     A                       ;ROTATE BY ONE BIT.
                XCH     A,@R0                   ;UPDATE ADDRESS.
                DJNZ    R1,RAM_2                ;LOOP IF NOT DONE.
                JNC     RAM_ERR                 ;LOOP ERROR IF C=0.
                MOV     @R0,#TP_1               ;ELSE SET TO TP_1.
                DEC     R0                      ;DO NEXT ADDRESS.
                CJNE    R0,#BOT_IRAM-01H,RAM_1  ;LOOP IF NOT DONE.
                INC     R0                      ;ADJUST ADDRESS.
RAM_3:          MOV     A,@R0                   ;GET DATA IN ADDESS.
                CJNE    A,#TP_1,RAM_ERR         ;LOOP FOREVER IF NOT EQUAL.
                MOV     @R0,#TP_2               ;ELSE UPDATE TO TP_2.
                INC     R0                      ;GET NEXT ADDRESS.
                CJNE    R0,#TOP_IRAM+01H,RAM_3  ;LOOP IF NOT DONE.
                DEC     R0                      ;ADJUST ADDRESS.
RAM_4:          MOV     A,@R0                   ;GET DATA IN ADDRESS.
                CJNE    A,#TP_2,RAM_ERR         ;LOOP FOREVER IF DATA NOT EQUAL.
                MOV     @R0,#FILL               ;ELSE SET RAM ADDRESS.
                DEC     R0                      ;GET NEXT ADDRESS.
                CJNE    R0,#BOT_IRAM-01H,RAM_4  ;LOOP IF NOT DONE.
                INC     R0                      ;ADJUST ADDRESS.
RAM_5:          CLR     C                       ;WALK A "0".
                MOV     R1,#09H                 ;SET BIT COUNTER.
RAM_6:          MOV     A,@R0                   ;GET DATA IN ADDRESS.
                CJNE    A,#FILL,RAM_ERR         ;LOOP FOREVER IF NOT EQUAL.
RAM_7:          MOV     A,@R0                   ;GET DATA IN ADDRESS.
                RLC     A                       ;ROTATE LEFT.
                XCH     A,@R0                   ;UPDATE ADDRESS.
                DJNZ    R1,RAM_7                ;LOOP IF NOT DONE.
                JC      RAM_ERR                 ;LOOP FOREVER ERROR IF C=1.
                MOV     @R0,#ZERO               ;CLEAR ADDRESS.
```

```
                INC     R0                      ;GET NEXT ADDRESS.
                CJNE    R0,#TOP_IRAM+01H,RAM_5  ;LOOP IF NOT DONE.
                SJMP    D_REG_TEST              ; End of the internal RAM test

RAM_EPR:        CLR     PASS_FAIL               ; An error was encountered
                SJMP    $                       ; Loop forever

        SUBTTL D_REG_TEST
        PAGE

;*******************************************************************************
;
;       NAME:   D_REG_TEST
;
;       DESCRIPTION: This test will test for shorts and opens on the DIAGNOSTIC
;               register.
;
;       INPUT: NONE
;
;       OUTPUT: NONE
;
;*******************************************************************************

D_REG_TEST:
        MOV     P2,#HIGH DIAG_REG       ; High order address of the diagnostic register
        MOV     R0,#LOW DIAG_REG        ; Low order address of the diagnostic register
        MOV     DPTR,#TABLE             ; Addr. of a table of patterns
        MOV     R1,#END_TABLE           ; Length of the table

10$:    CLR     A                       ; Clear out the accumulator
        MOVC    A,@A+DPTR               ; Get the test byte from the table
        MOV     R2,A                    ; Save it in R2
        MOVX    @R0,A                   ; Send the byte to the register
        MOVX    A,@R0                   ; Read it back
        XRL     A,R2                    ; See if they are equal
        JZ      20$                     ; They are, continue

        CLR     PASS_FAIL               ; Indicate a failure
        MOV     ERCODE,#DIAG_REG_ERROR  ; Save the error code
        JB      MAN_MODE,END_DTEST      ; Not manufacturing mode, go to the end of the test
        SETB    ERROR_FLAG              ; It is man. mode, set the error bit
        SJMP    10$                     ; And loop on error

20$:    INC     DPTR                    ; Point to the next test pattern
        DJNZ    R1,10$                  ; Loop if we are not done with the table
END_DTEST:
        LOOPCHK D_REG_TEST              ; Check for looping conditions in manufacturing mode

        SUBTTL  FUNCT_REG_TEST
        PAGE
```

```
;;;;;;;;;;;;;;;;;;;;;;;;;;;;;;;;;;;;;;;;;;;;;;;;;;;;;;;;;;;;;;;;;;;;;;;;;;;
;
;       NAME:    FUNCT_REG_TEST
;
;       DESCRIPTION: This test will change the color of the function register
;                    with a time delay long enough for the user to see.
;
;                    It is temporarily placed in this location for the first
;                    proto build.
;;;;;;;;;;;;;;;;;;;;;;;;;;;;;;;;;;;;;;;;;;;;;;;;;;;;;;;;;;;;;;;;;;;;;;;;;;;

FUNCT_REG_TEST:
        MOV     DPTR,#DIAG_REG
        MOV     A,#0FFH                 ; Light all the diagnostic led's
        MOVX    @DPTR,A                 ; So the user can see if they are all lit

        MOV     DPTR,#FUNCT_REG         ; Address of the function register

        MOV     R3,#03                  ; Number of times to loop in this test
        MOV     R6,#YELLOW+1            ; Color to start with will be yellow
1$:     DEC     R6                      ; Color code will be 2-1-0
20$:    MOV     A,R6                    ; This is also the bit pattern to send to the MODE LED
        MOVX    @DPTR,A                 ; Send the byte out
        MOVX    A,@DPTR                 ; Read it in
        ANL     A,#03H                  ; Mask out the upper 6 bits (only interrested in 0 and 1)
        XRL     A,R6                    ; Compare the patterns
        JZ      2$                      ; Pattern was ok

        CLR     PASS_FAIL               ; Indicate an error occured
        MOV     ERCODE,#FUNCT_REG_ERR   ; Save the error code
        MOV     DPTR,#DIAG_REG          ; Write the error code to the LED's
        MOV     A,#FUNCT_REG_ERR        ; Error code for this test
        MOVX    @DPTR,A                 ; Write it
        MOV     DPTR,#FUNCT_REG         ; Restore the address of the function register
        JB      MAN_MODE,END_F_REG_TST  ; If it's not manufacturing mode, exit

        SETB    ERROR_FLAG              ; Set the bit to indicate an error
        SJMP    20$                     ; Else loop on the error

2$:     MOV     R0,#06H                 ; Count for a delay to see the MODE LED change color
3$:     MOV     R1,#0FFH                ; More of the count
4$:     MOV     R2,#0FFH                ; The final inner loop of the count
5$:     DJNZ    R2,5$                   ; Total delay is between .5 and .6 seconds
        DJNZ    R1,4$
        DJNZ    R0,3$
        DJNZ    R3,1$                   ; Finally, decrement the test pattern

END_F_REG_TST:
        LOOPCHK FUNCT_REG_TEST          ; Loop if we ever hit an error in Man. mode

        JNB     MAN_MODE,10$            ; If it's manufacturing mode, turn the LED red
```

```
        MOV     A,#YELLOW+1             ; It's not Manufacturing mode
        MOVX    @DPTR,A                 ; Turn the LED yellow (Yellow + 1 for compatibility w/old rev hardware)
        SJMP    20$                     ; Restore the diag register
10$:    MOV     A,#RED                  ; Red is for manufacturing mode
        MOVX    @DPTR,A
20$:    MOV     DPTR,#DIAG_REG          ; Address of the diagnostic register
        MOV     A,#I_8031_ERROR         ; Put the error code for an 8031 back in the leds
        MOVX    @DPTR,A

        SUBTTL  STACK_TEST
        PAGE

;************************************************************************
;                                                                       *
;                            STACK_TEST                                 *
;                                                                       *
;  THIS TEST VERIFIES THE OPERATION OF THE STACK POINTER BY             *
;  USING THE "PUSH" AND "POP" INSTRUCTIONS. THE REGISTER IS             *
;  ALSO MESSAGED DIRECTLY WITH DATA PATTERNS TO CHECK FOR               *
;  SHORTS AND OPEN PATHS.                                               *
;                                                                       *
;  THE STACK IS ALSO INITIALIZED TO THE END OF INTERNAL MEMORY.         *
;                                                                       *
;************************************************************************

STACK_TEST:     MOV     SP,#03H                 ;SET THE SP.
                PUSH    ACC                     ;INC THE SP.
                MOV     A,SP                    ;GET SP VALUE.
                CJNE    A,#03H+01H,STA_ERR      ;LOOP FOREVER IF NOT OK.
STA_0:          MOV     SP,#TP_1                ;PATTERN TO SP.
                POP     ACC                     ;DEC THE SP.
                MOV     A,SP                    ;READ IT.
                CJNE    A,#TP_1-01H,STA_ERR     ;LOOP FOREVER IF NOT OK.
STA_1:          MOV     SP,#2AH                 ;NEXT PATTERN TO SP.
                PUSH    ACC                     ;INC THE STACK.
                MOV     A,SP                    ;READ IT.
                CJNE    A,#2AH+01H,STA_ERR      ;LOOP FOREVER IF NOT OK.
STA_2:          MOV     SP,#SPS                 ;SET THE STACK.
                PUSH    ACC                     ;INC THE SP.
                MOV     A,SP                    ;GET SP.
                CJNE    A,#SPS+01H,STA_ERR      ;LOOP FOREVER IF NOT OK.
                POP     ACC                     ;DEC THE SP.
                MOV     A,SP                    ;GET SP.
                CJNE    A,#SPS,STA_ERR          ;LOOP FOREVER IF NOT OK.
                SJMP    ADDR_TEST               ; End of the stack test

STA_ERR:        CLR     PASS_FAIL               ; An error was encountered
                SJMP    $                       ; Loop forever

        subttl  ADDR_TEST
        PAGE
```

```
;***************************************************************
;                                                              *
;                          ADDR_TEST                           *
;                                                              *
;  THIS TEST VERIFIES THAT THE "DPL" AND "DPH" REGISTERS WORK   *
;  PROPERLY WHEN WRITTEN TO. ALTERNATING DATA PATTERNS ARE USED *
;  TO MAKE THE VERIFICATION. ONCE THESE REGISTERS ARE FOUND TO  *
;  BE OK, WE LOAD THESE REGISTERS WITH THE ADDRESS OF THE USER  *
;  TEST "MASK" DATA REGISTER IN PROGRAM MEMORY TO DETERMINE IF  *
;  THE CORRECT ADDRESS WAS ACCESSED USING THE FOLLOWING         *
;  INSTRUCTION:                                                 *
;                                                              *
;               MOVC    A,@A+DPTR                              *
;                                                              *
;  PARAMETER:   MASK    - PREDEFINED NUMBER = 55H               *
;                                                              *
;***************************************************************

ADDR_TEST:      CLR     ERROR_FLAG              ; Clear the error flag on entering this test.
                MOV     DPL,#ZERO               ;CLEAR ADDRESS.
                MOV     DPH,#ZERO               ;THIS ONE, TOO.
                MOV     R0,DPL                  ;GET DATA IN ADDRESS.
                MOV     R1,DPH                  ;HERE, TOO.
                CJNE    R0,#ZERO,ADDR_ERR       ;LOOP FOREVER IF NOT OK.
                CJNE    R1,#ZERO,ADDR_ERR       ;HERE, TOO.
ADDR_0:         MOV     DPL,#TP_1               ;SET DPL.
                MOV     DPH,#TP_1               ;SET DPH.
                MOV     R0,DPL                  ;GET CONTENTS.
                MOV     R1,DPH                  ;HER, TOO.
                CJNE    R0,#TP_1,ADDR_ERR       ;LOOP FOREVER IF NOT OK.
                CJNE    R1,#TP_1,ADDR_ERR       ;HERE, TOO.
ADDR_1:         MOV     DPL,#TP_2               ;SET DPL.
                MOV     DPH,#TP_2               ;SET DPH.
                MOV     R0,DPL                  ;GET CONTENTS.
                MOV     R1,DPH                  ;HERE, TOO.
                CJNE    R0,#TP_2,ADDR_ERR       ;LOOP FOREVER IF NOT OK.
                CJNE    R1,#TP_2,ADDR_ERR       ;HERE, TOO.
                ;
ADDR_3:         MOV     DPTR,#MASK              ;USE COUNT TO TEST.
                CLR     A                       ;NEED TO DO.
                MOVC    A,@A+DPTR               ;GET VALUE IN COUNT.
                XRL     A,#TP_1                 ; Compare the value
                JZ      ADDR_END                        ; It was ok
                CLR     PASS_FAIL               ; Indicate the error
                SETB    ERROR_FLAG              ; Set the error flag
                SJMP    ADDR_3                  ; And loop

                                                ; End of the addressing test
ADDR_END:       JB      ERROR_FLAG,ADDR_3       ; If there was an error loop on the data pointer
                SJMP    TIMER_TEST
```

```
ADDR_ERR:       CLR     PASS_FAIL               ; An error was encountered
                SJMP    $                       ; Loop forever

        SUBTTL  TIMER_TEST
        PAGE

;*************************************************************
;                                                            *
;                       TIMER_TEST                           *
;
;                       TIMER_TEST                      *
;                                                       *
;  THIS MODULE TEST BOTH TIMER_0 AND TIMER_1 USING INTERRUPTS.   *


;  THE TEST WILL LOOP FOREVER IF THE INTERRUPTS AREN'T RESPONDED *
;  TO; THEREFORE, THE LEDS WILL STAY ON INDICATING A COMPUTER    *
;  (8051) ERROR WHICH IS WHERE THE TIMERS RESIDE.                *
;  IN ADDITION THE "TH0","TL0","TH1", AND "TL1" REGISTERS ARE    *
;  TESTED FOR SHORTS OR OPENS.                                   *
;                                                                *
;  PARAMETERS:  NONE.                                            *
;                                                                *
;*****************************************************************

TIMER_TEST:     SETB    DIAG_TEST               ; Indicate we're in diagnostics
                CLR     TR0                     ;TURN OFF TIMER 0.
                CLR     TR1                     ;AND TIMER 1.
                MOV     IE,#ZERO                ;DISABLE ALL INTERRUPTS.
                MOV     TMOD,#00100010B         ;SET TIMERS FOR MODE 2.

TIM_0:          MOV     A,#ZERO                 ;SHIFT A ZERO PATTERN.
                CALL    MOVE_A                  ;DO SHIFT THRU TIMER REG.
                CJNE    A,#ZERO,TIM_ERR         ;LOOP FOREVER IF NOT OK.
TIM_1:          MOV     A,#TP_1         ;PUT PATTERN 1.
                CALL    MOVE_A                  ;SHIFT.
                CJNE    A,#TP_1,TIM_ERR         ;LOOP FOREVER IF NOT OK.
TIM_2:          MOV     A,#TP_2         ;PUT PATTERN 2.
                CALL    MOVE_A                  ;SHIFT.
                CJNE    A,#TP_2,TIM_ERR         ;LOOP FOREVER IF NOT OK.

                MOV     COUNT,#ZERO             ;ZERO THE COUNT.
                MOV     TH0,#0FEH               ;SET RE-LOAD VALUE.
                MOV     TL0,#0FEH               ;SET THIS. (Intr. after 2 ticks)
                CLR     FLAG_1                  ;CLEAR USER FLAG.
                SETB    IE.7                    ;ENABLE INTERRUPTS.
                SETB    IE.1                    ;ENABLE TIMER 0.
                SETB    TR0                     ;RUN TIMER 0.

                MOV     R0,#6                   ; Time out value
TIM_3:          JB      FLAG_1,10$              ; Got the Intr, continue
                DJNZ    R0,TIM_3                ; Wait for the intr
                SJMP    TIM_ERR                 ; Time out
```

```
10$:            CLR     TR0                     ; Turn off timer zero
                MOV     COUNT,#ZERO             ;RESET THE COUNT.
                MOV     TH1,#0FFH               ;SET RE-LOAD VALUE.
                MOV     TL1,#0FFH               ;SET THIS, TOO.
                CLR     FLAG_1                  ;CLEAR USER FLAG.
                SETB    IE.7                    ;ENABLE INTERRUPTS.
                SETB    IE.3                    ;ENABLE TIMER 1.
                SETB    TR1                     ;RUN TIMER 1.

                MOV     R0,#6                   ; Time out value
TIM_4:          JB      FLAG_1,20$              ; Got the intr.
                DJNZ    R0,TIM_4                ; Wait for the flag
                SJMP    TIM_ERR                 ; time out error

20$:            CLR     TR1
                SJMP    DRAMXT                  ; End of the timer test

TIM_ERR:        CLR     PASS_FAIL               ; An error was encountered
                SJMP    $                       ; Loop forever

        subttl  DRAMXT
        page
;*****************************************************************************
;
;       TITLE:  DRAMXT
;
;       DESCRIPTION: This routine will test the external RAM of the PR Box.
;                    It will do this in a 4 pass test.  The first pass will
;                    fill all of RAM with the pattern 55.  The second pass
;                    will read/compare, compliment, and write back the pattern
;                    AA.  The third pass will read/compare and clear memory.
;                    The fourth pass will compare memory to  zero, and do a
;                    walking one's pattern every 256 bytes.
;
;       INPUT:  NONE
;
;       OUTPUT: LED PATTERN FOR RAM TEST/ERROR
;
;*****************************************************************************

DRAMXT:                                 ; TEST EXTERNAL RAM

        MOV     A,#XRAM_ERROR           ; Put the error code for a ram test
        MOV     DPTR,#DIAG_REG          ; on the LED's
        MOVX    @DPTR,A

        MOV     DPTR, #LAST_RAM         ; Load address of the last 256 byte block
                                        ; of RAM

                                        ; loop for testing 256 bytes of block
                                        ; at a time
10$:
        MOV     A, #TP_1                ;Test pattern=55H (01010101)
        MOVX    @DPTR, A                ;Write test pattern to memory
```

```
        DJNZ    DPL, 10$                ; GO FROM XXOC,XXFF TO XX01 LOCATION
                                        ; next 256 bytes
        DEC     DPH
        MOV     A, DPH
        CJNE    A,#PAST_RAM, 10$                ; go for the next block in the

        INC     DPH                     ; Re-adjust the data pointer

20$:    MOVX    A, @DPTR                ; Read back to test
        XRL     A,#TP_1                 ; Check if r/w is good
        JZ      25$                     ; Compare was good
        ERROR   20$                     ; Error in RAP location

25$:    MOV     A,#TP_2                 ; Set up for the next pattern (OAA hex)
        MOVX    @DPTR, A                ; Write test pattern
        INC     DPTR                    ; Point to next RAM location
        MOV     A,DPL
        CJNE    A,#ZERO,20$             ; Check for the end of ram
        MOV     A,DPH
        CJNE    A,#HIGH TOP_RAM+1,20$ ; 1 byte past the end of ram?

        MOV     DPTR,#TOP_RAM           ; Re-adjust for the top of RAM

30$:    MOVX    A, @DPTR                ; Read back to test
        XRL     A,#TP_2                 ; Check if r/w is good
        JZ      35$                     ; Compare was good
        ERROR   30$                     ; Error in RAP location

35$:    MOVX    @DPTR,A                 ; Clear the memory location

        DJNZ    DPL,30$                 ; Point to the next location
        MOV     A,#1                    ; Every 256 bytes, do a walking ones test
40$:    MOV     R0,A                    ; Save the current pattern
        MOVX    @DPTR,A                 ; Write the pattern out to memory
        MOVX    A,@DPTR                 ; Read it back
        XRL     A,R0                    ; Error if patterns aren't the same
        JZ      45$                     ; Compare was good
        MOV     A,R0                    ; Restore the accumulator
        ERROR   40$                     ; Error in RAP location

45$:    MOV     A,R0                    ; Restore the accumulator
        RLC     A                       ; Check the next bit
        JNC     40$                     ; Not done yet
        MOVX    @DPTR,A                 ; Done, clear that memory location
        DEC     DPH                     ; Go do the next 256 byte block
        MOV     A,DPH
        CJNE    A,#PAST_RAM,30$         ; Unless we are done with all of ram

; Fourth and final pass - making sure memory was written with all zeros
        INC     DPH                     ; Re-adjust the data pointer
```

```
50$:    MOVX    A,@DPTR                 ; Read a byte to test
        XRL     A,#ZERO                 ; Check if the r/w is good
        JZ      55$                     ; Compare was good
        ERROR   50$                     ; Error in RAM location

55$:    INC     DPTR                    ; Point to next RAM location
        MOV     A,DPL
        CJNE    A,#ZERO,50$             ; Check for the end of ram
        MOV     A,DPH
        CJNE    A,#HIGH TOP_RAM+1,50$   ; 1 byte past the end of ram? Loop if not
; Done with ram test

                        ; Loop if in man. mode and there was an intermittant error
        JB      MAN_MODE,DROMT
        JNB     ERROR_FLAG,DROMT
        LJMP    DRAMXT


        subttl DROMT
        page

;**********************************************************************
;
;       NAME: DROMT
;
;       DESCRIPTION: This test will do a checksum on the ROM.
;
;       INPUT: NONE
;
;       OUTPUT: NONE
;
;**********************************************************************

DROMT:
        MOV     A,#ROM_ERROR            ; Pattern to light the LED's with
        MOV     DPTR,#DIAG_REG          ; Address of the LED's
        MOVX    @DPTR,A                 ; Light the LED's

        MOV     DPTR,#ZERO              ; Start with the beginning of rom
        MOV     R7,#ZERO                ; Start with sum = 0

10$:    CLR     A                       ; Index for fetching code bytes using the DPTR
        MOVC    A,@A+DPTR               ; Code fetches from 0000 to the end of code space

        ADD     A,R7                    ; Add in the partial sum
        RL      A                       ; Rotate the checsum (Bit 7 -> Bit 0)
        MOV     R7,A                    ; Save the partial sum
        INC     DPTR                    ; Increment to fetch the next code byte

        MOV     A,DPL                   ; Check for the end of code space
        CJNE    A,#LOW END_CODE,10$     ; Not at the end of code, add in the next byte
```

```
        MOV     A,DPH                   ; Low addr was equal, is the upper addr?
        CJNE    A,#HIGH END_CODE,10$    ; No, add in the next block of code bytes
                                        ; Yes, time to check the checksum
        MOV     DPTR,#CHKSUM_ADDR       ; Get the address of the checksum byte
        CLR     A                       ; Clear A to use as an index for a code byte fetch
        MOVC    A,@A+DPTR               ; Fetch the checksum from ROM

        CLR     C                       ; Clear the carry bit
        SUBB    A,R7                    ; Subtract the calculated checksum
        JZ      20$                     ; Passed, go to end of routine
        ERROR   DROMT                   ; If A<>zero then loop on error for man. mode

20:     LOOPCHK DROMT                   ; Check for intermittant error in Man. mode

        subttl  DC_REG_TEST
        PAGE
;;;;;;;;;;;;;;;;;;;;;;;;;;;;;;;;;;;;;;;;;;;;;;;;;;;;;;;;;;;;;;;;;;;;;;;;;;;;;;
;
;       NAME:   DC_REG_TEST
;
;       DESCRIPTION:    This test will READ/WRITE two sets of patterns to
;                       the command and mode registers of the DC349 octart.
;
;       INPUT:  None
;
;       OUTPUT: LED's contain test number
;;;;;;;;;;;;;;;;;;;;;;;;;;;;;;;;;;;;;;;;;;;;;;;;;;;;;;;;;;;;;;;;;;;;;;;;;;;;;;

DC_REG_TEST:                            ; Code start
        MOV     R7,#ZERO                ; 1st channel to look at
        MOV     P2,#IO_PAGE             ; P2 = upper address bits of the DC349
        MOV     R0,#LOW BASE_CMD_W      ; R0 = the write address of the 1st channels command register
        MOV     R1,#LOW BASE_CMD_R      ; R1 = the read address of the 1st channels command register

10$:    MOV     DPTR,#DIAG_REG
        MOV     A,#DC_REG_ERR           ; Base error number for the register test
        ADD     A,R7                    ; Indicate the appropriate channel test number
        MOVX    @DPTR,A                 ; Send it to the LEDs

        MOV     R4,#2                   ; Number of times to loop through for each channel
        MOV     DPTR,#DC_TST_PTRNS      ; DPTR points to the test pattern table for the DC349
20$:    MOV     A,#ZERO
        MOVC    A,@A+DPTR               ; Get the byte to init the command register
        MOVX    @R0,A                   ; Send it to the command register
MOV     R2,A                    ; Save it to compare against
MOVX    A,@R1                   ; Read it back
XRL     A,R2                    ; Compare the bytes
JZ      30$                     ; No error, continue
ERROR   20$                     ; Error, loop back to the command reg. if in Man. mode
```

```
30$:    DEC     R0                  ; Point to the Mode register write address
        DEC     R1                  ; Point to the Mode register read address
        INC     DPTR                ; Point to the data for Mode reg 1
40$:    MOV     A,#ZERO
        MOVC    A,@A+DPTR           ; Get the test byte
        MOVX    @R0,A               ; Send the byte to Mode reg 1
        MOV     R2,A                ; Save it for a comparison later
        INC     DPTR                ; Point to the data for Mode reg 2
        MOV     A,#ZERO
        MOVC    A,@A+DPTR           ; Get the byte
        MOVX    @R0,A               ; Send it (Page 1 and 2 are at the same address)
        MOV     R3,A                ; Save it for a comparison

        MOVX    A,@R1               ; Read back mode reg 1 (mode reg. pointer automatically cycles)
        XRL     A,R2                ; Compare it with the pattern that was sent
        JZ      50$                 ; No error, continue
        DEC     DPL                 ; Re- adjust the data pointer on error
        DEC     DPL                 ; Re- adjust the data pointer on error
        ERROR   20$                 ; Error in the MODE REGISTER (go back to this channels command reg)

50$:    MOVX    A,@R1               ; Read back mode reg 2 (mode reg. pointer automatically cycles)
        XRL     A,R3                ; Compare it with the pattern that was sent
        JZ      60$                 ; No error, continue
        DEC     DPL                 ; Re- adjust the data pointer on error
        DEC     DPL                 ; Re- adjust the data pointer on error
        ERROR   20$                 ; Error in the MODE REGISTER (go back to this channels command reg)

60$:    INC     DPTR                ; point to the next set of test patterns
        INC     R0                  ; Reset the pointers to the command reg
        INC     R1
        DJNZ    R4,20$              ; Send the next set of test patterns
                                    ; Finished with this channel, set up for the next one

        MOV     A,R0                ; Get the channel command reg write address
        ADD     A,#REG_OFFSET       ; Point to the next channel
        MOV     R0,A                ; Save it

        MOV     A,R1                ; Get the channel command reg read address
        ADD     A,#REG_OFFSET       ; Point to the next channel
        MOV     R1,A                ; Save it

        INC     R7                  ; Increment the channel number
        MOV     A,R7
        XRL     A,#08
        JZ      70$                 ; Finished the last channel, end
        LJMP    10$                 ; Not at the end, do the next channel

70$:    LOOPCHK DC_REG_TEST          ; If man. mode and an error was hit, loop

        SUBTTL  INTR_TEST
```

```
        PAGE
;;;;;;;;;;;;;;;;;;;;;;;;;;;;;;;;;;;;;;;;;;;;;;;;;;;;;;;;;;;;;;;;;;;;;;;;;;;;;;;;
;
;       TITLE:  INTR_TEST
;
;       DESCRIPTION:    This test will turn on the transmitter interrupt
;                       for all the channels.  This will test the ability for
;                       the DC349 to generate an interrupt, and the connection
;                       between the DC349 and the processor.
;
;                       Register 3 is used to count the current channel.
;
;       INPUT:  NONE
;
;       OUTPUT: ERROR CODE
;
;;;;;;;;;;;;;;;;;;;;;;;;;;;;;;;;;;;;;;;;;;;;;;;;;;;;;;;;;;;;;;;;;;;;;;;;;;;;;;;;

INTR_TEST:
        SETB    DIAG_TEST               ; Indicate diagnostic mode (was cleared in the ram test)

        CLR     TCON.0                  ; Int 0 set for level trigger
        MOV     IE,#081H                ; Enable 8031 int 0
        MOV     IP,#01                  ; Priority of int 0=1

        CLR     TX_INTR                 ; Clear the interrupt flag

        MOV     DPTR,#DIAG_REG          ; Address of the LED's
        MOV     A,#UNSOL_INTR           ; Error code for an unsolicited intr.
        MOVX    @DPTR,A

        JNB     TX_INTR,5$              ; Check to see if there was an unsolicited intr
        ERROR   INTR_TEST               ; There was, loop if man. mode

5$:     JB      ERROR_FLAG,40$          ; If an error was hit go to loopchk
        MOV     R7,#ZERO                ; R7 = the channel number to test
10$:    MOV     A,#DC_INT_ERR           ; Base error code for intr. errors
        ADD     A,R7                    ; Add in the appropriate channel test number
        MOVX    @DPTR,A                 ; Write it on the LEDs

15$:    ACALL   ENABLE_TX               ; Enable the transmitter interrupt (move R7 into R3)

        MOV     R2,#80H                 ; 512uSec time out
20$:    JB      TX_INTR,25$             ; Received the intr, make sure we don't get anymore
        DJNZ    R2,20$                  ; Count down the timer till time out or we get the intr
        ERROR   15$                     ; Time out - no interrupt

25$:    CLR     TX_INTR                 ; Clear the interrupt flag
        MOV     R2,0FFH                 ; Make sure we don't get any more ints for 1 Ms
30$:    JNB     TX_INTR,35$
```

```
        ERROR   15$                     ; We got intr, after we turned them off
35$:    DJNZ    R2,30$
                                        ; Time out, no more ints., great!
        JB      ERROR_FLAG,40$          ; See if we slipped through an unsolicited int.
        INC     R7                      ; Check out the next channel
        CJNE    R7,#8,10$               ; If we aren't done
                                        ; We're done
40$:    LOOPCHK INTR_TEST               ; Check for previous errors in manufacturing mode

        subttl  DC349_TEST
        PAGE
;;;;;;;;;;;;;;;;;;;;;;;;;;;;;;;;;;;;;;;;;;;;;;;;;;;;;;;;;;;;;;;;;;;;;;;;;;;;;;;;;;;;;;;;;;;;;;;
;
;       NAME:   DC349_TEST
;
;       DESCRIPTION:    This test will do an internal loopback test
;                       on the DC349 octart.
;
;       INPUT:  None
;
;       OUTPUT: LED's contain test number
;;;;;;;;;;;;;;;;;;;;;;;;;;;;;;;;;;;;;;;;;;;;;;;;;;;;;;;;;;;;;;;;;;;;;;;;;;;;;;;;;;;;;;;;;;;;;;;

DC_INIT:                                        ; Code start
        MOV     R7,#ZERO                ; Set up channel counter
DC_START:
        MOV     A,#DC349_ERROR          ; TEST IDENTIFIER
        ADD     A,R7                    ; Plus the channel under test
        MOV     DPTR,#DIAG_REG          ; Send the number to the LED's
        MOVX    @DPTR,A

        MOV     R3,#ZERO                ; Clear the done with channel indicator
        MOV     DPTR,#BASE_CMD_R
        LCALL   CHANAD
        MOVX    A,@DPTR                 ; Read cmd reg to reset the Mode reg ptr.
        MOV     DPTR,#BASE_MODE_W
        LCALL   CHANAD
        MOV     A,#05CH
        MOVX    @DPTR,A                 ; Set for 1 stop bit, odd parity,8 data bits
        MOV     A,#0FFH
        MOVX    @DPTR,A                 ; Set for 19.2K Tx/Rx
        MOV     A,#0A5H                 ; Local Loop,enable Tx/Rx, enable Rx ints
        CALL    WRITE_COMMAND           ; Send it to the command reg

LOOP_BACK:
        MOV     BNK1R1,#LOW TABLE-1
        MOV     R0,#LOW TABLE
        MOV     R2,#END_TABLE
LOOP:   MOV     DPTR,#BASE_STATUS
        LCALL   CHANAD
```

```
        MOV     R6,#FILL                ; Time out for ~1.5 mSec
WAIT:
        MOVX    A,@DPTR                 ; Read the status register
        JB      ACC.0,5$                ; And check to see if the transmitter is ready
        DJNZ    R6,WAIT                 ; Not ready yet, keep looking till the time out
        ERROR   DC_START                ; Time out, transmitter never became ready

5$:     CLR     A                       ; Transmitter is ready,
        MOV     DPH,#0
        MOV     DPL,R0
        MOVC    A,@A+DPTR               ; Get the byte to be sent
        MOV     DPTR,#BASE_TX
        LCALL   CHANAD                  ; Get the address for this channel, to send the byte
        MOVX    @DPTR,A                 ; Send the byte
        INC     R0                      ; Point to the next byte to send
        DJNZ    R2,LOOP                 ; Go send it if not at the end of the table
                                        ; Finished the table - see if we got everything OK
        MOV     R6,#FILL                ; Count for ~1.5 mSec
10$:    MOV     A,R3                    ; Get the flag register(flag is set in the Rx intr. when done w/the table)
        XRL     A,#0AAH                 ; Was the flag set?
        JZ      20$                     ; Yes, see if we should loop some more
        DJNZ    R6,10$                  ; Not yet, loop here till a time out
        ERROR   DC_START                ; Time out error, loop if in Man. mode

20$:    LOOPCHK DC_START                ; Re-do the same channel if error and man. mode
        JNB     ERROR_FLAG,30$          ; Not in Man Mode - Error? No, continue on the next channel
        LJMP    INIT                    ; Yes, go to init

30$:    INC     R7                      ; Set up for next Channel ##
        CJNE    R7,#HOST_PORT+1,DC_START ; If not done, go to DC_START

; Last channel was done, do the external test if in manufacturing mode

        JNB     MAN_MODE,EX_DC349_T     ; External test if in Manufacturing mode
        CLR     DIAG_TEST               ; Indicate, done w/ uart diags
        MOV     DPTR,#DIAG_REG          ; Address of the diagnostic register
        MOV     A,#ZERO
        MOVX    @DPTR,A                 ; Clear out the led's at the end of a good power-up

        LJMP    INIT                    ; Else jump to initialize for operational mode


        subttl  EX_DC349_T
        PAGE
;;;;;;;;;;;;;;;;;;;;;;;;;;;;;;;;;;;;;;;;;;;;;;;;;;;;;;;;;;;;;;;;;;;;;;;;;;;;;;;;;
;
;       NAME:   EX_DC349_T
;
;       DESCRIPTION:    This test will do an external loopback test
;                       on the DC349 octart.  Loopback connectors must be
;                       connected for this test to pass.
```

```
;
;       INPUT:  None
;
;       OUTPUT: LED's contain test number
;;;;;;;;;;;;;;;;;;;;;;;;;;;;;;;;;;;;;;;;;;;;;;;;;;;;;;;;;;;;;;;;;;;;;;;;;;;;;;;;;;;;;;;;;;;

EX_DC349_T:                                     ; Code start

        MOV     R7,#ZERO                ; Set up channel counter
EX_DC_START:
        MOV     A,#DC_X_ERROR           ; TEST IDENTIFIER
        ADD     A,R7                    ; Plus the channel under test
        MOV     DPTR,#DIAG_REG          ; Send the number to the LED's
        MOVX    @DPTR,A

        MOV     R3,#ZERO                ; Clear the done with channel indicator
                                        ; Set the channel up for normal mode
        MOV     A,#NORMAL_MODE          ; Normal mode (expect loopbacks),enable Tx/Rx, enable Rx ints
                                        ; All the other parameters have been set up
        CALL    WRITE_COMMAND           ; Send it out to the command reg

EX_LOOP_BACK:
        MOV     BNK1R1,#LOW TABLE-1     ; Init the table pointer for the int. routine
        MOV     R0,#LOW TABLE
        MOV     R2,#END_TABLE
EX_LOOP:
        MOV     DPTR,#BASE_STATUS
        LCALL   CHANAD

        MOV     R6,#FILL                        ; Time out of ~1.5 mSec
EX_WAIT:
        MOVX    A,@DPTR                         ; Read the status register
        JB      ACC.0,5$                        ; And continue if the transmitter is ready
        DJNZ    R6,EX_WAIT                      ; Not ready yet
        SETB    ERROR_FLAG                      ; Time out error
        CLR     PASS_FAIL                       ; Indicate an error occured
        SJMP    EX_DC_START                     ; Loop on error

5$:     CLR     A
        MOV     DPH,#0
        MOV     DPL,R0
        MOVC    A,@A+DPTR                       ; Get the byte to send
        MOV     DPTR,#BASE_TX                   ; Get addr. of the transmitter reg
        LCALL   CHANAD                          ; For this channel
        MOVX    @DPTR,A                         ; Send the byte
        INC     R0                              ; Increment the pointer to the data table
        DJNZ    R7,EX_LOOP                      ; Decrement the count for the number of bytes to send

        MOV     R6,#FILL                        ; Time out of 1.5msec
10$:    MOV     A,R3                            ; Get the end of channel indicator
```

```
        XRL     A,#0AAH                         ; Compare R3 to the end of channel flag
        JZ      20$                             ; Finished the channel
        DJNZ    R6,10$                          ; Not done yet
        SETB    ERROR_FLAG                      ; Time out error
        CLR     PASS_FAIL                       ; Indicate a failure occured
        SJMP    EX_DC_START                     ; Loop on this channel

20$:    JB      ERROR_FLAG,EX_DC_START          ; Loop on this channel on error
        INC     R7                              ; Set up for next Channel ##
        CJNE    R7,#HOST_PORT+1,EX_DC_START     ; Continue with next channel if not done

; Fall into the next test
; Last channel was done, go test the device present bits

        SUBTTL  DEV_PRSNT_TEST
        PAGE

;;;;;;;;;;;;;;;;;;;;;;;;;;;;;;;;;;;;;;;;;;;;;;;;;;;;;;;;;;;;;;;;;;;;;;;;;;;;;;
;
;       TITLE: DEV_PRSNT_TEST
;
;       DESCRIPTION:    This test is only run in manufacturing mode.  It
;                       tests the device present bits which are grounded
;                       at the connector.  There are device present bits
;                       on channels 1, 2, 3, 4, and 6.  It also tests the
;                       other DCD and DSR bits that are not used in the
;                       DC349.  They should be high in the status reg.
;
;       INPUT:  NONE
;
;       OUTPUT: Error code in the LED's
;
;;;;;;;;;;;;;;;;;;;;;;;;;;;;;;;;;;;;;;;;;;;;;;;;;;;;;;;;;;;;;;;;;;;;;;;;;;;;;;

DEV_PRSNT_TEST:
        MOV     P2,#IO_PAGE             ; Upper address of the DC349
        MOV     R7,#ZERO                ; First channel to be tested
        MOV     DPTR,#DIAG_REG          ; Address of where to write the error code

5$:     MOV     A,#DEV_PRSNT_ERR        ; Base error code for device present errors
        ADD     A,R7                    ; Add in the channel number
        MOVX    @DPTR,A                 ; Write it out to the LED's

        MOV     R1,#LOW BASE_STATUS     ; Base address of the status register
        CALL    CHANADR1                ; Get the right address for this channels status reg.
10$:    MOVX    A,@R1                   ; Read the status register
        ANL     A,#BIT7+BIT6            ; We only want to test the upper two bits
        CJNE    R7,#ZERO,20$            ; Is this channel zero?
        SJMP    40$                     ; Yes, both bit 7 and 6 should be high
20$:    CJNE    R7,#SPARE_PORT,30$      ; Is this the spare port?
```

```
        SJMP    40$                     ; Yes, both bit 7 and 6 should be high
30$:    CJNE    R7,#HOST_PORT,50$               ; Is this the host port??
40$:    CJNE    A,#BIT6+BIT7,55$        ; Yes, are both bit 7 and 6 high?
        SJMP    60$                     ; Yes, check for intermittents, and set up for the next channel

50$:    XRL     A,#BIT7                 ; Only bit 7 should be set for channels 1,2,3,4, and 6
        JZ      60$                     ; Channel is OK

55$:    ERROR   10$                     ; No device present, error

60$:    LOOPCHK 10$                     ; If there was an intermittent, stay on this channel
        INC     R7                      ; Next channel to check
        CJNE    R7,#HOST_PORT+1,5$      ; If this is not past the last channel then go test the next
                                        ; Otherwise, exit

END_DEV_TST:
        SETB    PASS_FAIL                       ; Finished all tests, set the pass indicator
        MOV     R6,#FILL                        ; Time out value
1$:     NOP                     ; Filler
        DJNZ    R6,1$                   ; Time out before starting test again

        LJMP    PDIAGT                  ; Last line tested, jump to the start of diagnostics

        END
```

Digital Equipment Corporation - VAX/VMS Version V4.5

NEWMAN

EQUATES

.SRC;1

File _S12$DUA14:[RSMSS.DOS]EQUATES.SRC;1 (1076,9,0), last revised on 10-AUG-1987 11:12, is a 16 block sequential file owned by UIC [DOC,RS-SOURCE]. The records are variable length with implied (CR) carriage control. The longest record is 0 bytes.

Job DIAGINTS (371) queued to SYS$PRINT on 10-AUG-1987 11:12 by user NEWMAN, UIC [DOC,RSMSQUEUE], under account at priority 100, started on printer _MILESSLPC0: on 10-AUG-1987 11:13 from queue SYS$PRINT.

VAX/VMS VAX/VMS VAX/VMS VAX/VMS VAX/VMS VAX/VMS VAX/VMS VAX/VMS VAX/VMS VAX/VMS VAX/VMS VAX/VMS
VAX/VMS VAX/VMS VAX/VMS VAX/VMS VAX/VMS VAX/VMS VAX/VMS VAX/VMS VAX/VMS VAX/VMS VAX/VMS VAX/VMS
VAX/VMS VAX/VMS VAX/VMS VAX/VMS VAX/VMS VAX/VMS VAX/VMS VAX/VMS VAX/VMS VAX/VMS VAX/VMS VAX/VMS
VAX/VMS VAX/VMS VAX/VMS VAX/VMS VAX/VMS VAX/VMS VAX/VMS VAX/VMS VAX/VMS VAX/VMS VAX/VMS VAX/VMS
VAX/VMS VAX/VMS VAX/VMS VAX/VMS VAX/VMS VAX/VMS VAX/VMS VAX/VMS VAX/VMS VAX/VMS VAX/VMS VAX/VMS

Digital Equipment Corporation - VAX/VMS Version V4.5

NEWMAN

EQUATES

SRC;1

```
File _S12SDUA14:[RSMSS.DOS]EQUATES.SRC;1 (1076,9,0), last revised on 10-AUG-1987 11:12, is a 16 block sequential file owned by UIC
[DOC,RSMSQUEUE]. The records are variable length with implied (CR) carriage control. The longest record is 0 bytes.

Job DIAGINTS (871) queued to SYSSPRINT on 10-AUG-1987 11:12 by user NEWMAN, UIC [DOC,RSMSQUEUE], under account   at priority 100,
started on printer _MILESSLPC0: on 10-AUG-1987 11:13 from queue SYSSPRINT.

EEEEEEEEEE   4444444444444444444444444444444444444444444444444444444444444444444444444444444444444444444444   EEEEEEEEEE
EEEEEEEEEE   444444444444444444444444  Digital Equipment Corporation - VAX/VMS Version V4.5  444444444444444444444444   EEEEEEEEEE
EEEEEEEEEE   4444444444444444444444444444444444444444444444444444444444444444444444444444444444444444444444   EEEEEEEEEE
        SUBTTL  EQUATES
;
; COPYRIGHT (C) 1986
; DIGITAL EQUIPMENT CORPORATION, MAYNARD, MASSACHUSETTS 01754
;
; THIS SOFTWARE IS FURNISHED  UNDER A LICENSE FOR USE ONLY ON A SINGLE
; COMPUTER  SYSTEM AND  MAY BE  COPIED ONLY WITH  THE INCLUSION OF THE
; ABOVE COPYRIGHT NOTICE.  THIS SOFTWARE, OR ANY OTHER COPIES THEREOF,
; MAY NOT BE PROVIDED OR  OTHERWISE MADE AVAILABLE TO ANY OTHER PERSON
; EXCEPT FOR USE ON SUCH SYSTEM AND TO ONE WHO AGREES TO THESE LICENSE
; TERMS.  TITLE TO AND  OWNERSHIP OF THE  SOFTWARE  SHALL AT ALL TIMES
; REMAIN IN DEC.
;
; THE INFORMATION IN THIS SOFTWARE IS SUBJECT TO CHANGE WITHOUT NOTICE
; AND SHOULD  NOT BE CONSTRUED  AS A COMMITMENT  BY DIGITAL  EQUIPMENT
; CORPORATION.
;
; DEC ASSUMES  NO  RESPONSIBILITY  FOR  THE USE OR  RELIABILITY OF ITS
; SOFTWARE ON EQUIPMENT WHICH IS NOT SUPPLIED BY DEC.
;****************************************************************************
;
;       File: EQUATES
;
;       Description:  This file contains the constants used in the PR Box
;                     diagnostics and  firmware.
;
;****************************************************************************


; The following values are used for access to the DC349 Octart.  Line 0 is used
; as a base address to access all of the other lines.  The offset between two
; adjacent lines registers is 8.

IO_PAGE          EQU     0F0H          ; Upper address of the i/o page
BASE_TX          EQU     0E000H        ; Address of line 0's transmitter holding register(write only)
BASE_RX          EQU     0E080H        ; Address of line 0's receiver buffer register(read only)
BASE_STATUS      EQU     0E081H        ; Address of line 0's status register (read only)
BASE_MODE_R      EQU     0E082H        ; Address of line 0's mode 1,2 reg.(read address)
BASE_MODE_W      EQU     0E002H        ; Address of line 0's mode 1,2 reg.(write address)
BASE_CMD_R       EQU     0E083H        ; Address of line 0's command reg. (write addr)
BASE_CMD_W       EQU     0E003H        ; Address of line 0's command reg. (read addr)
```

```
REG_OFFSET        EQU     00008H             ; The line # is multiplied by this and added
                                             ; to the base register, to get at the register
                                             ; for the appropriate line.

INT_SUM_REG       EQU     0E0ACH             ; Interrupt summary Register (RO)
DATA_SUM_REG_R    EQU     0E0ADH             ; Read addr. of the data set change summary reg.
DATA_SUM_REG_W    EQU     0E03DH             ; Write addr. of the data set change summary reg.

; The following values are hardware reference points

BOT_ROM           EQU     0000H
TOP_ROM           EQU     1FFFH
LAST_ROM          EQU     1F00H              ; Last 256 byte block in ROM
BOT_RAM           EQU     02000H
TOP_RAM           EQU     05FFFH
LAST_RAM          EQU     05F00H             ; Last 256 byte block in external ram
PAST_RAM          EQU     HIGH BOT_RAM-01H ; 1 byte below the upper byte of bot_ram

BOT_IRAM          EQU     3                  ; Bottom of internal ram +3
TOP_IRAM          EQU     7FH                ; Top of internal RAM

; Definitions for the diagnostic and mode registers

DIAG_REG          EQU     0E800H             ; Diagnostic LED register(R/W)
FUNCT_REG         EQU     0F000H             ; Function LED register (R/W)

YELLOW    EQU     2                          ; Function register colors
GREEN     EQU     1
RED       EQU     0

; Definitions for the error codes written to the led's

I_8031_ERROR      EQU     081H               ; Error encountered in the 8031
DIAG_REG_ERROR    EQU     082H               ; Error in the diagnostic register
FUNCT_REG_ERR     EQU     083H               ; Error in the function register
XRAM_ERROR        EQU     084H               ; Error in the external RAM
ROM_ERROR         EQU     085H               ; Error in the checksum of the ROM
UNSOL_INTR        EQU     086H               ; Received an unsolicited interrupt
DC_INT_ERR        EQU     088H               ; Error generating or receiving an interrupt (88 thru 8F hex)
DC_REG_ERR        EQU     090H               ; Error in the DC349 registers (codes 90H to 97H indicate channel number)
DC349_ERROR       EQU     098H               ; Error in the local loopback of the dc349 (98 thru 9F hex)
DC_X_ERROR        EQU     0A0H               ; Error in the external loopback for the dc349 (A0 thru A7 hex)
DEV_PRSNT_ERR     EQU     0A9H               ; Base error in the device present hardware (CHANNELS 1,2,3,4,6 ARE TESTED)
                                             ; Error codes actually used are 0A9H,0AAH,0ABH,0ACH,0AEH

HOST_GONE         EQU     040H               ; Reported in operational mode if the host did not
                                             ; ACK/NACK a packet in the appropriate timer

; Error codes for the system error packet
BAD_CMD_ERR       EQU     01H                ; Bad command error code
QUE_OVERFLOW_ERR EQU      02H                ; Queue overflow error
```

```
; Test naterns  and useful equates

ZERO      EQU     00                         ; Used to clear a location
TP_1      EQU     55H                        ; Test pattern to test even bits
TP_2      EQU     0AAH                       ; Test pattern to test odd bits
FILL      EQU     0FFH                       ; Fill all locations with ones
ONE       EQU     01                         ; Used to start a walking ones pattern

TIME_COUNT        EQU     0FA9BH             ; Value leaded into timer 0 to int. every 1.38mSec
T1_COUNT          EQU     0159FH             ; Value leaded into timer 1, to interrupt every 60 mSec

KA_COUNT          EQU     0A6H               ; Value counted down in timer 1, when 0, send the keep alive
                                             ; NOTE: 60 mSec times 0A6H (166d) is approx. 10 seconds
ACK_NACK_COUNT    EQU     0FH                ; Value counted down while waiting for an ack or a nack (Timer 0)
                                             ; NOTE: 1.38mSec times 0FH is approx. 20 mSec.
TEN_MS            EQU     08H                ; Value for 10mSec counted in timer0 (8*1.38mS=~11mS).
PORT_OFF          EQU     TEN_MS             ; Value counted down for the time to wait before
                                             ; turning on a port again

T0_MODE1          EQU     BIT0               ; Timer 0 Mode 1
T1_MODE1          EQU     BIT4               ; Timer 1 mode 1

STACK     EQU     40H

KA        EQU     27H                        ; Pattern for a keep alive
BD_CMD    EQU     9FH                        ; Pattern for a bad command response
ACK       EQU     06H                        ; Acknowledge byte
NACK      EQU     15H                        ; Not acknowledged -(retranmsit)
SOH       EQU     01H                        ; 1st byte expected on a new packet
MAX_DATA_PACK     EQU     06H                ; Max. amount of data bytes allowed in a packet
MAX_NACK          EQU     02H                ; Max. number of times we'll accept a
                                             ; NACK before trashing the msg.
REV_LEVEL         EQU     02H                ; Firmware revision for first release

; Bit definitions
BIT0      EQU     1H
BIT1      EQU     2H
BIT2      EQU     4H
BIT3      EQU     8H
BIT4      EQU     10H
BIT5      EQU     20H
BIT6      EQU     40H
BIT7      EQU     80H
TXIE_BIT EQU      BIT1                       ; Transmitter enable bit in the DC349 command register

ONE_STOP_BIT      EQU     BIT6               ; One stop bit, for mode register
EVEN_PARITY       EQU     BIT5+BIT4          ; Even parity, for mode register
ODD_PARITY        EQU     BIT4               ; Odd parity, for the mode register
NO_PARITY         EQU     ZERO               ; No parity, for the mode register

RERR_BIT EQU      BIT4                       ; Reset error bit in the command register of the DC349
```

```
NORMAL_MODE     EQU     25H             ; To enable the command register into normal
                                        ; mode, RxEN, Rx INT EN, TxEN

HDR_ERROR_BIT   EQU     BIT3            ; Error bit in the header byte sent to/received from the host
HDR_RPLY_BIT    EQU     BIT4            ; Reply bit in the header byte sent to/received from the host
HDR_KA_BIT      EQU     BIT5            ; Keep alive bit in the header byte
HDR_DC_BIT      EQU     BIT6            ; Device change bit in the header byte
HDR_SYS_ERR     EQU     BIT7            ; System error bit set in the header byte

BUFFER_LEN      EQU     04H             ; Number of pages in a channels buffer

BANK_3  EQU     18H                     ; Used to set the PSW to register bank #3
BANK_2  EQU     10H                     ; Used to set the PSW to register bank #2
BANK_1  EQU     08H                     ; Used to set the PSW to register bank #2

DIAGS_MERGED    EQU     1               ; Set to 1 when diags are merged
                                        ; Zero when they are not
REG00   EQU     0                       ; Direct address for register 0 bank 0

BNK3R7  DATA    1FH                     ; Direct access for R7 in bank 3
BNK3R3  DATA    1BH                     ; Direct access for R3 in bank 3
BNK2R7  DATA    17H                     ; Direct access for R7 in bank 2
BNK1R1  DATA    09H                     ; Direct access for R1 in bank 1
BNK0R1  DATA    01H                     ; Direct access for R1 in bank 0
BNK0R3  DATA    03H                     ; Direct access for R3 in bank 0
BNK0R7  DATA    07H                     ; Direct access for R7 in bank 0

CHKSUM_ADDR     EQU     TOP_ROM         ; The checksum is placed in the last location of ROM

HOST_PORT       EQU     7               ; Channel for the host port
SPARE_PORT      EQU     5               ; Channel for the spare port
CMD_PORT        EQU     8               ; Logical channel for commands sent to the PR Box
NUM_PORTS       EQU     8               ; Number of ports
NEXT_PTR        EQU     2               ; Nuber to adc to point to the next buffer address in a queue

; Data memory
COUNT   DATA    23                      ; Used in the timer interrupt routine


FFFFFFFFFF   4444444444444444444444444444444444444444444444444444444444444444444444444444444444444444444   FFFFFFFFFF
FFFFFFFFFF   44444444444444444444444  Digital Equipment Corporation - VAX/VMS Version V4.5  44444444444444444444444   FFFFFFFFFF
FFFFFFFFFF   4444444444444444444444444444444444444444444444444444444444444444444444444444444444444444444   FFFFFFFFFF
```

```
NEWMAN

EXTERNAL

....SRC;1

File _$12$DUA14:[RSMSS.DBS]EXTERNAL.SRC;1 (1081,38,0), last revised on 10-AUG-1987 11:14, is a 4 block sequential file owned by UIC
[DOC,RSMSQUEUE]. The records are variable length with implied (CR) carriage control. The longest record is 0 bytes.

Job DIAGINTS (571) queued to SYS$PRINT on 10-AUG-1987 11:12 by user NEWMAN, UIC [DOC,RSMSQUEUE], under account  at priority 100,
started on printer _MILF$$LPC0: on 10-AUG-1987 11:14 from queue SYS$PRINT.

FFFFFFFFFF    4444444444444444444444444444444444444444444444444444444444444444444444444444444444444444444444444    FFFFFFFFFF
FFFFFFFFFF    444444444444444444444444  Digital Equipment Corporation - VAX/VMS Version V4.5  444444444444444444444444    FFFFFFFFFF
FFFFFFFFFF    4444444444444444444444444444444444444444444444444444444444444444444444444444444444444444444444444    FFFFFFFFFF
```

```
VAX/VMS VAX/VMS VAX/VMS VAX/VMS VAX/VMS VAX/VMS VAX/VMS VAX/VMS VAX/VMS VAX/VMS VAX/VMS VAX/VMS VAX/VMS
    VAX/VMS VAX/VMS VAX/VMS VAX/VMS VAX/VMS VAX/VMS VAX/VMS VAX/VMS VAX/VMS VAX/VMS VAX/VMS VAX/VMS
VAX/VMS VAX/VMS VAX/VMS VAX/VMS VAX/VMS VAX/VMS VAX/VMS VAX/VMS VAX/VMS VAX/VMS VAX/VMS VAX/VMS
    VAX/VMS VAX/VMS VAX/VMS VAX/VMS VAX/VMS VAX/VMS VAX/VMS VAX/VMS VAX/VMS VAX/VMS VAX/VMS VAX/VMS
VAX/VMS VAX/VMS VAX/VMS VAX/VMS VAX/VMS VAX/VMS VAX/VMS VAX/VMS VAX/VMS VAX/VMS VAX/VMS VAX/VMS
    VAX/VMS VAX/VMS VAX/VMS VAX/VMS VAX/VMS VAX/VMS VAX/VMS VAX/VMS VAX/VMS VAX/VMS VAX/VMS VAX/VMS

FFFFFFFFF  4444444444444444444444444444444444444444444444444444444444444444444444444444444444  FFFFFFFFF
FFFFFFFFF  444444444444444444444444 Digital Equipment Corporation - VAX/VMS Version V4.5 4444444444444444444444444  FFFFFFFFF
FFFFFFFFF  4444444444444444444444444444444444444444444444444444444444444444444444444444444444  FFFFFFFFF

NEWMAN

EXTERNAL

.SRC;1
```

```
File _$12$DUA14:[RSMSS.DOS]EXTERNAL.SRC;1 (1081,38,0), last revised on 10-AUG-1987 11:14, is a 4 block sequential file owned by UIC
[DOC,RSMSQUEUE]. The records are variable length with implied (CR) carriage control. The longest record is 0 bytes.

Job DIAGINTS (371) queued to SYS$PRINT on 10-AUG-1987 11:12 by user NEWMAN, UIC [DOC,RSMSQUEUE], under account   at priority 100,
started on printer _MILES$LPCO: on 10-AUG-1987 11:14 from queue SYS$PRINT.

FFFFFFFFFF    44444444444444444444444444444444444444444444444444444444444444444444444444444444444444444444444444444    FFFFFFFFFF
FFFFFFFFFF    4444444444444444444444  Digital Equipment Corporation - VAX/VMS Version V4.5  4444444444444444444444    FFFFFFFFFF
FFFFFFFFFF    44444444444444444444444444444444444444444444444444444444444444444444444444444444444444444444444444444    FFFFFFFFFF

;
; COPYRIGHT (C) 1986
; DIGITAL EQUIPMENT CORPORATION, MAYNARD, MASSACHUSETTS 01754
;
; THIS SOFTWARE IS FURNISHED  UNDER A LICENSE FOR USE ONLY ON A SINGLE
; COMPUTER  SYSTEM AND  MAY BE  COPIED ONLY WITH  THE INCLUSION OF THE
; ABOVE COPYRIGHT NOTICE.  THIS SOFTWARE, OR ANY OTHER COPIES THEREOF,
; MAY NOT BE PROVIDED OR  OTHERWISE MADE AVAILABLE TO ANY OTHER PERSON
; EXCEPT FOR USE ON SUCH SYSTEM AND TO ONE WHO AGREES TO THESE LICENSE
; TERMS.  TITLE TO AND  OWNERSHIP OF THE  SOFTWARE  SHALL AT ALL TIMES
; REMAIN IN DEC.
;
; THE INFORMATION IN THIS SOFTWARE IS SUBJECT TO CHANGE WITHOUT NOTICE
; AND SHOULD  NOT BE CONSTRUED  AS A COMMITMENT  BY DIGITAL  EQUIPMENT
; CORPORATION.
;
; DEC ASSUMES  NO  RESPONSIBILITY  FOR  THE USE OR  RELIABILITY OF ITS
; SOFTWARE ON EQUIPMENT WHICH IS NOT SUPPLIED BY DEC.
EXTERN   STKSIZ,RANKS,FLAGGS,RX_IN_PROCESS,TX_IN_PROCESS,RX_TX_FLAGS
EXTERN   SYS_FLAGS,TX_CHECKSUM,RX_CHECKSUM,HOST_SIZE,TX_SIZE,ERCODE
EXTERN   CHAN,PUSH_RX_TX
EXTERN   NACK_COUNT,CMD_SIZE,CONFIG_BYTE,FLAG_1,DIAG_TEST,ERROR_FLAG
EXTERN   TX_INTR,RX_0,RX_1,RX_2,RX_3,RX_4,RX_5,RX_6,RX_7
EXTERN   TX_0,TX_1,TX_2,TX_3,TX_4,TX_5,TX_6,TX_7,CHANNEL_RCVD,SIZE_RCVD
EXTERN   READ_ERROR,CHANNEL_SENT,SIZE_SENT,SEND_ACK
EXTERN   SEND_NACK,IN_RX,WAIT_ACK_NACK,SEND_KA,NO_HOST,SYS_STARTUP
EXTERN   PASS_FAIL,MAN_MODE,REAR_RX_QUE_PTR,FRONT_RX_QUE_PTR
EXTERN   REAR_TX_QUE_PTR,FRONT_TX_QUE_PTR,SPS,BASE_RX_PAGE,RX_0_QUE
EXTERN   RX_7_QUE,BASE_TX_PAGE,TX_0_QUE,TX_7_QUE,TABLE_PAGE,RX_BUFFERS
EXTERN   TX_BUFFERS,TX_SIZE_TBL,RX_DEF_T_O,RX_TIME_OUT,KA_TIMER
EXTERN   ACK_NACK_TIMER,TEMP_SEND,KA_PACKET,BAD_CMD_PACKET,DIAG_PACKET
EXTERN   DIAG_PAC_SIZE,DEV_CHNG_PACKET,CH0_BUFFER,CH1_BUFFER,CH2_BUFFER
EXTERN   CH3_BUFFER,CH4_BUFFER,CH5_BUFFER,CH6_BUFFER,CH7_BUFFER
EXTERN   END_BUFFER_SPACE,PORT_TIME_OUT,QUE_PTR_LENGTH

GGGGGGGGGG    44444444444444444444444444444444444444444444444444444444444444444444444444444444444444444444444444444    GGGGGGGGGG
GGGGGGGGGG    4444444444444444444444  Digital Equipment Corporation - VAX/VMS Version V4.5  4444444444444444444444    GGGGGGGGGG
GGGGGGGGGG    44444444444444444444444444444444444444444444444444444444444444444444444444444444444444444444444444444    GGGGGGGGGG
```

NEWMAN

INIT

SRC;3

File _S12SDUA14:[RSMSS.DOS]INIT.SRC;3 (1094,35,0), last revised on 10-AUG-1987 11:14, is a 21 block sequential file owned by UIC [DOC,RSMSQUEUE]. The records are variable length with implied (CR) carriage control. The longest record is 0 bytes.

Job DIAGINTS (371) queued to SYSSPRINT on 10-AUG-1987 11:12 by user NEWMAN, UIC [DOC,RSMSQUEUE], under account at priority 100, started on printer _MILESSLPC0: on 10-AUG-1987 11:14 from queue SYSSPRINT.

```
GGGGGGGGGG   4444444444444444444444444444444444444444444444444444444444444444444444444444444444444444444444   GGGGGGGGGG
GGGGGGGGGG   44444444444444444444444  Digital Equipment Corporation - VAX/VMS Version V4.5  44444444444444444444444   GGGGGGGGGG
GGGGGGGGGG   4444444444444444444444444444444444444444444444444444444444444444444444444444444444444444444444   GGGGGGGGGG
```

VAX/VMS VAX/VMS VAX/VMS VAX/VMS VAX/VMS VAX/VMS VAX/VMS VAX/VMS VAX/VMS VAX/VMS VAX/VMS VAX/VMS
VAX/VMS VAX/VMS VAX/VMS VAX/VMS VAX/VMS VAX/VMS VAX/VMS VAX/VMS VAX/VMS VAX/VMS VAX/VMS VAX/VMS
VAX/VMS VAX/VMS VAX/VMS VAX/VMS VAX/VMS VAX/VMS VAX/VMS VAX/VMS VAX/VMS VAX/VMS VAX/VMS VAX/VMS
VAX/VMS VAX/VMS VAX/VMS VAX/VMS VAX/VMS VAX/VMS VAX/VMS VAX/VMS VAX/VMS VAX/VMS VAX/VMS VAX/VMS
VAX/VMS VAX/VMS VAX/VMS VAX/VMS VAX/VMS VAX/VMS VAX/VMS VAX/VMS VAX/VMS VAX/VMS VAX/VMS VAX/VMS

GGGGGGGGGG 44444444444444444444444444444444444444444444444444444444444444444444444444444444 GGGGGGGGGG
GGGGGGGGGG 444444444444444444444444 Digital Equipment Corporation - VAX/VMS Version V4.5 444444444444444444444444 GGGGGGGGGG
GGGGGGGGGG 44444444444444444444444444444444444444444444444444444444444444444444444444444444 GGGGGGGGGG

NEWMAN

TITAN

SRC3:

```
File _$12$DUA14:[RSMSS.DOS]INIT.SRC;3 (1094,35,0), last revised on 10-AUG-1987 11:14, is a 21 block sequential file owned by UIC
[DOC,RSMSQUEUE]. The records are variable length with implied (CR) carriage control. The longest record is 0 bytes.

Job DIAGINTS (171) queued to SYS$PRINT on 10-AUG-1987 11:12 by user NEWMAN, UIC [DOC,RSMSQUEUE], under account   at priority 100,
started on printer _MILES$LPC0: on 10-AUG-1987 11:14 from queue SYS$PRINT.

GGGGGGGGGG    4444444444444444444444444444444444444444444444444444444444444444444444444444444444444444444444444    GGGGGGGGGG
GGGGGGGGGG    4444444444444444444444444  Digital Equipment Corporation - VAX/VMS Version V4.5  4444444444444444444444444    GGGGGGGGGG
GGGGGGGGGG    4444444444444444444444444444444444444444444444444444444444444444444444444444444444444444444444444    GGGGGGGGGG

;
; COPYRIGHT (C) 1986
; DIGITAL EQUIPMENT CORPORATION, MAYNARD, MASSACHUSETTS 01754
;
; THIS SOFTWARE IS FURNISHED  UNDER A LICENSE FOR USE ONLY ON A SINGLE
; COMPUTER  SYSTEM AND  MAY BE  COPIED ONLY WITH  THE INCLUSION OF THE
; ABOVE COPYRIGHT NOTICE.  THIS SOFTWARE, OR ANY OTHER COPIES THEREOF,
; MAY NOT BE PROVIDED OR  OTHERWISE MADE AVAILABLE TO ANY OTHER PERSON
; EXCEPT FOR USE ON SUCH SYSTEM AND TO ONE WHO AGREES TO THESE LICENSE
; TERMS.  TITLE TO AND  OWNERSHIP OF THE  SOFTWARE  SHALL AT ALL TIMES
; REMAIN IN DEC.
;
; THE INFORMATION IN THIS SOFTWARE IS SUBJECT TO CHANGE WITHOUT NOTICE
; AND SHOULD  NOT BE CONSTRUED  AS A COMMITMENT  BY DIGITAL  EQUIPMENT
; CORPORATION.
;
; DEC ASSUMES  NO  RESPONSIBILITY  FOR  THE USE OR  RELIABILITY OF ITS
; SOFTWARE ON EQUIPMENT WHICH IS NOT SUPPLIED BY DEC.
        TITLE   INIT
;;;;;;;;;;;;;;;;;;;;;;;;;;;;;;;;;;;;;;;;;;;;;;;;;;;;;;;;;;;;;;;;;;;;;;;;;;;;;;;;
;
;       FILE:   INIT.SRC
;
;       DESCRIPTION:    This file contains the routine to init the system
;                       pointers and octart.
;
;       CHANGES
;------------------------------ BL2 ----------------------------------------
;
;               9/9/86  Added the init table and software to init all the channels
;
;;;;;;;;;;;;;;;;;;;;;;;;;;;;;;;;;;;;;;;;;;;;;;;;;;;;;;;;;;;;;;;;;;;;;;;;;;;;;;;;

        NLIST
        INCLUDE EXTERNAL.SRC
        INCLUDE EQUATES.SRC
        LIST

        SUBTTL  INIT

        INTERN  INIT
```

```
        EXTERN  UART_SERVICE,BACKGROUND_LOOP,SET_BIT,PUSH_MSG,ENABLE_TX
        PAGE

        RSECT PRCODE

DC_INIT_TABLE:
        DB      25H,4CH,0CCH            ; Keyboard
        DB      25H,5DH,0CCH            ; Mouse/Tablet
        DB      25H,5DH,0CCH            ; Mouse/Tablet
        DB      25H,4DH,0EEH            ; Knobs box
        DB      25H,4DH,0EEH            ; Button Box
        DB      25H,5CH,0EEH            ; Spare
        DB      25H,5DH,077H            ; Spare keyboard
        DB      25H,5CH,0FFH            ; Host
END_DC_INIT_TABLE       EQU     $       ; End of the table

; This table holds the values used to count down in the timer interrupt for each channel
TIMER_INIT_TABLE:
        DB      4,4,4,2,2,0,10H,TEN_MS  ; The timer isn't used for channel 5


INIT:
        CLR     DIAG_TEST               ; Clear flag indicating we are in diagnostics
        MOV     TMOD,#ZERO              ; Clear out all the timer/counter/interrupt
        MOV     TCON,#ZERO              ; structure, and interrupt priority registers
        MOV     IE,#ZERO                ; while we init the system for operational
        MOV     IP,#ZERO                ; mode.

        MOV     DPTR,#DIAG_REG          ; Addr. of the diagnostic register
        MOVX    A,@DPTR                 ; Read the current error code
        CJNE    A,#ZERO,5$              ; If it is not zero, do not change it
        MOV     A,ERCODE                ; Otherwise, get any other possible error
        MOVX    @DPTR,A                 ; Send it to the LED's
        MOV     ERCODE,#ZERO            ; And clear out the location
5$:     MOV     DPTR,#FUNCT_REG         ; Address of the function register
        MOV     A,#GREEN                ; Turn the LED green for operational mode
        MOVX    @DPTR,A

        MOV     R0,#REAR_RX_QUE_PTR     ; Initialize all the que pointers
        MOV     R3,#QUE_PTR_LENGTH      ; NUMBER OF LOCATIONS
10$:    MOV     @R0,#0FEH               ; All the pointers start at the end of the queue
        INC     R0                      ; Point to the next location
        DJNZ    R3,10$                  ; Continue initialising if not done

        MOV     R7,#10H                 ; Clear out initialize the receive and transmit buffer addresses
        MOV     DPTR,#RX_BUFFERS        ; Starting addresses for each channel
        MOV     A,#ZERO
20$:    MOVX    @DPTR,A
        INC     DPTR
        DJNZ    R7,20$
```

```
        MOV     DPTR,#RX_BUFFERS+1      ; Set up to load in the upper addresses
        MOV     A,#HIGH CH0_BUFFER
        MOVX    @DPTR,A                 ; Store the buffer addr for channel 0
        MOV     A,#HIGH CH1_BUFFER
        CALL    BUF_INIT                ; Store the acdr for channel 1
        MOV     A,#HIGH CH2_BUFFER
        CALL    BUF_INIT                ; Store the acdr for channel 2
        MOV     A,#HIGH CH3_BUFFER
        CALL    BUF_INIT                ; Store the addr for channel 3
        MOV     A,#HIGH CH4_BUFFER
        CALL    BUF_INIT                ; Store the acdr for channel 4
        MOV     A,#HIGH CH5_BUFFER
        CALL    BUF_INIT                ; Store the acdr for channel 5
        MOV     A,#HIGH CH6_BUFFER
        CALL    BUF_INIT                ; Store the addr for channel 6
        MOV     A,#HIGH CH7_BUFFER
        CALL    BUF_INIT                ; Store the acdr for channel 7

; Initialize the DC349

        MOV     P2,#IO_PAGE             ; P2 = upper address bits of the DC349
        MOV     R0,#LOW BASE_CMD_W      ; R0 = the write address of the 1st channels command register
        MOV     DPTR,#DC_INIT_TABLE     ; DPTR points to the init table for the DC349
30$:    MOV     A,#ZERO
        MOVC    A,@A+DPTR               ; Get the byte to init the command register
        MOVX    @R0,A                   ; Send it to the command register
        DEC     R0                      ; Point to the Mode register
        INC     DPTR                    ; Point to the data for Mode reg 1
        MOV     A,#ZERO
        MOVC    A,@A+DPTR                       ; Get the byte
        MOVX    @R0,A                   ; Send the byte to Mode reg 1
        INC     DPTR                    ; Point to the data for Mode reg 2
        MOV     A,#ZERO
        MOVC    A,@A+DPTR                       ; Get the byte
        MOVX    @R0,A                   ; Send it (Mode 1 and 2 are at the same address)
        MOV     A,R0
        ADD     A,#REG_OFFSET + 1       ; Point to the next channels command register
        MOV     R0,A                    ; Place it back in R0
        INC     DPTR                    ; Point to the data for the next command reg
        MOV     A,DPL                   ; See if we are past the end of the table
        CJNE    A,#LOW END_DC_INIT_TABLE,30$    ; If not at the end, do the next channel
;Reset the modem control register on the dc349
        MOV     R0,#LOW DATA_SUM_REG_R
        MOVX    A,@R0
        MOV     R0,#LOW DATA_SUM_REG_W
        MOVX    @R0,A

; Init the table for the timer values of each port with the default values
        MOV     P2,#TABLE_PAGE          ; Upper address of the table to hold the timer values
        MOV     R0,#LOW RX_DEF_T_0      ; Lower address of the table
```

```
        MOV     DPTR,#TIMER_INIT_TABLE  ; Address of the default init table
        MOV     R1,#NUM_PORTS           ; Number of values to load

40$:    CLR     A                       ; Clear the accumulator
        MOVC    A,@A+DPTR               ; Get a byte form the init table
        MOVX    @R0,A                   ; And store it in the RAM table
        INC     R0                      ; Point to the next location to fill
        INC     DPTR                    ; Point to the next byte to get
        DJNZ    R1,40$                  ; Continue if not done with the whole table

; Init the keep alive packet
        MOV     DPTR,#KA_PACKET         ; Init the keep alive packet to the appropriate values
        MOV     A,#KA
        MOVX    @DPTR,A                 ; First byte is a keep alive
        INC     DPTR
        MOV     A,#ZERO
        MOVX    @DPTR,A                 ; Second byte is a zero for the number of data bytes

; Init the bad command packet
        MOV     DPTR,#BAD_CMD_PACKET    ; Init the bad command packet to the appropriate values
        MOV     A,#HDR_SYS_ERR+HOST_PORT
        MOVX    @DPTR,A                 ; First byte says it's from the PP MOX with the system error bit set
        INC     DPTR
        MOV     A,#1
        MOVX    @DPTR,A                 ; Second byte is a one for the number of data bytes
        INC     DPTR
        MOV     A,#BAD_CMD_ERR
        MOVX    @DPTR,A                 ; Third byte is the error byte

; Init the diagnostic packet
        MOV     DPTR,#DIAG_REG          ; Address of the diagnostic register
        MOVX    A,@DPTR                 ; Read it to get the error byte (if any)
        PUSH    ACC                     ; Save the byte

        MOV     DPTR,#DIAG_PACKET       ; Init the diagnostic packet to the appropriate values
        MOV     A,#HOST_PORT+HDR_RPLY_BIT
        MOVX    @DPTR,A                 ; First byte says it's from the PP MOX, with the reply bit set
        INC     DPTR
        MOV     A,#DIAG_PAC_SIZE        ; Size of the diagnostic packet
        MOVX    @DPTR,A
        INC     DPTR
        POP     ACC                     ; Get the error byte back
        MOVX    @DPTR,A                 ; Store it in the packet
        INC     DPTR
        MOV     A,ERCODE                ; Get the secondary error byte
        MOVX    @DPTR,A                 ; Store it in the packet
        INC     DPTR

; Now find out the configuration of the system
        MOV     P2,#IO_PAGE             ; Upper address of the DC349
        MOV     R0,#LOW BASE_STATUS     ; Base address of the status register
```

```
        MOV     R1,#HOST_PORT+1           ; Number of channels to check
        MOV     R7,#ZERO                  ; First channel
50$:    MOVX    A,@R0                     ; Read the status register
        JB      ACC.6,60$                 ; No device in this port
        CALL    SET_BIT                   ; Device present, set the bit for this channel
        ORL     CONFIG_BYTE,A             ; And save it in the config byte
60$:    INC     R7                        ; Next channel to check
        MOV     A,R0                      ; Get the addr. of the status register
        ADD     A,#REG_OFFSET             ; Point to the next status reg
        MOV     R0,A                      ; Place the pointer back
        DJNZ    R1,50$                    ; Loop if we are not at the end
        ANL     CONFIG_BYTE,#05EH         ; Make sure ports 0,5,and 7 are zero. They do not have device present bits
                                          ; and the inputs are floating.
        MOV     A,CONFIG_BYTE
        MOVX    @DPTR,A                   ; Store the config byte in the diagnostic report

        INC     DPTR                      ; Point to the location to report the firmware rev.
        MOV     A,#REV_LEVEL              ; Get the rev level
        MOVX    @DPTR,A                   ; Store the rev level

        SETB    SYS_STARTUP               ; Indicate that this is still system startup
        MOV     A,#HOST_PORT              ; Send the packet out the host port
        MOV     R7,A
        MOV     DPTR,#DIAG_PACKET         ; Beginning addr. of the packet
        CLR     PUSH_RX_TX                ; Place on Tx queue
        CALL    PUSH_MSG                  ; Place the packet in the host port queue
        CALL    ENABLE_TX                 ; Enable the transmission of the self test report

; Init the change in device present packet
        MOV     DPTR,#DEV_CHNG_PACKET     ; Addr. of the cange in device present packet
        MOV     A,#HOST_PORT+HDR_DC_BIT   ; Packet header
        MOVX    @DPTR,A                   ; Place the header in the packet
        INC     DPTR                      ; Point to the size byte
        MOV     A,#1                      ; One byte to send
        MOVX    @DPTR,A                   ; Store the size byte in the packet
        INC     DPTR                      ; Packet location for the config byte
        MOV     A,CONFIG_BYTE
        MOVX    @DPTR,A                   ; Store the config byte

; Init the timers and start them
        MOV     TL0,#LOW TIME_COUNT       ; Lower 8 bits of the timer 0 value
        MOV     TH0,#HIGH TIME_COUNT      ; Upper 8 bits of the timer 0 value

        MOV     TL1,#LOW T1_COUNT         ; Lower 8 bits of the timer 1 value
        MOV     TH1,#HIGH T1_COUNT        ; Upper 8 bits of the timer 1 value

        MOV     TMOD,#T0_MODE1 OR T1_MODE1        ; Set up the timers  for mode 0
        MOV     TCON,#ZERO                ; Turn off timers and make ints level triggered

        MOV     IE,#8BH                   ; Enable interrupts (ext. int. 0 and timers 0 and 1)
        MOV     IP,#0BH                   ; Set the priority for int 0 and timers 0,1 to the highest priority
```

```
        SETB    TR0                     ; Start running timer 0
        SETB    TR1                     ; Start running timer 1

70$:    JB      SYS_STARTUP,70$         ; Wait for the ACK/NACK or time out from the self test report

        LJMP    BACKGROUND_LOOP         ; Then go operational

        SUBTTL  BUF_INIT
        PAGE

;;;;;;;;;;;;;;;;;;;;;;;;;;;;;;;;;;;;;;;;;;;;;;;;;;;;;;;;;;;;;;;;;;;;;;;;;;;;;;;;;
;
;       TITLE:  BUF_INIT
;
;       DESCRIPTION: This routine bumps the data pointer by 2 and stores
;                    the value in the accumulator into what the DTPR is
;                    pointing at.
;
;       INPUT: DTPR- Addr.-2
;              A- value to be stored
;
;       OUTPUT: (DPTR)=A
;
;;;;;;;;;;;;;;;;;;;;;;;;;;;;;;;;;;;;;;;;;;;;;;;;;;;;;;;;;;;;;;;;;;;;;;;;;;;;;;;;;
BUF_INIT:
        INC     DPTR
        INC     DPTR            ; Bump the data pointer by two
        MOVX    @DPTR,A         ; and store what is in the acc. there
        RET

        END
```

```
HHHHHHHHHH   4444444444444444444444444444444444444444444444444444444444444444444444444444444444444444   HHHHHHHHHH
HHHHHHHHHH   4444444444444444444444444  Digital Equipment Corporation - VAX/VMS Version V4.5  4444444444444444444444444   HHHHHHHHHH
HHHHHHHHHH   4444444444444444444444444444444444444444444444444444444444444444444444444444444444444444   HHHHHHHHHH
```

NEWMAN

MACRO

.SRC;3

File _S12$DUA14:[RSMSS.DOS]MACRO.SRC;3 (1114,8450,0), last revised on 10-AUG-1987 11:14, is a 7 block sequential file owned by UIC [DOC,RSMSQUEUE]. The records are variable length with implied (CR) carriage control. The longest record is 0 bytes.

Job DIAGINTS (971) queued to SYS$PRINT on 10-AUG-1987 11:12 by user NEWMAN, UIC [DOC,RSMSQUEUE], under account at priority 100, started on printer _MILFS$LPC0: on 10-AUG-1987 11:14 from queue SYS$PRINT.

```
HHHHHHHHHH    444444444444444444444444444444444444444444444444444444444444444444444444444444444444444444    HHHHHHHHHH
HHHHHHHHHH    44444444444444444444444  Digital Equipment Corporation - VAX/VMS Version V4.5  44444444444444444444444    HHHHHHHHHH
HHHHHHHHHH    444444444444444444444444444444444444444444444444444444444444444444444444444444444444444444    HHHHHHHHHH
```

VAX/VMS VAX/VMS VAX/VMS VAX/VMS VAX/VMS VAX/VMS VAX/VMS VAX/VMS VAX/VMS VAX/VMS VAX/VMS VAX/VMS
VAX/VMS VAX/VMS VAX/VMS VAX/VMS VAX/VMS VAX/VMS VAX/VMS VAX/VMS VAX/VMS VAX/VMS VAX/VMS VAX/VMS
VAX/VMS VAX/VMS VAX/VMS VAX/VMS VAX/VMS VAX/VMS VAX/VMS VAX/VMS VAX/VMS VAX/VMS VAX/VMS VAX/VMS
VAX/VMS VAX/VMS VAX/VMS VAX/VMS VAX/VMS VAX/VMS VAX/VMS VAX/VMS VAX/VMS VAX/VMS VAX/VMS VAX/VMS
VAX/VMS VAX/VMS VAX/VMS VAX/VMS VAX/VMS VAX/VMS VAX/VMS VAX/VMS VAX/VMS VAX/VMS VAX/VMS VAX/VMS

Digital Equipment Corporation - VAX/VMS Version V4.5

NEWMAN

MACRO

.SRC;3

```
File _$12$DUA14:[RSMSS.DOS]MACRO.SRC;3 (1114,9850,0), last revised on 10-AUG-1987 11:14, is a 7 block sequential file owned by UIC
[DOC,RSMSQUEUE].  The records are variable length with implied (CR) carriage control.  The longest record is 0 bytes.

Job DIAGINTS (171) queued to SYSSPRINT on 10-AUG-1987 11:12 by user NEWMAN, UIC [DOC,RSMSQUEUE], under account   at priority 100,
started on printer _MILES$LPC0: on 10-AUG-1987 11:14 from queue SYSSPRINT.

HHHHHHHHHH    444444444444444444444444444444444444444444444444444444444444444444444444444444444444444444444444    HHHHHHHHHH
HHHHHHHHHH    4444444444444444444444  Digital Equipment Corporation - VAX/VMS Version V4.5  4444444444444444444444    HHHHHHHHHH
HHHHHHHHHH    444444444444444444444444444444444444444444444444444444444444444444444444444444444444444444444444    HHHHHHHHHH

;
; COPYRIGHT (C) 1986
; DIGITAL EQUIPMENT CORPORATION, MAYNARD, MASSACHUSETTS 01754
;
; THIS SOFTWARE IS FURNISHED  UNDER A LICENSE FOR USE ONLY ON A SINGLE
; COMPUTER  SYSTEM AND  MAY BE  COPIED ONLY WITH  THE INCLUSION OF THE
; ABOVE COPYRIGHT NOTICE.  THIS SOFTWARE, OR ANY OTHER COPIFS THEREOF,
; MAY NOT BE PROVIDED OR  OTHERWISE MADE AVAILABLE TO ANY OTHER PERSON
; EXCEPT FOR USE ON SUCH SYSTEM AND TO ONE WHO AGREES TO THESE LICENSE
; TERMS.  TITLE TO AND  OWNERSHIP OF THE  SOFTWARE  SHALL AT ALL TIMES
; REMAIN IN DEC.
;
; THE INFORMATION IN THIS SOFTWARE IS SUBJECT TO CHANGE WITHOUT NOTICE
; AND SHOULD  NOT BE CONSTRUED  AS A COMMITMENT  BY DIGITAL  EQUIPMENT
; CORPORATION.
;
; DEC ASSUMES  NO  RESPONSIBILITY  FOR  THE USE OR  RELIABILITY OF ITS
; SOFTWARE ON EQUIPMENT WHICH IS NOT SUPPLIED BY DEC.
;*********************************************************************;
;*                                                                   *;
;*      MACRO definition                                             *;
;*                                                                   *;
;*********************************************************************;

ERROR   MACRO   %LOOP
        CLR     PASS_FAIL               ; Clear the pass/fail bit - to indicate failure
        SETB    ERROR_FLAG              ; Set for the code to indicate an error was found
                                        ; This is for intermittant errors
        JNB     MAN_MODE,%LOOP          ; If manuf. mode bit is low (active), jump to loop location

        LJMP    INIT                    ; Else go to init the operational code
        ENDM


ERRORA  MACRO   %LOOP,%CNTNUE
        CLR     PASS_FAIL               ; Clear the pass/fail bit - to indicate failure
        SETB    ERROR_FLAG              ; Set for the code to indicate an error was found
                                        ; This is for intermittant errors
        JNB     MAN_MODE,%LOOP          ; If manuf. mode bit is low (active), jump to loop location
        CALL    RX_ERROR                ; Call the rdceive error routine
        SJMP    %CNTNUE                 ; Else go to location to continue operation
        ENDM
```

```
LOOPCHK MACRO   %LOOP
LCL     SET     $
        JB      MAN_MODE,LCL+6          ; If manuf. mode bit is high (not man. mode), continue
        JB      ERROR_FLAG,%LOOP        ; Man. mode - was an intermittant error found? yes - loop
                                        ; No, exit
        ENDM


        SUBTTL  SAVE_REGS
        PAGE
;;;;;;;;;;;;;;;;;;;;;;;;;;;;;;;;;;;;;;;;;;;;;;;;;;;;;;;;;;;;;;;;;;;;;;;;;;;;;;;;;;;;;;;
;
;       MACRO TITLE:    SAVE_REGS
;
;       DESCRIPTION:    This macro saves the accumulator, the PSW, the DPTR,
;                       and the contents of the P2 buffer.  Used in the
;                       uart and timer interrupt routines.
;
;;;;;;;;;;;;;;;;;;;;;;;;;;;;;;;;;;;;;;;;;;;;;;;;;;;;;;;;;;;;;;;;;;;;;;;;;;;;;;;;;;;;;;;
SAVE_REGS       MACRO
        PUSH    ACC
        PUSH    PSW
        PUSH    DPL
        PUSH    DPH

        CLR     A

        jbc     P2.0,1$
        mov     A,#1
1$:     jbc     P2.1,2$
        setb    ACC.1
2$:     jbc     P2.2,3$
        setb    ACC.2
3$:     jbc     P2.3,4$
        setb    ACC.3
4$:     jbc     P2.4,5$
        setb    ACC.4
5$:     jbc     P7.5,6$
        setb    ACC.5
6$:     jbc     P7.6,7$
        seth    ACC.6
7$:     jbc     P7.7,8$
        seth    ACC.7
8$:     cpl     A
        push    ACC             ; Save P2.
        ENDM

        SUBTTL  RFSTORE_REGS
        PAGF
```

```
;;;;;;;;;;;;;;;;;;;;;;;;;;;;;;;;;;;;;;;;;;;;;;;;;;;;;;;;;;;;;;;;;;;;;;;;;;;;;;;;
;
;       MACRO TITLE:    RESTORE_REGS
;
;       DESCRIPTION:    This is used to restore the registers that were
;                       previously saved with the macro SAVE_REGS.
;
;;;;;;;;;;;;;;;;;;;;;;;;;;;;;;;;;;;;;;;;;;;;;;;;;;;;;;;;;;;;;;;;;;;;;;;;;;;;;;;;
RESTORE_REGS    MACRO
        POP     P2
        POP     DPH
        POP     DPL
        POP     PSW
        POP     ACC
      . ENDM
```

```
IIIIIIIIII    4444444444444444444444444444444444444444444444444444444444444444444444444444444444444444444444444    IIIIIIIIII
IIIIIIIIII    44444444444444444444444  Digital Equipment Corporation - VAX/VMS Version V4.5  44444444444444444444444    IIIIIIIIII
IIIIIIIIII    4444444444444444444444444444444444444444444444444444444444444444444444444444444444444444444444444    IIIIIIIIII
```

```
NEWMAN

PARSE

....SRC;2
```

```
File _S12$DUA14:[RSMSS.DBS]PARSE.SRC;2 (1127,71,0), last revised on 10-AUG-1987 11:14, is a 19 block sequential file owned by UIC
[DOC,RSMSQUEUE].  The records are variable length with implied (CR) carriage control.  The longest record is 0 bytes.

Job DIAGINTS (371) queued to SYS$PRINT on 10-AUG-1987 11:12 by user NEWMAN, UIC [DOC,RSMSQUEUE], under account   at priority 100,
started on printer _MILES$LPC0: on 10-AUG-1987 11:14 from queue SYS$PRINT.

IIIIIIIIII    444444444444444444444444444444444444444444444444444444444444444444444444444444444444444444444444444444    IIIIIIIIII
IIIIIIIIII    4444444444444444444444444  Digital Equipment Corporation - VAX/VMS Version V4.5  4444444444444444444444    IIIIIIIIII
IIIIIIIIII    444444444444444444444444444444444444444444444444444444444444444444444444444444444444444444444444444444    IIIIIIIIII
```

```
VAX/VMS VAX/VMS VAX/VMS VAX/VMS VAX/VMS VAX/VMS VAX/VMS VAX/VMS VAX/VMS VAX/VMS VAX/VMS VAX/VMS
VAX/VMS VAX/VMS VAX/VMS VAX/VMS VAX/VMS VAX/VMS VAX/VMS VAX/VMS VAX/VMS VAX/VMS VAX/VMS VAX/VMS
VAX/VMS VAX/VMS VAX/VMS VAX/VMS VAX/VMS VAX/VMS VAX/VMS VAX/VMS VAX/VMS VAX/VMS VAX/VMS VAX/VMS
VAX/VMS VAX/VMS VAX/VMS VAX/VMS VAX/VMS VAX/VMS VAX/VMS VAX/VMS VAX/VMS VAX/VMS VAX/VMS VAX/VMS
VAX/VMS VAX/VMS VAX/VMS VAX/VMS VAX/VMS VAX/VMS VAX/VMS VAX/VMS VAX/VMS VAX/VMS VAX/VMS VAX/VMS

IIIIIIIIII    4444444444444444444444444444444444444444444444444444444444444444444444444444444    IIIIIIIIII
IIIIIIIIII    44444444444444444444444  Digital Equipment Corporation - VAX/VMS Version V4.5  44444444444444444444444    IIIIIIIIII
IIIIIIIIII    4444444444444444444444444444444444444444444444444444444444444444444444444444444    IIIIIIIIII
```

NEWMAN

PARSE

SRC;2

```
File _$12$DUA14:[RSMSS.DOS]PARSE.SRC;2 (1127,71,0), last revised on 10-AUG-1987 11:14, is a 19 block sequential file owned by UIC
[DOC,RSMSQUEUE].  The records are variable length with implied (CR) carriage control.  The longest record is 0 bytes.

Job DIAGINTS (371) queued to SYSPRINT on 10-AUG-1987 11:12 by user NEWMAN, UIC [DOC,RSMSQUEUE], under account   at priority 100,
started on printer _MILES$LPC0: on 10-AUG-1987 11:14 from queue SYSPRINT.

IIIIIIIIII    4444444444444444444444444444444444444444444444444444444444444444444444444444444444444444444444444444    IIIIIIIIII
IIIIIIIIII    444444444444444444444444  Digital Equipment Corporation - VAX/VMS Version V4.5  444444444444444444444444    IIIIIIIIII
IIIIIIIIII    4444444444444444444444444444444444444444444444444444444444444444444444444444444444444444444444444444    IIIIIIIIII

        nolist
        title COMMAND PARSER
        space 3
        page
;
; COPYRIGHT (C) 1986
; DIGITAL EQUIPMENT CORPORATION, MAYNARD, MASSACHUSETTS 01754
;
; THIS SOFTWARE IS FURNISHED  UNDER A LICENSE FOR USE ONLY ON A SINGLE
; COMPUTER  SYSTEM AND  MAY BE  COPIED ONLY WITH  THE INCLUSION OF THE
; ABOVE COPYRIGHT NOTICE.  THIS SOFTWARE, OR ANY OTHER COPIES THEREOF,
; MAY NOT BE PROVIDED OR  OTHERWISE MADE AVAILABLE TO ANY OTHER PERSON
; EXCEPT FOR USE ON SUCH SYSTEM AND TO ONE WHO AGREES TO THESE LICENSE
; TERMS.  TITLE TO AND  OWNERSHIP OF THE  SOFTWARE  SHALL AT ALL TIMES
; REMAIN IN DEC.
;
; THE INFORMATION IN THIS SOFTWARE IS SUBJECT TO CHANGE WITHOUT NOTICE
; AND SHOULD  NOT BE CONSTRUED  AS A COMMITMENT  BY DIGITAL  EQUIPMENT
; CORPORATION.
;
; DEC ASSUMES  NO  RESPONSIBILITY  FOR  THE USE OR  RELIABILITY OF ITS
; SOFTWARE ON EQUIPMENT WHICH IS NOT SUPPLIED BY DEC.

        page
;;;;;;;;;;;;;;;;;;;;;;;;;;;;;;;;;;;;;;;;;;;;;;;;;;;;;;;;;;;;;;;;;;;;;;;;;;;;;;;
;
;       FILE:   PARSE.SRC
;
;       DESCRIPTION:    This file contains the code for parsing  and executing
;                       the commands that are received from the host.
;
;
;       CHANGES
;-------------------------------- BL2 ----------------------------------------
;
;       11/18/86        File created
;
;;;;;;;;;;;;;;;;;;;;;;;;;;;;;;;;;;;;;;;;;;;;;;;;;;;;;;;;;;;;;;;;;;;;;;;;;;;;;;;

        NLIST                           ; Don't list everything out here
        include         EXTERNAL.SRC
        INCLUDE         EQUATES.SRC
```

BEST AVAILABLE COPY

```
        LIST

        INTERN  PARSE_COMMAND,LIGHT_LED

        EXTERN  INC_BUF,BUMP_FRONT_TX,PDIAGT,PUSH_MSG,DE_QUE_TX,CHANADR1
        EXTERN  BAUD_TO_TIME,WRITE_COMMAND

        RSECT   PRCODE

        SUBTTL
        PAGE
;;;;;;;;;;;;;;;;;;;;;;;;;;;;;;;;;;;;;;;;;;;;;;;;;;;;;;;;;;;;;;;;;;;;;;;;;;;;;;;;;
;
;       NAME:   PARSE_COMMAND
;
;       DESCRIPTION:  This is the main body of the command parser.  It is set

        SUBTTL
        PAGE
;;;;;;;;;;;;;;;;;;;;;;;;;;;;;;;;;;;;;;;;;;;;;;;;;;;;;;;;;;;;;;;;;;;;;;;;;;;
;
;       NAME:   PARSE_COMMAND
;
;       DESCRIPTION:  This is the main body of the command parser.  It is set
;                     up like a case statement, ie: CASE and OF: .....



;                     Each individual command has it's own subroutine that
;                     is called from the CASE statement.
;
;       Input:  R1 = FRONT_TX_QUE_PTR*CMD_PORT
;
;       Output: Command executed
;;;;;;;;;;;;;;;;;;;;;;;;;;;;;;;;;;;;;;;;;;;;;;;;;;;;;;;;;;;;;;;;;;;;;;;;;;;;

PARSE_COMMAND:
        PUSH    PSW
        PUSH    ACC

        MOV     PSW,#BANK_2
        MOV     R7,#CMD_PORT

        CALL    DE_QUE_TX               ; Get the address of the msg buffer

        MOVX    A,@DPTR                 ; DPTR now has the addr. of the msg.
        MOV     CMD_SIZE,A              ; Save the size of the packet
        CJNE    A,#ZERO,1$
        LJMP    END_PARSE               ; Size byte was zero, null packet, return

1$:     CALL    INC_BUF
```

BEST AVAILABLE COPY

```
        MOVX    A,@DPTR
        DEC     CMD_SIZE                ; Decrement the command size

        CJNE    A,#'T',REPORT           ; Self test command? No see if it is a Report ST command

; Initialize the DC349

        MOV     P2,#IO_PAGE             ; P2 = upper address bits of the DC349
        MOV     R0,#LOW BASE_CMD_W      ; R0 = the write address of the 1st channels command register
5$:     MOV     A,#ZERO                 ; Turn off each channel
        MOVX    @R0,A                   ; Send it to the command register
        MOV     A,R0
        ADD     A,#REG_OFFSET           ; Point to the next channels command register
        MOV     R0,A                    ; Place it back in R0
        CJNE    A,#LOW BASE_CMD_W+38H,5$ ; If not at the end, do the next channel

        MOV     TCON,#ZERO              ; Clear the timer/counter control reg.
        MOV     TMOD,#ZERO              ; Clear the T/C mode control reg.
        MOV     IE,#ZERO                ; Clear the interrupt enable reg.
        MOV     IP,#ZERO                ; Clear the interrupt priority reg.

        LJMP    PDIAGT                  ; Run the diagnostics

REPORT: CJNE    A,#'R',CHANGE           ; Report the self test? No, see if it's a change baud rate command
                                        ; Yes
        MOV     DPTR,#DIAG_PACKET       ; Address of the diagnostic report
        MOV     A,#CMD_PORT             ; Address of where to sent the packet
        SETB    PUSH_RX_TX              ; On the Rx queue
        CALL    PUSH_MSG                ; Place the packet on the stack
        LJMP    END_PARSE

CHANGE: MOV     R1,A
        XRL     A,#'C'                  ; Change baud rate command?
        JZ      2$                      ; Yes, continue
        MOV     A,R1                    ; No, restore the Accumulator
        LJMP    LIGHT                   ; See if it's a light leds command

2$:     MOV     A,CMD_SIZE
        CJNE    A,#ZERO,5$              ; Is the size zero?
        LJMP    BAD_MSG                 ; Yes, error

5$:     CALL    INC_BUF                 ; Point to the channel number
        MOVX    A,@DPTR                 ; Read it in
        MOV     CHAN,A                  ; Save the channel number
        CLR     C                       ; Make sure the carry is clear.
        SUBB    A,#HOST_PORT+1          ; Is the channel number greater then the number of channels
        JC      7$                      ; Yes, send a bad msg report
        LJMP    BAD_MSG

7$:     DEC     CMD_SIZE
        MOV     A,CMD_SIZE              ; Get the command size that is left
        CJNE    A,#3,10$                ; Are there 3 bytes left in this command? No
        MOV     A,CHAN                  ; Yes, get the channel number
        XRL     A,#SPARE_PORT           ; It better be the spare port if there are 3 bytes in the command
        JZ      20$
        LJMP    BAD_MSG                 ; It is, continue
```

```
10$:    XRL     A,#1                    ; If there isn't 1 byte left for the command, then it's bad
        JZ      20$
        LJMP    BAD_MSG

20$:    CALL    INC_BUF                 ; Point to baud rate
        DEC     CMD_SIZE                ; Decrement the command size
        MOVX    A,@DPTR                 ; Get the baud rate
        ANL     A,#0FH                  ; Make sure it's only 4 bits long
        MOV     R3,A                    ; Save it in R3

        PUSH    DPL
        PUSH    DPH                     ; Save the buffer address

        MOV     DPTR,#BAUD_TO_TIME      ; Address of the table for a baud rate to timer conversion

        MOV     P2,#TABLE_PAGE          ; Address of the table page
        MOV     A,#LOW RX_DEF_T_O       ; Address of the default time out table (in RAM)
        ADD     A,CHAN                  ; Add in the channel number for the offset
        MOV     R0,A                    ; Store it in R0

        MOV     A,R3                    ; Use the baud rate as the table offset
        MOVC    A,@A+DPTR               ; Get the timing value for this baud rate
        MOVX    @R0,A                   ; And store it in the default time out table

        POP     DPH
        POP     DPL                     ; Restore the buffer address

        MOV     P2,#IO_PAGE             ; Addr of the DC349
        MOV     R1,#LOW BASE_CMD_R      ; Base read addr of the command register
        MOV     R7,CHAN
        CALL    CHANADR1                ; Adjust it for this channel
        MOVX    A,@R1                   ; Read in the command register
        MOV     R4,A                    ; Save it
        MOV     A,#ZERO                 ; A zero will turn off the port
        CALL    WRITE_COMMAND           ; Write to the command register

        MOV     R1,#LOW BASE_MODE_R
        CALL    CHANADR1                ; R1= read addr of the mode registers
        MOVX    A,@R1                   ; Read mode reg 1 to bump the pointer to mode reg 2

        MOV     A,R3                    ; Get the baud rate
        SWAP    A                       ; Place it in the upper nibble
        ORL     A,R3                    ; Put a duplicate in the lower nibble (same baud for Tx and Rx)
        MOV     R3,A                    ; Save it

        MOV     R1,#LOW BASE_MODE_W
        CALL    CHANADR1                ; R1= write addr of the mode register
        MOV     A,R3
        MOVX    @R1,A                   ; Write the baud rate

        MOV     A,CMD_SIZE
```

```
        CJNE    A,#ZERO,30$             ; If the size is not zero, change the other characteristics
        SJMP    100$                    ; Otherwise, turn on the channel and exit

30$:    CALL    INC_BUF                 ; Point to the parity info
        MOVX    A,@DPTR                 ; Get the parity info

        CJNE    A,#'O',32$              ; Is it odd parity? No
        MOV     R5,#ODD_PARITY          ; Yes, save the parity
        SJMP    40$                     ; Go get the bits/char

32$:    CJNE    A,#'E',34$              ; Is it even parity? No
        MOV     R5,#EVEN_PARITY         ; Yes, save the parity
        SJMP    40$                     ; Go get the bits/char

34$:    XRL     A,#'N'                  ; Is it no parity?
        JZ      36$                     ; Yes
        MOV     A,R4                    ; No, Error - Get the byte to turn on the channel again
        CALL    WRITE_COMMAND           ; Send it to the command register, so the port is not left off
        SJMP    BAD_MSG                 ; When we send the bad msg to the host.

36$:    MOV     R5,#NO_PARITY           ; Yes, save the parity

40$:    CALL    INC_BUF                 ; Point to the bits/char
        MOVX    A,@DPTR                 ; Get the bits/char
        CLR     C                       ; Make sure the carry is clear for the subtract
        SUBB    A,#5                    ; Bits/char is 5,6,7,or 8. Normalize it to a zero scale
        RLC     A                       ; Rotate it left two positions to place the bits/char
        RLC     A                       ; in the right place for the mode register
        ANL     A,#BIT3+BIT2            ; Make sure all other positions are cleared
        ORL     A,R5                    ; OR in the parity
        ORL     A,#ONE_STOP_BIT         ; And one stop bit

        MOVX    @R1,A                   ; Send it to MODE Reg. 1

100$:   MOV     A,R4                    ; Get the byte to turn on the channel again
        CALL    WRITE_COMMAND           ; Send it to the command register

        SJMP    END_PARSE

LIGHT:  CJNE    A,#'L',BAD_MSG

        CALL    INC_BUF                 ; Increment the DPTR (which has the command)
        MOVX    A,@DPTR                 ; Get the bit pattern to send to the LED's
        CALL    LIGHT_LED               ; Light the LED's

        SJMP    END_PARSE
                                        ; SEND BAD MSG REPORT
BAD_MSG:
        MOV     DPTR,#BAD_CMD_PACKET    ; Address of the bad command response packet
        MOV     A,#CMD_PORT             ; Save it in the command port to be sent on the host port
        SETB    PUSH_RX_TX              ; On the Receive queue
        CALL    PUSH_MSG                ; Place it at the rear of the queue
```

```
END_PARSE:
        MOV     R7,#CMD_PORT            ; Make sure we use the command queues
        CALL    BUMP_FRONT_TX           ; Done with the command take it out of the queue

        POP     ACC
        POP     PSW
        RET

        SUBTTL  LIGHT_LEDS
        PAGE
;;;;;;;;;;;;;;;;;;;;;;;;;;;;;;;;;;;;;;;;;;;;;;;;;;;;;;;;;;;;;;;;;;;;;;;;;;;;;;;
;
;       TITLE:  LIGHT_LEDS
;
;       DESCRIPTION:    This subroutine is used to light the diagnostic
;                       register LEDs while in operational mode.  This
;                       subroutine does not allow the setting or clearing
;                       of BIT 7 in the diagnostic register.  This is reserved
;                       for PR Rox errors only.
;
;       INPUT:  ACC = bit pattern to light the LEDs with.
;
;       OUTPUT: DIAG_REG = ACC and 7F hex
;
;;;;;;;;;;;;;;;;;;;;;;;;;;;;;;;;;;;;;;;;;;;;;;;;;;;;;;;;;;;;;;;;;;;;;;;;;;;;;;;

LIGHT_LED:
        MOV     P2,#HIGH DIAG_REG       ; Address of the diagnostic LED's
        MOV     R0,#LOW DIAG_REG        ; Low order addr. of the LED's
        ANL     A,#07FH                 ; Bit 7 can not be set or cleared from the host
        MOV     R1,A                    ; Save the pattern in R1

        MOVX    A,@R0                   ; Get the current contents of the diag. LED's
        ANL     A,#80H                  ; Clear out all the bits except for bit 7
        ORL     A,R1                    ; Or in the bit pattern from the host
        MOVX    @R0,A                   ; And send it out to the LED's
        RET
        END
```

```
N   N EEEEE W   W M   M  AAA  N   N
N   N E     W   W MM MM A   A N   N
NN  N E     W   W M M M A   A NN  N
N N N EEEE  W   W M   M A   A N N N
N  NN E     W W W M   M AAAAA N  NN
N   N E     WW WW M   M A   A N   N
N   N EEEEE W   W M   M A   A N   N

PPPPPPPP   RRRRRRRR   MM      MM    AAAAAA    IIIIII  NN      NN
PPPPPPPP   RRRRRRRR   MM      MM    AAAAAA    IIIIII  NN      NN
PP      PP RR      RR MMMM  MMMM  AA      AA    II    NN      NN
PP      PP RR      RR MMMM  MMMM  AA      AA    II    NN      NN
PP      PP RR      RR MM  MM  MM  AA      AA    II    NNNN    NN
PP      PP RR      RR MM  MM  MM  AA      AA    II    NNNN    NN
PPPPPPPP   RRRRRRRR   MM      MM  AA      AA    II    NN  NN  NN
PPPPPPPP   RRRRRRRR   MM      MM  AA      AA    II    NN  NN  NN
PP         RR  RR     MM      MM  AAAAAAAAAA    II    NN    NNNN
PP         RR  RR     MM      MM  AAAAAAAAAA    II    NN    NNNN
PP         RR    RR   MM      MM  AA      AA    II    NN      NN
PP         RR    RR   MM      MM  AA      AA    II    NN      NN
PP         RR      RR MM      MM  AA      AA  IIIIII  NN      NN
PP         RR      RR MM      MM  AA      AA  IIIIII  NN      NN

        SSSSSSSS  RRRRRRRR      CCCCCCCC    ;;;;    333333
        SSSSSSSS  RRRRRRRR      CCCCCCCC    ;;;;    333333
      SS          RR      RR  CC            ;;;;  33      33
      SS          RR      RR  CC            ;;;;  33      33
      SS          RR      RR  CC                          33
      SS          RR      RR  CC                          33
        SSSSSS    RRRRRRRR    CC            ;;;;        33
        SSSSSS    RRRRRRRR    CC            ;;;;        33
              SS  RR  RR      CC            ;;;;          33
              SS  RR  RR      CC            ;;;;          33
  ....        SS  RR    RR    CC              ;;  33      33
  ....        SS  RR    RR    CC              ;;  33      33
  ....  SSSSSSSS  RR      RR    CCCCCCCC    ;;      333333
  ....  SSSSSSSS  RR      RR    CCCCCCCC    ;;      333333
```

File _512SDUA14:[RSMSS.DQS]PRMAIN.SRC;3 (1144,8866,0), last revised on 10-AUG-1987 11:14, is a 24 block sequential file owned by UIC [DOC,RSMSQUEUE]. The records are variable length with implied (CR) carriage control. The longest record is 0 bytes.

Job DIAGINTS (371) queued to SYS$PRINT on 10-AUG-1987 11:12 by user NEWMAN, UIC [DOC,RSMSQUEUE], under account at priority 100, started on printer _MILES$LPC0: on 10-AUG-1987 11:15 from queue SYS$PRINT.

```
JJJJJJJJJJ    4444444444444444444444444444444444444444444444444444444444444444444444444444444444444444444444    JJJJJJJJJJ
JJJJJJJJJJ    4444444444444444444444444  Digital Equipment Corporation - VAX/VMS Version V4.5  4444444444444444444444444    JJJJJJJJJJ
JJJJJJJJJJ    4444444444444444444444444444444444444444444444444444444444444444444444444444444444444444444444    JJJJJJJJJJ
```

VAX/VMS VAX/VMS VAX/VMS VAX/VMS VAX/VMS VAX/VMS VAX/VMS VAX/VMS VAX/VMS VAX/VMS VAX/VMS VAX/VMS
VAX/VMS VAX/VMS VAX/VMS VAX/VMS VAX/VMS VAX/VMS VAX/VMS VAX/VMS VAX/VMS VAX/VMS VAX/VMS VAX/VMS
VAX/VMS VAX/VMS VAX/VMS VAX/VMS VAX/VMS VAX/VMS VAX/VMS VAX/VMS VAX/VMS VAX/VMS VAX/VMS VAX/VMS
VAX/VMS VAX/VMS VAX/VMS VAX/VMS VAX/VMS VAX/VMS VAX/VMS VAX/VMS VAX/VMS VAX/VMS VAX/VMS VAX/VMS
VAX/VMS VAX/VMS VAX/VMS VAX/VMS VAX/VMS VAX/VMS VAX/VMS VAX/VMS VAX/VMS VAX/VMS VAX/VMS VAX/VMS

Digital Equipment Corporation - VAX/VMS Version V4.5

NEWMAN

PRMAIN

.SRC;3

```
File _$12$DUA14:[RSMSS.DOS]PRMAIN.SRC;3 (1144,8866,0), last revised on 10-AUG-1987 11:14, is a 24 block sequential file owned by
UIC [DOC,RSMSQUEUE]. The records are variable length with implied (CR) carriage control. The longest record is 0 bytes.

Job DIAGINTS (471) queued to SYS$PRINT on 10-AUG-1987 11:12 by user NEWMAN, UIC [DOC,RSMSQUEUE], under account  at priority 100,
started on printer _MILES$LPC0: on 10-AUG-1987 11:15 from queue SYS$PRINT.

JJJJJJJJJJ    4444444444444444444444444444444444444444444444444444444444444444444444444444444444444444444444444444    JJJJJJJJJJ
JJJJJJJJJJ    4444444444444444444444  Digital Equipment Corporation - VAX/VMS Version V4.5  4444444444444444444444    JJJJJJJJJJ
JJJJJJJJJJ    4444444444444444444444444444444444444444444444444444444444444444444444444444444444444444444444444444    JJJJJJJJJJ

        nmlist
        title PR BOX MAIN
        space 3
;;;;;;;;;;;;;;;;;;;;;;;;;;;;;;;;;;;;;;;;;;;;;;;;;;;;;;;;;;;;;;;;;;;;;;;;;;;;;;;;;
;
;       FILE:    PRMAIN.SRC
;
;       DESCRIPTION:     This file has the background routine for the PR Box.
;                        It looks for conditions to act on which have happened
;                        asynchronously (Receive, from ports, send an ACK/NACK,
;                        etc.).  The background routine transfers buffer addresses
;                        from Rx queues to Tx queues, and enables the transmitters.
;
;       CHANGES
;------------------------------  RL2  ----------------------------------------
;
;               9/9/86  Modified BACKGROUND_LOOP - Created a subroutine out of
;                       the code to transfer a buffer address from a Rx queue
;                       to a Tx queue (BUFFER_MOVE).  Also made the main loop
;                       so that no channels were prioritised.
;
;;;;;;;;;;;;;;;;;;;;;;;;;;;;;;;;;;;;;;;;;;;;;;;;;;;;;;;;;;;;;;;;;;;;;;;;;;;;;;;;;

        NLIST                           ; Don't list everything out here
        INCLUDE         EXTERNAL.SRC
        INCLUDE         EQUATES.SRC
        LIST


        EXTERN          CHANAD,INC_BUF,TEST_BIT,PARSE_COMMAND
        EXTERN          READ_COMMAND,WRITE_COMMAND

        INTERN          BACKGROUND_LOOP,ENABLE_TX,PUSH_MSG
        page
;
; COPYRIGHT (C) 1986
; DIGITAL EQUIPMENT CORPORATION, MAYNARD, MASSACHUSETTS 01754
;
; THIS SOFTWARE IS FURNISHED  UNDER A LICENSE FOR USE ONLY ON A SINGLE
; COMPUTER  SYSTEM AND  MAY BE  COPIED ONLY WITH  THE INCLUSION OF THE
; ABOVE COPYRIGHT NOTICE.  THIS SOFTWARE, OR ANY OTHER COPIES THEREOF,
```

```
; MAY NOT BE PROVIDED OR  OTHERWISE MADE AVAILABLE TO ANY OTHER PERSON
; EXCEPT FOR USE ON SUCH SYSTEM AND TO ONE WHO AGREES TO THESE LICENSE
; TERMS.  TITLE TO AND  OWNERSHIP OF THE  SOFTWARE  SHALL AT ALL TIMES
; REMAIN IN DEC.
;
; THE INFORMATION IN THIS SOFTWARE IS SUBJECT TO CHANGE WITHOUT NOTICE
; AND SHOULD  NOT BE CONSTRUED  AS A COMMITMENT  BY DIGITAL  EQUIPMENT
; CORPORATION.
;
; DEC ASSUMES  NO  RESPONSIBILITY  FOR  THE USE OR  RELIABILITY OF ITS
; SOFTWARE ON EQUIPMENT WHICH IS NOT SUPPLIED BY DEC.


        RSECT   PRCODE

        SUBTTL  BACKGROUND_LOOP
        PAGE
;;;;;;;;;;;;;;;;;;;;;;;;;;;;;;;;;;;;;;;;;;;;;;;;;;;;;;;;;;;;;;;;;;;;;;;;;;;;;;
;
;       NAME:   BACKGROUND_LOOP
;
;       DESCRIPTION:  This module contains the background routines for the
;                     operation of the PR Box.  It will scan the queues to
;                     see if they are empty, and take the appropriate action
;                     if they are not.
;
;       Input:  Receive and Transmit queues, and their appropriate pointers.
;
;       Output:
;;;;;;;;;;;;;;;;;;;;;;;;;;;;;;;;;;;;;;;;;;;;;;;;;;;;;;;;;;;;;;;;;;;;;;;;;;;;;;

BACKGROUND_LOOP:
        MOV     R7,#ZERO                ; Initialize R7 to point at channel 0
        MOV     R0,#REAR_RX_QUE_PTR     ; Initialize R0 to point at the rear receive que pointers
        MOV     R1,#FRONT_RX_QUE_PTR    ; Initialize R0 to point at the front receive que pointers

10$:    MOV     A,@R1                   ; Place the current queue's front pointer in the accumulator
        XRL     A,@R0                   ; Is it equal with the rear??
        JZ      20$                     ; Yes, nothing is in the queue

        ACALL   BUFFER_MOVE             ; NO, something is in the queue

20$:    INC     R7                      ; Look at the next channel
        INC     R0                      ; Point to the next REAR pointer
        INC     R1                      ; Point to the next FRONT pointer
        CJNE    R7,#CMD_PORT + 1,10$    ; Are we past the last virtual channel? No, see if this queue is empty

; See if there is anything in the transmitter queues

        MOV     R7,#ZERO                ; Initialize R7 to point at channel 0
        MOV     R0,#REAR_TX_QUE_PTR     ; Initialize R0 to point at the rear transmit que pointers
```

```
        MOV     R1,#FRONT_TX_QUE_PTR    ; Initialize R1 to point at the front transmit que pointers

15$:    MOV     A,R7
        XRL     A,#HOST_PORT + 1
        JZ      50$                     ; If we're past the last channel go check the command queue
        MOV     A,@R1                   ; Place the current queue's front pointer in the accumulator
        XRL     A,@R0                   ; Is it equal with the rear??
        JZ      17$                     ; YES, nothing is in the queue

16$:    MOV     A,TX_IN_PROCESS         ; See if we are already transmitting on
        LCALL   TEST_BIT                ; channel
        JC      17$                     ; Yes, skip it for now

        ACALL   ENABLE_TX               ; Enable the transmitter interrupt for this channel

17$:    INC     R7                      ; Yes, the queue is empty, look at the next one
        INC     R0                      ; Point to the next REAR pointer
        INC     R1                      ; Point to the next FRONT pointer
        CJNE    R7,#HOST_PORT,15$       ; Are we at the last channel? No, see if this queue is empty
                                        ; Yes, check for various other conditions on the host port
        JB      SEND_ACK,16$            ; For instance, enable the transmitter if we have to send an ACK
        JB      SEND_NACK,16$           ; Or, enable the transmitter if we have to send a NACK

        JNB     SEND_KA,40$             ; If we don't have to send a Keep alive,
        MOV     A,#HOST_PORT            ; Port to send the keep alive (host)
        MOV     DPTR,#KA_PACKET         ; Keep alive packet to send
        CLR     PUSH_RX_TX              ; Push the keep alive msg on the back of the host
        CALL    PUSH_MSG                ; port transmit queue
        JC      40$                     ; Queue was full, try to empty it

        CLR     SEND_KA                 ; Clear the flag, it was put in the queue
        SJMP    16$                     ; Turn on the transmitter

40$:    JNB     WAIT_ACK_NACK,15$       ; If we don't have to wait for an ACK/NACK, check the queue

50$:    MOV     R0,#REAR_TX_QUE_PTR+CMD_PORT ; Point to the rear of the PR Box command que
        MOV     R1,#FRONT_TX_QUE_PTR+CMD_PORT ; Point to the front of the PR Box command queue
        MOV     R7,#CMD_PORT            ; Command queue (logical channel 8)

        MOV     A,@R1                   ; Place the queue's front pointer in the accumulator
        XRL     A,@R0                   ; Is it equal with the rear??
        JZ      BACKGROUND_LOOP         ; Yes, que is empty, start from the beginning

        CALL    PARSE_COMMAND           ; No, execute the command in the buffer

        SJMP    BACKGROUND_LOOP         ; Start looking from channel zero again.

        SUBTTL  BUFFER_MOVE
        PAGE
```

```
;;;;;;;;;;;;;;;;;;;;;;;;;;;;;;;;;;;;;;;;;;;;;;;;;;;;;;;;;;;;;;;;;;;;;;;;;;;;;;;;
;
;       TITLE:  BUFFER_MOVE
;
;       DESCRIPTION:    This subroutine will move a received buffer address
;                       from a receive queue to a transmit queue.  It will
;                       do this only if the transmit queue is empty.  If the
;                       que is the host que,  the channel to transmit it to
;                       is the first byte in the buffer.  If the receive was
;                       on any other channel, it will be transmitted on the
;                       host port.
;
;       INPUT:  R7 = Rx channel number
;               R0 = Address of the REAR_RX_QUE_PTR
;               R1 = Address of the FRONT_RX_QUE_PTR
;
;       OUTPUT: -The buffer at the front of the Rx que, is moved to the rear
;               of the appropriate Tx queue.
;               -(R1) is incremented by two (The FRONT_RX_QUE_PTR for that channel
;               -The REAR_TX_QUE_PTR for that channel is incremented by two.
;
;;;;;;;;;;;;;;;;;;;;;;;;;;;;;;;;;;;;;;;;;;;;;;;;;;;;;;;;;;;;;;;;;;;;;;;;;;;;;;;;

BUFFER_MOVE:

        MOV     A,R0
        PUSH    ACC                     ; Save register 0
        MOV     A,R1
        PUSH    ACC                     ; Save register 1

        MOV     A,R7                    ; Get the channel number
        ADD     A,#BASE_RX_PAGE         ; Add the base Rx queue page to get the appropriate queue
        MOV     P2,A                    ; Use that as the upper 8 bits of the addr for the Rx queue
        CJNE    R7,#HOST_PORT,30$       ; Was it the host port queue? No, move the rcvd. buffer to the host channel Tx queue.
                                        ; Yes,it was the host port,  find out where to transfer the buffer to
        MOV     A,#NEXT_PTR
        ADD     A,@R1                   ; Point to the 1st buffer in the queue
        MOV     R0,A                    ; Use R0

        MOVX    A,@R0                   ; Get the lower buffer address
        MOV     DPL,A                   ; And place it in DPL
        INC     R0                      ; Point to the Upper address bits
        MOVX    A,@R0
        MOV     DPH,A                   ; Put the upper address bits in DPH

        MOVX    A,@DPTR                 ; Get the first byte in the buffer, the destination
        LCALL   INC_BUF                 ; Point to the size byte
        ANL     A,#HOST_PORT            ; Only want lower 3 bits (destination)
        CJNE    A,#HOST_PORT,10$        ; If the msg. was not a PR Box command, continue
        MOV     A,#CMD_PORT             ; It is a PR Box cmd, set up to move the msg to the
                                        ; PR Box command queue (logical transmit queue 8)
```

```
10$:    CLR     PUSH_RX_TX          ; To indicate the msg should go to a Tx queue
        CALL    PUSH_MSG            ; Push the msg addr. on the rear of the approp. Tx queue
        JC      20$                 ; Transfer failed (queue full) don't bump the front of the Rx queue

        POP     ACC
        MOV     R1,A                ; Restore register 1
        POP     ACC
        MOV     R0,A                ; Restore Register 0

15$:    INC     @R1                 ; Increment the front of the Rx que pointer
        INC     @R1                 ; since the buffer was transferred successfully
        SJMP    END_XFER

30$:    MOV     A,@R1               ; Get the pointer to the front of the queue
        ADD     A,#NEXT_PTR         ; Point to the first buffer address in the queue
        MOV     R0,A                ; Put it in RC to use as an external fetch

        MOVX    A,@R0               ; Get the received buffer lower address bits
        MOV     DPL,A               ; And save it in DPL
        INC     R0                  ; Point to the high byte of the address
        MOVX    A,@R0               ; Do the same for  the upper byte
        MOV     DPH,A               ; And save it in DPH

        MOV     A,#HOST_PORT        ; Port number to check the Tx que
        SJMP    10$                 ; Now, make sure that the HOST PORT Tx buffer isnt full before transferring the buffer

20$:
        POP     ACC
        MOV     R1,A                ; Restore R1
        POP     ACC
        MOV     R0,A                ; Restore RC
END_XFER:
        RET

        SUBTTL  ENABLE_TX
        PAGE
;;;;;;;;;;;;;;;;;;;;;;;;;;;;;;;;;;;;;;;;;;;;;;;;;;;;;;;;;;;;;;;;;;;;;;;;;;;;;;;;;;;;;;;;;;;
;
;       NAME:   ENABLE_TX
;
;       DESCRIPTION:    This routine will set the transmitter enable bit in the
;                       command register of the DC349 for the channel specified
;                       in Register 7.
;
;       INPUT: R7 = Channel number
;
;       NAME:   ENABLE_TX
;
;       DESCRIPTION:    This routine will set the transmitter enable bit in the
;                       command register of the DC349 for the channel specified
;                       in Register 7.
;
```

```
;       INPUT: R7 = Channel number
;

;       OUTPUT: Tx Interrupt enable bit will be set in the appropriate
;               SC369 command register.
;
;;;;;;;;;;;;;;;;;;;;;;;;;;;;;;;;;;;;;;;;;;;;;;;;;;;;;;;;;;;;;;;;;;;;;;;;;;;;;;;;

ENABLE_TX:
        PUSH    ACC
        CALL    READ_COMMAND            ; Read the command reg. for this channel

        ORL     A,#TXIE_BIT             ; Set the transmitter interrupt enable bit

        CALL    WRITE_COMMAND           ; Write back the command reg.
        POP     ACC
        RET

        SUBTTL  PUSH_MSG
        PAGE
;;;;;;;;;;;;;;;;;;;;;;;;;;;;;;;;;;;;;;;;;;;;;;;;;;;;;;;;;;;;;;;;;;;;;;;;;;;;;;;;
;
;       TITLE:  PUSH_MSG
;
;       DESCRIPTION:    This subroutine pushes a buffer address from the
;                       front of a receive queue to the rear of a transmit
;                       queue.
;
;       INPUT:  DPTR = Buffer address to transfer
;               A = Channel to transfer to (Tx or Rx_queue)
;               PUSH_RX_TX = 1 to transfer addr to Rx queue
;                          = 0 to transfer addr to Tx queue
;
;       OUTPUT: Carry is set if transfer was not done due to full queue
;               Tx or Rx_queue(channel) = DPTR
;
;;;;;;;;;;;;;;;;;;;;;;;;;;;;;;;;;;;;;;;;;;;;;;;;;;;;;;;;;;;;;;;;;;;;;;;;;;;;;;;;

PUSH_MSG:
        MOV     R3,A                    ; Save the channel number to transfer to in R3
        JNB     PUSH_RX_TX,10$          ; Push to the rear of a transmit queue

        ADD     A,#BASE_RX_PAGE
        MOV     P2,A                    ; Point to the Rx que page to check for an overflow condition

        MOV     A,#REAR_RX_BUF_PTR      ; Rear receive queue pointer
        ADD     A,R3                    ; Adjust to point to the appropriate channel
        MOV     R0,A                    ; Place it in R0 to use as an indirect pointer
        MOV     A,#FRONT_RX_QUE_PTR     ; Front receive que pointer
        ADD     A,R3                    ; Adjust to point to the appropriate channel
        MOV     R1,A                    ; Place the front pointer in R1
        SJMP    20$
```

BEST AVAILABLE COPY

```
10$:    ADD     A,#BASE_TX_PAGE
        MOV     P2,A                    ; Point to the Tx que page to check for an overflow condition

        MOV     A,#REAR_TX_QUE_PTR      ; Rear transmit queue pointer
        ADD     A,R3                    ; Adjust to point to the appropriate channel
        MOV     R0,A                    ; Place it in R0 to use as an indirect pointer
        MOV     A,#FRONT_TX_QUE_PTR     ; Front transmit que pointer
        ADD     A,R3                    ; Adjust to point to the appropriate channel
        MOV     R1,A                    ; Place the front pointer in R1

20$:    MOV     A,@R0                   ; Get the pointer
        ADD     A,#NEXT_PTR             ; Look at where the next buffer would be placed
        XRL     A,@R1                   ; Check to see if they are equal after the rear pointer is incremented
        JZ      30$                     ; They're equal, can't transfer the buffer
                                        ; Not equal, go through with the x-fer
        INC     @R0                     ; Now we can actually increment the pointer
        INC     @R0                     ; since we know it won't overflow
        MOV     A,@R0
        MOV     R0,A                    ; Place the pointer in R0, so we don't inc. it anymore

        MOV     A,DPL
        MOVX    @R0,A                   ; Store the lower address
        INC     R0
        MOV     A,DPH
        MOVX    @R0,A                   ; Store the upper address
        CLR     C                       ; Successful transfer
        RET

30$:    SETB    C                       ; Transfer was not successful (full buffer)
        RET

        END
```

```
KKKKKKKKK    44444444444444444444444444444444444444444444444444444444444444444444444444444444444444444444    KKKKKKKKK
KKKKKKKKK    4444444444444444444444444  Digital Equipment Corporation - VAX/VMS Version V4.5  4444444444444444444444444    KKKKKKKKK
KKKKKKKKK    44444444444444444444444444444444444444444444444444444444444444444444444444444444444444444444    KKKKKKKKK
```

```
N   N  EEEEE  W   W  M   M   AAA   N   N
N   N  E      W   W  MM MM  A   A  N   N
NN  N  E      W   W  M M M  A   A  NN  N
N N N  EEEE   W   W  M   M  A   A  N N N
N  NN  E      W W W  M   M  AAAAA  N  NN
N   N  E      WW WW  M   M  A   A  N   N
N   N  EEEEE  W   W  M   M  A   A  N   N

RRRRRRRR    WW          WW  MM        MM
RRRRRRRR    WW          WW  MM        MM
RR      RR  WW          WW  MMMM    MMMM
RR      RR  WW          WW  MMMM    MMMM
RR      RR  WW          WW  MM  MM  MM
RR      RR  WW          WW  MM  MM  MM
RRRRRRRR    WW          WW  MM        MM
RRRRRRRR    WW          WW  MM        MM
RR  RR      WW    WW    WW  MM        MM
RR  RR      WW    WW    WW  MM        MM
RR    RR    WWWW    WWWW    MM        MM
RR    RR    WWWW    WWWW    MM        MM
RR      RR  WW          WW  MM        MM
RR      RR  WW          WW  MM        MM

         SSSSSSSS  RRRRRRRR        CCCCCCCC    ;;;;     333333
         SSSSSSSS  RRRRRRRR        CCCCCCCC    ;;;;     333333
       SS          RR      RR  CC              ;;;;   33      33
       SS          RR      RR  CC              ;;;;   33      33
       SS          RR      RR  CC                             33
       SS          RR      RR  CC                             33
         SSSSSS    RRRRRRRR    CC              ;;;;         33
         SSSSSS    RRRRRRRR    CC              ;;;;         33
               SS  RR  RR      CC              ;;;;           33
               SS  RR  RR      CC              ;;;;           33
....           SS  RR    RR    CC                ;;   33      33
....           SS  RR    RR    CC                ;;   33      33
....   SSSSSSSS    RR      RR    CCCCCCCC      ;;       333333
....   SSSSSSSS    RR      RR    CCCCCCCC      ;;       333333
```

File _$17$DUA14:[RSMSS.DOS]RWM.SRC;3 (1151,8885,0), last revised on 10-AUG-1987 11:14, is a 19 block sequential file owned by UIC [DOC,RSMSQUEUE]. The records are variable length with implied (CR) carriage control. The longest record is 0 bytes.

Job DIAGINTS (371) queued to SYS$PRINT on 10-AUG-1987 11:12 by user NEWMAN, UIC [DOC,RSMSQUEUE], under account at priority 100, started on printer _MILES$LPC0: on 10-AUG-1987 11:15 from queue SYS$PRINT.

```
KKKKKKKKK    44444444444444444444444444444444444444444444444444444444444444444444444444444444444444444444    KKKKKKKKK
KKKKKKKKK    4444444444444444444444444  Digital Equipment Corporation - VAX/VMS Version V4.5  4444444444444444444444444    KKKKKKKKK
KKKKKKKKK    44444444444444444444444444444444444444444444444444444444444444444444444444444444444444444444    KKKKKKKKK
```

```
VAX/VMS  VAX/VMS  VAX/VMS  VAX/VMS  VAX/VMS  VAX/VMS  VAX/VMS  VAX/VMS  VAX/VMS  VAX/VMS  VAX/VMS  VAX/VMS
VAX/VMS  VAX/VMS  VAX/VMS  VAX/VMS  VAX/VMS  VAX/VMS  VAX/VMS  VAX/VMS  VAX/VMS  VAX/VMS  VAX/VMS  VAX/VMS
VAX/VMS  VAX/VMS  VAX/VMS  VAX/VMS  VAX/VMS  VAX/VMS  VAX/VMS  VAX/VMS  VAX/VMS  VAX/VMS  VAX/VMS  VAX/VMS
VAX/VMS  VAX/VMS  VAX/VMS  VAX/VMS  VAX/VMS  VAX/VMS  VAX/VMS  VAX/VMS  VAX/VMS  VAX/VMS  VAX/VMS  VAX/VMS
VAX/VMS  VAX/VMS  VAX/VMS  VAX/VMS  VAX/VMS  VAX/VMS  VAX/VMS  VAX/VMS  VAX/VMS  VAX/VMS  VAX/VMS  VAX/VMS

KKKKKKKKKK   44444444444444444444444444444444444444444444444444444444444444444444444444444444444444444444   KKKKKKKKKK
KKKKKKKKKK   44444444444444444444444  Digital Equipment Corporation - VAX/VMS Version V4.5  4444444444444444444444   KKKKKKKKKK
KKKKKKKKKK   44444444444444444444444444444444444444444444444444444444444444444444444444444444444444444444   KKKKKKKKKK
```

NEWMAN

RWM

SRC:3

```
File _$12$DUA14:[RSMSS.DOS]RWM.SRC;3 (1151,8885,0), last revised on 10-AUG-1987 11:14, is a 19 block sequential file owned by UIC
[DOC,RSMSQUEUE]. The records are variable length with implied (CR) carriage control. The longest record is 0 bytes.

Job DIAGINTS (371) queued to SYS$PRINT on 10-AUG-1987 11:12 by user NEWMAN, UIC [DOC,RSMSQUEUE], under account  at priority 100,
started on printer _MILES$LPCO: on 10-AUG-1987 11:15 from queue SYS$PRINT.

KKKKKKKKK    4444444444444444444444444444444444444444444444444444444444444444444444444444444444444444444444444    KKKKKKKKK
KKKKKKKKK    4444444444444444444444444  Digital Equipment Corporation - VAX/VMS Version V4.5  4444444444444444444444444    KKKKKKKKK
KKKKKKKKK    4444444444444444444444444444444444444444444444444444444444444444444444444444444444444444444444444    KKKKKKKKK

;
; COPYRIGHT (C) 1986
; DIGITAL EQUIPMENT CORPORATION, MAYNARD, MASSACHUSETTS 01754
;
; THIS SOFTWARE IS FURNISHED  UNDER A LICENSE FOR USE ONLY ON A SINGLE
; COMPUTER  SYSTEM AND  MAY BE  COPIED ONLY WITH  THE INCLUSION OF THE
; ABOVE COPYRIGHT NOTICE.  THIS SOFTWARE, OR ANY OTHER COPIES THEREOF,
; MAY NOT BE PROVIDED OR  OTHERWISE MADE AVAILABLE TO ANY OTHER PERSON
; EXCEPT FOR USE ON SUCH SYSTEM AND TO ONE WHO AGREES TO THESE LICENSE
; TERMS.  TITLE TO AND  OWNERSHIP OF THE  SOFTWARE  SHALL AT ALL TIMES
; REMAIN IN DEC.
;
; THE INFORMATION IN THIS SOFTWARE IS SUBJECT TO CHANGE WITHOUT NOTICE
; AND SHOULD  NOT BE CONSTRUED  AS A COMMITMENT  BY DIGITAL  EQUIPMENT
; CORPORATION.
;
; DEC ASSUMES  NO  RESPONSIBILITY  FOR  THE USE OR  RELIABILITY OF ITS
; SOFTWARE ON EQUIPMENT WHICH IS NOT SUPPLIED BY DEC.
        SUBTTL  RWM
        PAGE


        PUBLIC  STKSIZ,BANKS,FLAGGS,RX_IN_PROCESS,TX_IN_PROCESS,RX_TX_FLAGS
        PUBLIC  SYS_FLAGS,TX_CHECKSUM,RX_CHECKSUM,HOST_SIZE,TX_SIZE,ERCODE
        PUBLIC  CHAN,PUSH_RX_TX
        PUBLIC  NACK_COUNT,CMD_SIZE,CONFIG_BYTE,FLAG_1,DIAG_TEST,ERROR_FLAG
        PUBLIC  TX_INTR,RX_0,RX_1,RX_2,RX_3,RX_4,RX_5,RX_6,RX_7
        PUBLIC  TX_0,TX_1,TX_2,TX_3,TX_4,TX_5,TX_6,TX_7,CHANNEL_RCVD,SIZE_RCVD
        PUBLIC  READ_ERROR,CHANNEL_SENT,SIZE_SENT,SEND_ACK
        PUBLIC  SEND_NACK,IN_RX,WAIT_ACK_NACK,SEND_KA,NO_HOST,SYS_STARTUP
        PUBLIC  PASS_FAIL,MAN_MODE,REAR_RX_QUE_PTR,FRONT_RX_QUE_PTR
        PUBLIC  REAR_TX_QUE_PTR,FRONT_TX_QUE_PTR,SPS,BASE_RX_PAGE,RX_0_QUE
        PUBLIC  RX_7_QUE,BASE_TX_PAGE,TX_0_QUE,TX_7_QUE,TABLE_PAGE,RX_BUFFERS
        PUBLIC  TX_BUFFERS,TX_SIZE_TBL,RX_DEF_T_O,RX_TIME_OUT,KA_TIMER
        PUBLIC  ACK_NACK_TIMER,TEMP_SEND,KA_PACKET,BAD_CMD_PACKET,DIAG_PACKET
        PUBLIC  DIAG_PAC_SIZE,DEV_CHNG_PACKET,CH0_BUFFER,CH1_BUFFER,CH2_BUFFER
        PUBLIC  CH3_BUFFER,CH4_BUFFER,CH5_BUFFER,CH6_BUFFER,CH7_BUFFER
        PUBLIC  END_BUFFER_SPACE,PORT_TIME_OUT,QUE_PTR_LENGTH
```

```
;***********************************************************************;
;*                                                                     *;
;*      DS literal                                                     *;
;*                                                                     *;
;***********************************************************************;

STKSIZ  DATA    40H     ; Number of bytes reserved in stack area


;***********************************************************************;
;*                                                                     *;
;*      Internal RWM                                                   *;
;*                                                                     *;
;***********************************************************************;

        DSEG
        ORG     0000H
BANKS:  DS      20H     ; 4 register banks
FLAGGS: DS      1H

RX_IN_PROCESS:  DS      1H      ; Flags for each port recievers
TX_IN_PROCESS:  DS      1H      ; Flags for each port transmitters
RX_TX_FLAGS:    DS      1H      ; Flags for the receivers
SYS_FLAGS:      DS      1H      ; System flags
TX_CHECKSUM:    DS      1H      ; Checksum calculated for the current transmission
RX_CHECKSUM:    DS      1H      ; Checksum calculated for the current reception

HOST_SIZE:      DS      1H      ; Size of the msg data being received on the host channel
TX_SIZE:        DS      1H      ; Size of the msg data being transmited (local variable)
ERCODE:         DS      1H      ; Error code byte for diagnostics
NACK_COUNT:     DS      1H      ; Count for the number of times a NACK is rcvd for a msg
CMD_SIZE:       DS      1H      ; Temp. for holding the size byte when a command is received
CONFIG_BYTE:    DS      1H      ; Holding location for the system configuration
CHAN:           DS      1H      ; Holding loc. for the channel in the change baud rate command
;
;***********************************************************************;
;*                                                                     *;
;*      BIT FLAGS                                                      *;
;*                                                                     *;
;***********************************************************************;

FLAG_1          BIT     FLAGGS.0
DIAG_TEST BIT   FLAGGS.1        ; Set for using the diagnostic uart routine
ERROR_FLAG BIT  FLAGGS.2        ; Set when an error was found in the diagnostics
TX_INTR BIT     FLAGGS.3        ; Set in the diagnostic transmitter interrupt routine

RX_0    BIT     RX_IN_PROCESS.0 ; Receiving on channel 0
RX_1    BIT     RX_IN_PROCESS.1 ; Receiving on channel 1
```

```
RX_2      BIT      RX_IN_PROCESS.2 ; Receiving on channel 2
RX_3      BIT      RX_IN_PROCESS.3 ; Receiving on channel 3
RX_4      BIT      RX_IN_PROCESS.4 ; Receiving on channel 4
RX_5      BIT      RX_IN_PROCESS.5 ; Receiving on channel 5
RX_6      BIT      RX_IN_PROCESS.6 ; Receiving on channel 6
RX_7      BIT      RX_IN_PROCESS.7 ; Receiving on channel 7

TX_0      BIT      TX_IN_PROCESS.0 ; Transmitting on channel 0
TX_1      BIT      TX_IN_PROCESS.1 ; Transmitting on channel 1
TX_2      BIT      TX_IN_PROCESS.2 ; Transmitting on channel 2
TX_3      BIT      TX_IN_PROCESS.3 ; Transmitting on channel 3
TX_4      BIT      TX_IN_PROCESS.4 ; Transmitting on channel 4
TX_5      BIT      TX_IN_PROCESS.5 ; Transmitting on channel 5
TX_6      BIT      TX_IN_PROCESS.6 ; Transmitting on channel 6
TX_7      BIT      TX_IN_PROCESS.7 ; Transmitting on channel 7

CHANNEL_RCVD     BIT     RX_TX_FLAGS.0    ; Channel number received flag
SIZE_RCVD        BIT     RX_TX_FLAGS.1    ; Size of the msg data received flag
READ_ERROR       BIT     RX_TX_FLAGS.2    ; Flag set when there was an error reading the character
CHANNEL_SENT     BIT     RX_TX_FLAGS.3    ; Channel sent flag for host transmit routine
SIZE_SENT        BIT     RX_TX_FLAGS.4    ; Size sent flag for host transmit routine
PUSH_RX_TX       BIT     RX_TX_FLAGS.5    ; If PUSH_RX_TX=1 then push the msg on the rear of the Rx queue, Tx otherwise

SEND_ACK         BIT     SYS_FLAGS.0      ; Flag to send an ACK
SEND_NACK        BIT     SYS_FLAGS.1      ; Flag to send a NACK
IN_RX            BIT     SYS_FLAGS.2      ; Flag set while in the receiver interrupt
WAIT_ACK_NACK    BIT     SYS_FLAGS.3      ; Flag to indicate we are waiting for an ACK/NACK from the host
SEND_KA          BIT     SYS_FLAGS.4      ; Flag set to send a keep alive.
NO_HOST          BIT     SYS_FLAGS.5      ; Flag set when the host does not ACK/NACK a packet
SYS_STARTUP      BIT     SYS_FLAGS.6      ; Flag set to indicate we are just starting up

PASS_FAIL        BIT     P1.6             ; Status reporting flag (0 = diagnostics failed)
MAN_MODE         BIT     P1.7             ; Bit to see what mode we are in (0 = Manufacturing)

; NOTE: The extra pointer for the rear and front of the queues are for the
;       commands directed to the PR Box itself, and the msgs. from the PR box

REAR_RX_QUE_PTR: DS      9        ; Table of ptrs to the rear of each channels receiver queue
FRONT_RX_QUE_PTR: DS     9        ; Table of ptrs to the front of each channels receiver queue

REAR_TX_QUE_PTR: DS      9        ; Table of ptrs to the rear of each channels transmitter queue
FRONT_TX_QUE_PTR: DS     9        ; Table of ptrs to the front of each channels transmitter queue
QUE_PTR_LENGTH   EQU     $-REAR_RX_QUE_PTR  ; Number of que pointer locations
SPS      EQU     $                ; Stack area

;*****************************************************************;
;*                                                               *;
;*      External RAM                                             *;
;*                                                               *;
;*****************************************************************;

        XSEG
        ORG     2000H
```

```
BASE_RX_PAGE     XDATA   HIGH $   ; Base page for the receiver queues
RX_0_QUE:        DS      100H     ; Receiver queue for channel 0
RX_1_QUE:        DS      100H     ; Receiver queue for channel 1
RX_2_QUE:        DS      100H     ; Receiver queue for channel 2
RX_3_QUE:        DS      100H     ; Receiver queue for channel 3
RX_4_QUE:        DS      100H     ; Receiver queue for channel 4
RX_5_QUE:        DS      100H     ; Receiver queue for channel 5
RX_6_QUE:        DS      100H     ; Receiver queue for channel 6
RX_7_QUE:        DS      100H     ; Receiver queue for channel 7
RX_CMD_QUE:      DS      100H     ; Msgs. to be sent out on the host port
                                  ; are first placed here in case the host Tx que
                                  ; is full

BASE_TX_PAGE     XDATA   HIGH $   ; Base page for the transmitter queues
TX_0_QUE:        DS      100H     ; Transmitter queue for channel 0
TX_1_QUE:        DS      100H     ; Transmitter queue for channel 1
TX_2_QUE:        DS      100H     ; Transmitter queue for channel 2
TX_3_QUE:        DS      100H     ; Transmitter queue for channel 3
TX_4_QUE:        DS      100H     ; Transmitter queue for channel 4
TX_5_QUE:        DS      100H     ; Transmitter queue for channel 5
TX_6_QUE:        DS      100H     ; Transmitter queue for channel 6
TX_7_QUE:        DS      100H     ; Transmitter queue for channel 7
TX_CMD_QUE:      DS      100H     ; Que for commands to the PR Box

;       ORG      3200H            ; Begining of the buffer space
CH0_BUFFER:      DS      300H     ; Reserve 3/4K for channel 0
CH1_BUFFER:      DS      800H     ; Reserve 2K for channel 1
CH2_BUFFER:      DS      800H     ; Reserve 2K for channel 2
CH3_BUFFER:      DS      600H     ; Reserve 1.5K for channel 3
CH4_BUFFER:      DS      300H     ; Reserve 3/4K for channel 4
CH5_BUFFER:      DS      300H     ; Reserve 3/4K for channel 5
CH6_BUFFER:      DS      300H     ; Reserve 3/4K for channel 6
CH7_BUFFER:      DS      0B00H    ; Reserve 2.75K for channel 7
END_BUFFER_SPACE XDATA   HIGH $   ; End of the buffer space

        ORG      5F00H            ; TABLE PAGE
TABLE_PAGE       XDATA   HIGH $   ; Base page for various tables
RX_BUFFERS:      DS      10H      ; Pointers for each channel to the next free byte in the receiver buffer
TX_BUFFERS:      DS      10H      ; Pointers for each channel to the next byte to send in the transmitter buffer
TX_SIZE_TBL:     DS      08H      ; Number of bytes left to send (transmit)
RX_DEF_T_O:      DS      08H      ; Default timer values for each receiver port
RX_TIME_OUT:     DS      08H      ; Timer bytes for received character (decremented in the timer routine.
PORT_TIME_OUT:   DS      08H      ; Timers used to count down when a port is turned off.
KA_TIMER:        DS      01H      ; Timer kept for sending Keep Alive messages
ACK_NACK_TIMER:  DS      01H      ; Timer kept for maximum time to wait for an ACK or a NACK
TEMP_SEND:       DS      01H      ; Temporary loc used to send ACK, NACK, SOH
KA_PACKET:       DS      02H      ; Keep alive message packet
BAD_CMD_PACKET:  DS      03H      ; Bad command response packet
DIAG_PACKET:     DS      05H      ; Diagnostic report message
DIAG_PAC_SIZE    EQU     $-DIAG_PACKET-2 ; Number of report bytes in the packet(the -2 is for the 2 header bytes)
```

```
DEV_CHNG_PACKET: .S      03        ; Device change report message

        END

LLLLLLLLLL    4444444444444444444444444444444444444444444444444444444444444444444444444444444444444444444444444    LLLLLLLLLL
LLLLLLLLLL    444444444444444444444444  Digital Equipment Corporation - VAX/VMS Version V4.5  4444444444444444444444    LLLLLLLLLL
LLLLLLLLLL    4444444444444444444444444444444444444444444444444444444444444444444444444444444444444444444444444    LLLLLLLLLL

                    N   N  EEEEE  W   W  M   M   AAA   N   N
                    N   N  E      W   W  MM MM  A   A  N   N
                    NN  N  E      W   W  M M M  A   A  NN  N
                    N N N  EEEE   W   W  M   M  A   A  N N N
                    N  NN  E      W W W  M   M  AAAAA  N  NN
                    N   N  E      WW WW  M   M  A   A  N   N
                    N   N  EEEEE  W   W  M   M  A   A  N   N

                  SSSSSSSS  UU      UU  BBBBBBBB    RRRRRRRR
                  SSSSSSSS  UU      UU  BBBBBBBB    RRRRRRRR
                SS          UU      UU  BB      BB  RR      RR
                SS          UU      UU  BB      BB  RR      RR
                SS          UU      UU  BB      BB  RR      RR
                SS          UU      UU  BB      BB  RR      RR
                  SSSSSS    UU      UU  BBBBBBBB    RRRRRRRR
                  SSSSSS    UU      UU  BBBBBBBB    RRRRRRRR
                        SS  UU      UU  BB      BB  RR  RR
                        SS  UU      UU  BB      BB  RR  RR
                        SS  UU      UU  BB      BB  RR    RR
                        SS  UU      UU  BB      BB  RR    RR
                SSSSSSSS      UUUUUUUUUU  BBBBBBBB  RR      RR
                SSSSSSSS      UUUUUUUUUU  BBBBBBBB  RR      RR

                  SSSSSSSS  RRRRRRRR        CCCCCCCC      ;;;;      333333
                  SSSSSSSS  RRRRRRRR        CCCCCCCC      ;;;;      333333
                SS          RR      RR  CC                ;;;;    33      33
                SS          RR      RR  CC                ;;;;    33      33
                SS          RR      RR  CC                                33
                SS          RR      RR  CC                                33
                  SSSSSS    RRRRRRRR    CC                ;;;;          33
                  SSSSSS    RRRRRRRR    CC                ;;;;          33
                        SS  RR  RR      CC                ;;;;            33
                        SS  RR  RR      CC                ;;;;            33
        ....            SS  RR    RR    CC                  ;;    33      33
        ....            SS  RR    RR    CC                  ;;    33      33
        ....    SSSSSSSS    RR      RR    CCCCCCCC        ;;      333333
        ....    SSSSSSSS    RR      RR    CCCCCCCC        ;;      333333

File _S12SDUA14:[RSMSS.DOS]SUBR.SRC;3 (1158,8914,0), last revised on 10-AUG-1987 11:14, is a 21 block sequential file owned by UIC
[DOC,RSMSQUEUE].  The records are variable length with implied (CR) carriage control.  The longest record is 0 bytes.

Job DIAGINTS (571) queued to SYS$PRINT on 10-AUG-1987 11:12 by user NEWMAN, UIC [DOC,RSMSQUEUE], under account    at priority 100,
started on printer _MILES$LPC0: on 10-AUG-1987 11:16 from queue SYS$PRINT.
```

```
LLLLLLLLLL   444444444444444444444444444444444444444444444444444444444444444444444444444444444444   LLLLLLLLLL
LLLLLLLLLL   4444444444444444444444444  Digital Equipment Corporation - VAX/VMS Version V4.5  4444444444444444444444444   LLLLLLLLLL
LLLLLLLLLL   444444444444444444444444444444444444444444444444444444444444444444444444444444444444   LLLLLLLLLL

      VAX/VMS  VAX/VMS  VAX/VMS  VAX/VMS  VAX/VMS  VAX/VMS  VAX/VMS  VAX/VMS  VAX/VMS  VAX/VMS  VAX/VMS  VAX/VMS
   VAX/VMS  VAX/VMS  VAX/VMS  VAX/VMS  VAX/VMS  VAX/VMS  VAX/VMS  VAX/VMS  VAX/VMS  VAX/VMS  VAX/VMS  VAX/VMS
      VAX/VMS  VAX/VMS  VAX/VMS  VAX/VMS  VAX/VMS  VAX/VMS  VAX/VMS  VAX/VMS  VAX/VMS  VAX/VMS  VAX/VMS  VAX/VMS
   VAX/VMS  VAX/VMS  VAX/VMS  VAX/VMS  VAX/VMS  VAX/VMS  VAX/VMS  VAX/VMS  VAX/VMS  VAX/VMS  VAX/VMS  VAX/VMS
      VAX/VMS  VAX/VMS  VAX/VMS  VAX/VMS  VAX/VMS  VAX/VMS  VAX/VMS  VAX/VMS  VAX/VMS  VAX/VMS  VAX/VMS  VAX/VMS

LLLLLLLLLL   444444444444444444444444444444444444444444444444444444444444444444444444444444444444   LLLLLLLLLL
LLLLLLLLLL   4444444444444444444444444  Digital Equipment Corporation - VAX/VMS Version V4.5  4444444444444444444444444   LLLLLLLLLL
LLLLLLLLLL   444444444444444444444444444444444444444444444444444444444444444444444444444444444444   LLLLLLLLLL

N   N  EEEEE  W   W  M   M   AAA   N   N
N   N  E      W   W  MM MM  A   A  N   N
NN  N  E      W   W  M M M  A   A  NN  N
N N N  EEEE   W   W  M   M  A   A  N N N
N  NN  E      W W W  M   M  AAAAA  N  NN
N   N  E      WW WW  M   M  A   A  N   N
N   N  EEEEE  W   W  M   M  A   A  N   N

  SSSSSSSS  UU      UU  BBBBBBBB    RRRRRRRR
  SSSSSSSS  UU      UU  BBBBBBBB    RRRRRRRR
SS          UU      UU  BB      BB  RR      RR
SS          UU      UU  BB      BB  RR      RR
SS          UU      UU  BB      BB  RR      RR
SS          UU      UU  BB      BB  RR      RR
  SSSSSS    UU      UU  BBBBBBBB    RRRRRRRR
  SSSSSS    UU      UU  BBBBBBBB    RRRRRRRR
        SS  UU      UU  BB      BB  RR  RR
        SS  UU      UU  BB      BB  RR  RR
        SS  UU      UU  BB      BB  RR    RR
        SS  UU      UU  BB      BB  RR    RR
SSSSSSSS     UUUUUUUUUU  BBBBBBBB   RR      RR
SSSSSSSS     UUUUUUUUUU  BBBBBBBB   RR      RR

  SSSSSSSS  RRRRRRRR        CCCCCCCC     ;;;;      333333
  SSSSSSSS  RRRRRRRR        CCCCCCCC     ;;;;      333333
SS          RR      RR  CC               ;;;;    33      33
SS          RR      RR  CC               ;;;;    33      33
SS          RR      RR  CC                               33
SS          RR      RR  CC                               33
  SSSSSS    RRRRRRRR    CC               ;;;;          33
  SSSSSS    RRRRRRRR    CC               ;;;;          33
        SS  RR  RR      CC               ;;;;              33
        SS  RR  RR      CC               ;;;;              33
....    SS  RR    RR    CC                 ;;    33        33
....    SS  RR    RR    CC                 ;;    33        33
....  SSSSSSSS  RR      RR  CCCCCCCC       ;;      333333
....  SSSSSSSS  RR      RR  CCCCCCCC       ;;      333333
```

```
File _$12$DUA14:[RSMSS.DOS]SUBR.SRC;3 (1158,8914,0), last revised on 10-AUG-1987 11:14, is a 21 block sequential file owned by UIC
[DOC,RSMSQUEUE]. The records are variable length with implied (CR) carriage control. The longest record is 0 bytes.

Job DIAGINTS (471) queued to SYS$PRINT on 10-AUG-1987 11:12 by user NEWMAN, UIC [DOC,RSMSQUEUE], under account   at priority 100,
started on printer _MILES$LPCO: on 10-AUG-1987 11:14 from queue SYS$PRINT.

LLLLLLLLLL    4444444444444444444444444444444444444444444444444444444444444444444444444444444444444444444444444    LLLLLLLLLL
LLLLLLLLLL    44444444444444444444444  Digital Equipment Corporation - VAX/VMS Version V4.5  44444444444444444444444    LLLLLLLLLL
LLLLLLLLLL    4444444444444444444444444444444444444444444444444444444444444444444444444444444444444444444444444    LLLLLLLLLL

        nmlist
        title PR BOX SUBROUTINES
        space 3
;;;;;;;;;;;;;;;;;;;;;;;;;;;;;;;;;;;;;;;;;;;;;;;;;;;;;;;;;;;;;;;;;;;;;;;;;;;;;;;;;
;
;       FILE:     SUBR.SRC
;
;       DESCRIPTION:    This file contains general subroutines for the PR box
;                       firmware.
;
;       CHANGES:
;-------------------------  BL2 ------------------------------------------
;               9/11/86 Changed the subroutine name GET_BUF to INC_BUF.
;                       The old name was a misnomer.
;
;;;;;;;;;;;;;;;;;;;;;;;;;;;;;;;;;;;;;;;;;;;;;;;;;;;;;;;;;;;;;;;;;;;;;;;;;;;;;;;;;

        NLIST                               ; Don't list everything out here
        include         EXTERNAL.SRC
        INCLUDE         EQUATES.SRC
        LIST

        page
;
; COPYRIGHT (C) 1985
; DIGITAL EQUIPMENT CORPORATION, MAYNARD, MASSACHUSETTS 01754
;
; THIS SOFTWARE IS FURNISHED  UNDER A LICENSE FOR USE ONLY ON A SINGLE
; COMPUTER  SYSTEM AND  MAY BE  COPIED ONLY WITH  THE INCLUSION OF THE
; ABOVE COPYRIGHT NOTICE.  THIS SOFTWARE, OR ANY OTHER COPIES THEREOF,
; MAY NOT BE PROVIDED OR  OTHERWISE MADE AVAILABLE TO ANY OTHER PERSON
; EXCEPT FOR USE ON SUCH SYSTEM AND TO ONE WHO AGREES TO THESE LICENSE
; TERMS.  TITLE TO AND  OWNERSHIP OF THE  SOFTWARE  SHALL AT ALL TIMES
; REMAIN IN DEC.
;
; THE INFORMATION IN THIS SOFTWARE IS SUBJECT TO CHANGE WITHOUT NOTICE
; AND SHOULD  NOT BE CONSTRUED  AS A COMMITMENT  BY DIGITAL  EQUIPMENT
; CORPORATION.
;
; DEC ASSUMES  NO  RESPONSIBILITY  FOR  THE USE OR  RELIABILITY OF ITS
; SOFTWARE ON EQUIPMENT WHICH IS NOT SUPPLIED BY DEC.
```

```
        RSECT   PRCODE

        INTERN  MOVE_A, CHANAD, CHANADR1, INC_BUF,WRITE_COMMAND,READ_COMMAND
        INTERN  TEST_BIT, SET_BIT, CLEAR_BIT, END_CODE

        SUBTTL  MOVE_A
        PAGE

;******************************************************************
;                                                                 *
;                            MOVE_A                               *
;                                                                 *
;  THIS IS ROUTINE USED BY THE TIMER TEST MODULE WHICH MIGRATES   *
;  A DATA PATTERN THRU THE TIMER(0,1) REGISTERS.                  *
;                                                                 *
;  PARAMETERS:  A         - DATA PATTERN                          *
;                                                                 *
;******************************************************************

MOVE_A:         MOV     TL0,A                   ;PATTERN TO TL0.
                MOV     A,TL0                   ;VERIFY.
                MOV     TH0,A                   ;SAME TO TH0.
                MOV     A,TH0                   ;VERIFY.
                MOV     TL1,A                   ;SAME TO TL1.
                MOV     A,TL1                   ;VERIFY.
                MOV     TH1,A                   ;SAME TO TH1.
                MOV     A,TH1                   ;VERIFY.

                RET                             ;RETURN.

        SUBTTL  CHANAD
        PAGE
;;;;;;;;;;;;;;;;;;;;;;;;;;;;;;;;;;;;;;;;;;;;;;;;;;;;;;;;;;;;;;;;;;;;;;;;;;;;;;;;
;
;       NAME:   CHANAD
;
;       DESCRIPTION:    This subroutine will take the number in R7, multiply it
;                       to the by eight and add it to the data pointer.  This
;                       routine is used for getting the appropriate address
;                       for the current port on the octart.
;
;       INPUT:  Channel number in R7
;               Base register address in the DPTR
;
;       OUTPUT: Direct register address in DPTR
;;;;;;;;;;;;;;;;;;;;;;;;;;;;;;;;;;;;;;;;;;;;;;;;;;;;;;;;;;;;;;;;;;;;;;;;;;;;;;;;

CHANAD:
        PUSH    ACC
        MOV     B,R7                            ; Get channel being tested
```

```
        MOV     A,#REG_OFFSET                   ; Set up offset for mult.
        MUL     AB                              ; Compute offset
        ADD     A,DPL                           ; Add it in to address
        MOV     DPL,A                           ; Write it back to Data Ptr.
        POP     ACC
        RET

        SUBTTL  CHANADR1
        PAGE
;;;;;;;;;;;;;;;;;;;;;;;;;;;;;;;;;;;;;;;;;;;;;;;;;;;;;;;;;;;;;;;;;;;;;;;;;;;;;;;
;
;       NAME:   CHANADR1
;
;       DESCRIPTION:    This subroutine will take the number in R7, multiply it
;                       by eight and add it to REGISTER 1.  This
;                       routine is used for getting the appropriate address
;                       for the current port on the octart.
;
;       INPUT:  Channel number in R7
;               Base register address in R1
;
;       OUTPUT: Direct register address in R1
;;;;;;;;;;;;;;;;;;;;;;;;;;;;;;;;;;;;;;;;;;;;;;;;;;;;;;;;;;;;;;;;;;;;;;;;;;;;;;;

CHANADR1:
        PUSH    ACC
        MOV     B,R7                            ; Get channel being tested
        MOV     A,#REG_OFFSET                   ; Set up offset for mult.
        MUL     AB                              ; Compute offset
        ADD     A,R1                            ; Add it in to address
        MOV     R1,A                            ; Write it back to register 1
        POP     ACC
        RET

        SUBTTL  INC_BUF
        PAGE
;;;;;;;;;;;;;;;;;;;;;;;;;;;;;;;;;;;;;;;;;;;;;;;;;;;;;;;;;;;;;;;;;;;;;;;;;;;;;;;
;
;       NAME:   INC_BUF
;
;       DESCRIPTION:    This subroutine will take the address in the DPTR
;                       and increment it by one.  If it is past the 1K
;                       boundary for this channel, it will get reset to
;                       the beginning of the buffer.
;
;       INPUT:  DPTR - Address of the buffer byte just filled
;               R7 - Channel number
;
;       OUTPUT: DPTR - DPTR + 1 mod 1K
;
;       REGISTERS DESTROYED:    R5
```

```
;
;;;;;;;;;;;;;;;;;;;;;;;;;;;;;;;;;;;;;;;;;;;;;;;;;;;;;;;;;;;;;;;;;;;;;;;;;;;;;;;

INC_BUF:
        PUSH    ACC

        INC     DPTR                ; Point to the next free byte in the buffer
        MOV     A,DPL
        CJNE    A,#ZERO,80$         ; Are we on a page boundary?? NO, exit.
                                    ; Yes, see if it's the beginning of the next buffer space
        MOV     A,DPH               ; Get the addr. of the page
        CJNE    A,#HIGH CH1_BUFFER,10$  ; Beginning of channel 1's buffer?
        MOV     DPH,#HIGH CH0_BUFFER    ; Yes, reset the buffer to the beginning of channel 0's buffer
        SJMP    80$

10$:    CJNE    A,#HIGH CH2_BUFFER,20$  ; Beginning of channel 2's buffer?
        MOV     DPH,#HIGH CH1_BUFFER    ; Yes, reset the buffer to the beginning of channel 1's buffer
        SJMP    80$

20$:    CJNE    A,#HIGH CH3_BUFFER,30$  ; Beginning of channel 3's buffer?
        MOV     DPH,#HIGH CH2_BUFFER    ; Yes, reset the buffer to the beginning of channel 2's buffer
        SJMP    80$

30$:    CJNE    A,#HIGH CH4_BUFFER,40$  ; Beginning of channel 4's buffer?
        MOV     DPH,#HIGH CH3_BUFFER    ; Yes, reset the buffer to the beginning of channel 3's buffer
        SJMP    80$

40$:    CJNE    A,#HIGH CH5_BUFFER,50$  ; Beginning of channel 5's buffer?
        MOV     DPH,#HIGH CH4_BUFFER    ; Yes, reset the buffer to the beginning of channel 4's buffer
        SJMP    80$

50$:    CJNE    A,#HIGH CH6_BUFFER,60$  ; Beginning of channel 6's buffer?
        MOV     DPH,#HIGH CH5_BUFFER    ; Yes, reset the buffer to the beginning of channel 5's buffer
        SJMP    80$

60$:    CJNE    A,#HIGH CH7_BUFFER,70$  ; Beginning of channel 7's buffer?
        MOV     DPH,#HIGH CH6_BUFFER    ; Yes, reset the buffer to the beginning of channel 6's buffer
        SJMP    80$

70$:    CJNE    A,#END_BUFFER_SPACE,80$ ; Are we at the end of the buffer space?
        MOV     DPH,#HIGH CH7_BUFFER    ; Yes, reset the buffer to the beginning of channel 7's buffer

80$:    POP     ACC                     ; Else return
        RET

        SUBTTL  TEST_BIT
        PAGE

;;;;;;;;;;;;;;;;;;;;;;;;;;;;;;;;;;;;;;;;;;;;;;;;;;;;;;;;;;;;;;;;;;;;;;;;;;;;;;;
;
;       TITLE:  TEST_BIT
```

```
;
;       DESCRIPTION:    This subroutine tests a byte passed in the ACC to see
;                       if a particular bit is set.  The bit number is specified
;                       in R7.  If it is set, the carry flag is set on return,
;                       otherwise it is cleared.
;
;       INPUT:  A = bit pattern to be tested.
;               R7 = bit number to test for (from 0 to 7).
;
;       OUTPUT: C set if bit is set, cleared otherwise.
;
;       REGISTERS DESTROYED:    A, R5
;;;;;;;;;;;;;;;;;;;;;;;;;;;;;;;;;;;;;;;;;;;;;;;;;;;;;;;;;;;;;;;;;;;;;;;;;;;;;;;;
TEST_BIT:
        XCH     A,R7            ; A=bit number, save the acc
        MOV     R5,A            ; Get the bit number to test for into R5
        XCH     A,R7            ; Restore the accumulator and R7
        INC     R5              ; Normalize it (1 to 8)

1$:     RRC     A               ; Move the bit into the carry flag
        DJNZ    R5,1$           ; If this is not the bit we are testing for THEN loop again

        RET                     ; ELSE return

        SUBTTL  SET_BIT
        PAGE
;;;;;;;;;;;;;;;;;;;;;;;;;;;;;;;;;;;;;;;;;;;;;;;;;;;;;;;;;;;;;;;;;;;;;;;;;;;;;;;;
;
;       TITLE:  SET_BIT
;
;       DESCRIPTION:    This subroutine sets a bit in the ACC.  The bit
;                       number is specified in R7.
;
;       INPUT:  R7 = bit number to set (from 0 to 7).
;
;       OUTPUT: ACC has the particular bit set.
;
;       REGISTERS DESTROYED: ACC and R5
;
;       USE:    CALL    SET_BIT         ; R7 CONTAINS BIT TO BE SET ALREADY
;               ORL     RX_IN_PROCESS,A ; SET THAT FLAG IN THE APPROPRIATE BYTE
;;;;;;;;;;;;;;;;;;;;;;;;;;;;;;;;;;;;;;;;;;;;;;;;;;;;;;;;;;;;;;;;;;;;;;;;;;;;;;;;
SET_BIT:
        MOV     A,R7
        MOV     R5,A            ; Get the bit number to test for
        INC     R5              ; Normalize it (1 to 8)
        MOV     A,#ZERO         ; Clear the accumulator
        SETB    C               ; Set the carry flag

1$:     RLC     A               ; Move the the carry flag into the bit
        DJNZ    R5,1$           ; If this is not the bit we are setting THEN loop again
```

```
        RET                     ; ELSE return

        SUBTTL  CLEAR_BIT
        PAGE

;;;;;;;;;;;;;;;;;;;;;;;;;;;;;;;;;;;;;;;;;;;;;;;;;;;;;;;;;;;;;;;;;;;;;;;;;;;;;;;
;
;       TITLE:  CLEAR_BIT
;
;       DESCRIPTION:    This subroutine clears a bit in the ACC.  The rest of
;                       the ACC contains all ones.  The bit number is specified
;                       in R7.
;
;       INPUT:  ACC = byte in which to clear the bit.
;               R7 = bit number to clear (from 0 to 7).
;
;       OUTPUT: ACC has the particular bit cleared.
;
;       REGISTERS DESTROYED: ACC and R5
;
;       USE:    CALL    CLEAR_BIT       ; R7 CONTAINS BIT TO BE CLEARED ALREADY
;               ANL     RX_IN_PROCESS,A ; CLEAR THAT FLAG IN THE APPROPRIATE BYTE
;
;;;;;;;;;;;;;;;;;;;;;;;;;;;;;;;;;;;;;;;;;;;;;;;;;;;;;;;;;;;;;;;;;;;;;;;;;;;;;;;
CLEAR_BIT:
        LCALL   SET_BIT         ; Set the appropriate bit
        XRL     A,#FILL         ; Then invert it to set all the other bits and clear the appropriate bit

        RET                     ; ELSE return

        SUBTTL  WRITE_COMMAND
        PAGE
;;;;;;;;;;;;;;;;;;;;;;;;;;;;;;;;;;;;;;;;;;;;;;;;;;;;;;;;;;;;;;;;;;;;;;;;;;;;;;;
;
;       TITLE:  WRITE_COMMAND
;
;       DESCRIPTION:    This subroutine writes to the command register of
;                       the DC349.
;
;       INPUT:  R7 - Channel number
;               ACC - Data to be written
;
;       OUTPUT: COMMAND_REG(R7)=ACC
;
;;;;;;;;;;;;;;;;;;;;;;;;;;;;;;;;;;;;;;;;;;;;;;;;;;;;;;;;;;;;;;;;;;;;;;;;;;;;;;;

WRITE_COMMAND:
        PUSH    DPL             ; Save the low byte of the data pointer
        PUSH    DPH             ; Save the high byte of the data pointer
```

```
        MOV     DPTR,#BASE_CMD_W ; Base addr. of the command register
        CALL    CHANAD          ; Offset to the appropriate channel
        MOVX    @DPTR,A         ; Write the value out to the command reg

        POP     DPH
        POP     DPL             ; Restore the data pointer
        RET

        SUBTTL  READ_COMMAND
        PAGE
;;;;;;;;;;;;;;;;;;;;;;;;;;;;;;;;;;;;;;;;;;;;;;;;;;;;;;;;;;;;;;;;;;;;;;;;;;;;;;;;
;
;       TITLE:  READ_COMMAND
;
;       DESCRIPTION:    This subroutine reads the command register of
;                       the DC349.
;
;       INPUT:  R7 - Channel number
;
;       OUTPUT: ACC - Data read from the command register
;
;;;;;;;;;;;;;;;;;;;;;;;;;;;;;;;;;;;;;;;;;;;;;;;;;;;;;;;;;;;;;;;;;;;;;;;;;;;;;;;;

READ_COMMAND:
        PUSH    DPL             ; Save the low byte of the data pointer
        PUSH    DPH             ; Save the high byte of the data pointer

        MOV     DPTR,#BASE_CMD_R ; Base read addr. of the command register
        CALL    CHANAD          ; Offset to the appropriate channel
        MOVX    A,@DPTR         ; Read the value from the command reg

        POP     DPH
        POP     DPL             ; Restore the data pointer
        RET

END_CODE        EQU     $       ; This is placed in the last code location for the
                                ; checksum routine to stop it's calculation.

        END
```

```
MMMMMMMMM    4444444444444444444444444444444444444444444444444444444444444444444444444444444444444444444444444    MMMMMMMMM
MMMMMMMMM    44444444444444444444444  Digital Equipment Corporation - VAX/VMS Version V4.5  44444444444444444444444    MMMMMMMMM
MMMMMMMMM    4444444444444444444444444444444444444444444444444444444444444444444444444444444444444444444444444    MMMMMMMMM
```

```
NEWMAN

TIMER

.SRC;1
```

File _$12$DUA14:[RSMSS.DOS]TIMER.SRC;1 (1159,8909,0), last revised on 10-AUG-1987 11:14, is a 14 block sequential file owned by UIC [DOC,RSMSQUEUE]. The records are variable length with implied (CR) carriage control. The longest record is 0 bytes.

Job DIAGINTS (471) queued to SYS$PRINT on 10-AUG-1987 11:12 by user NEWMAN, UIC [DOC,RSMSQUEUE], under account at priority 100, started on printer _MILE$$LPC0: on 10-AUG-1987 11:16 from queue SYS$PRINT.

```
MMMMMMMMMM   444444444444444444444444444444444444444444444444444444444444444444444444444444444444444444444444   MMMMMMMMMM
MMMMMMMMMM   4444444444444444444444  Digital Equipment Corporation - VAX/VMS Version V4.5  4444444444444444444444   MMMMMMMMMM
MMMMMMMMMM   444444444444444444444444444444444444444444444444444444444444444444444444444444444444444444444444   MMMMMMMMMM
```

```
VAX/VMS  VAX/VMS  VAX/VMS  VAX/VMS  VAX/VPS  VAX/VMS  VAX/VMS  VAX/VMS  VAX/VMS  VAX/VMS  VAX/VMS  VAX/VMS
    VAX/VMS  VAX/VMS  VAX/VMS  VAX/VMS  VAX/VMS  VAX/VMS  VAX/VMS  VAX/VMS  VAX/VMS  VAX/VMS  VAX/VPS  VAX/VMS
VAX/VMS  VAX/VMS  VAX/VMS  VAX/VMS  VAX/VMS  VAX/VMS  VAX/VMS  VAX/VMS  VAX/VMS  VAX/VMS  VAX/VMS  VAX/VMS
    VAX/VMS  VAX/VMS  VAX/VMS  VAX/VMS  VAX/VMS  VAX/VMS  VAX/VMS  VAX/VMS  VAX/VMS  VAX/VMS  VAX/VMS  VAX/VMS

MMMMMMMMMM   44444444444444444444444444444444444444444444444444444444444444444444444444444444444444444444   MMMMMMMMMM
MMMMMMMMMM   4444444444444444444444444  Digital Equipment Corporation - VAX/VPS Version V4.5  4444444444444444444444444   MMMMMMMMMM
MMMMMMMMMM   44444444444444444444444444444444444444444444444444444444444444444444444444444444444444444444   MMMMMMMMMM

              N   N  EEEEE  W   W  M   M   AAA   N   N
              N   N  E      W   W  MM MM  A   A  N   N
              NN  N  E      W   W  M M M  A   A  NN  N
              N N N  EEEE   W   W  M   M  A   A  N N N
              N  NN  E      W W W  M   M  AAAAA  N  NN
              N   N  E      WW WW  M   M  A   A  N   N
              N   N  EEEEE  W   W  M   M  A   A  N   N

      TTTTTTTTTT  IIIIII  MM      MM  EEEEEEEEEE  RRRRRRRR
      TTTTTTTTTT  IIIIII  MM      MM  EEEEEEEEEE  RRRRRRRR
          TT        II    MMMM  MMMM  EE          RR      RR
          TT        II    MMMM  MMMM  EE          RR      RR
          TT        II    MM  MM  MM  EE          RR      RR
          TT        II    MM  MM  MM  EE          RR      RR
          TT        II    MM      MM  EEEEEEEE    RRRRRRRR
          TT        II    MM      MM  EEEEEEEE    RRRRRRRR
          TT        II    MM      MM  EE          RR  RR
          TT        II    MM      MM  EE          RR  RR
          TT        II    MM      MM  EE          RR    RR
          TT        II    MM      MM  EE          RR    RR
          TT      IIIIII  MM      MM  EEEEEEEEEE  RR      RR
          TT      IIIIII  MM      MM  EEEEEEEEEE  RR      RR

              SSSSSSSS  RRRRRRRR      CCCCCCCC    ;;;;      11
              SSSSSSSS  RRRRRRRR      CCCCCCCC    ;;;;      11
            SS          RR      RR  CC            ;;;;    1111
            SS          RR      RR  CC            ;;;;    1111
            SS          RR      RR  CC                      11
            SS          RR      RR  CC                      11
              SSSSSS    RRRRRRRR    CC            ;;;;      11
              SSSSSS    RRRRRRRR    CC            ;;;;      11
                    SS  RR  RR      CC            ;;;;      11
                    SS  RR  RR      CC            ;;;;      11
      ....          SS  RR    RR    CC              ;;      11
      ....          SS  RR    RR    CC              ;;      11
      ....  SSSSSSSS    RR      RR    CCCCCCCC    ;;      111111
      ....  SSSSSSSS    RR      RR    CCCCCCCC    ;;      111111
```

```
File _S12$DUA14:[RSMSS.DBS]TIMER.SRC;1 (1159,8909,0), last revised on 10-AUG-1987 11:14, is a 14 block sequential file owned by UIC
[DOC,RSMSQUEUE]. The records are variable length with implied (CR) carriage control. The longest record is 0 bytes.

Job DIAGINTS (871) queued to SYS$PRINT on 10-AUG-1987 11:12 by user NEWMAN, UIC [DOC,RSMSQUEUE], under account   at priority 100,
started on printer _MILES$LPC0: on 10-AUG-1987 11:14 from queue SYS$PRINT.

MMMMMMMMMM    4444444444444444444444444444444444444444444444444444444444444444444444444444444444444444444444444444444    MMMMMMMMMM
MMMMMMMMMM    44444444444444444444444  Digital Equipment Corporation - VAX/VMS Version V4.5  44444444444444444444444    MMMMMMMMMM
MMMMMMMMMM    4444444444444444444444444444444444444444444444444444444444444444444444444444444444444444444444444444444    MMMMMMMMMM

        TITLE   TIMER INTERRUPT ROUTINE
;
; COPYRIGHT (C) 1986
; DIGITAL EQUIPMENT CORPORATION, MAYNARD, MASSACHUSETTS 01754
;
; THIS SOFTWARE IS FURNISHED  UNDER A LICENSE FOR USE ONLY ON A SINGLE
; COMPUTER  SYSTEM AND  MAY BE  COPIED ONLY WITH  THE INCLUSION OF THE
; ABOVE COPYRIGHT NOTICE.  THIS SOFTWARE, OR ANY OTHER COPIES THEREOF,
; MAY NOT BE PROVIDED OR  OTHERWISE MADE AVAILABLE TO ANY OTHER PERSON
; EXCEPT FOR USE ON SUCH SYSTEM AND TO ONE WHO AGREES TO THESE LICENSE
; TERMS.  TITLE TO AND  OWNERSHIP OF THE  SOFTWARE  SHALL AT ALL TIMES
; REMAIN IN DEC.
;
; THE INFORMATION IN THIS SOFTWARE IS SUBJECT TO CHANGE WITHOUT NOTICE
; AND SHOULD  NOT BE CONSTRUED  AS A COMMITMENT  BY DIGITAL  EQUIPMENT
; CORPORATION.
;
; DEC ASSUMES  NO  RESPONSIBILITY  FOR  THE USE OR  RELIABILITY OF ITS
; SOFTWARE ON EQUIPMENT WHICH IS NOT SUPPLIED BY DEC.

        NLIST
        INCLUDE MACRO.SRC
        INCLUDE EQUATES.SRC
        INCLUDE EXTERNAL.SRC
        LIST

        ASECT   PRCODE
        INTERN  TIMER0_INT,TIMER1_INT

        EXTERN  END_MSG,BUMP_FRONT_TX,LIGHT_LED,WRITE_COMMAND,READ_COMMAND

        SUBTTL  TIMER0_INT
        PAGE

;;;;;;;;;;;;;;;;;;;;;;;;;;;;;;;;;;;;;;;;;;;;;;;;;;;;;;;;;;;;;;;;;;;;;;;;;;;;
;
;       TITLE:  TIMER0_INT
;
;       DESCRIPTION: This routine will check the timer for each channel.
;                    If the timer for the channel is not zero, it will be
;                    decremented by one, and if zero, the message buffer for
```

```
;                       that channel will be terminated.  Though there is a
;                       byte reserved for channel 5 (spare port), it is not used.
;                       The counter for channel 5 is never set up in the uart
;                       interrupt routine (it's always zero) because the spare
;                       port will use one byte packets.  Channel seven also does
;                       not use the timer.
;
;       INPUT:  RX_TIME_OUT     ; Table of timers, one per channel
;
;       OUTPUT: RX_TIME_OUT(CHANNEL) = RX_TIME_OUT(CHANNEL)-1
;               BUFFER IN CLOSED IF RX_TIME_OUT(CHANNEL)=0
;
;;;;;;;;;;;;;;;;;;;;;;;;;;;;;;;;;;;;;;;;;;;;;;;;;;;;;;;;;;;;;;;;;;;;;;;;;;;;;;;

TIMER0_INT:
        SAVE_REGS       ; Save the background picture

        MOV     PSW,#BANK_1     ; Switch to register tank 1

        MOV     TH0,#HIGH TIME_COUNT    ; Reload the timer value
        MOV     TL0,#LOW TIME_COUNT

        MOV     DPTR,#RX_TIME_OUT ; Address of the timer bytes for each channel
        MOV     R0,#7           ; Number of channels to check
        MOV     R7,#ZERO        ; First channel to be tested

10$:    MOVX    A,@DPTR         ; Get the current channels timer
        XRL     A,#ZERO         ; Is this channels timer zero? (ie. inactive)
        JZ      20$             ; Yes, point to the next channel

        DEC     A               ; Counter was not zero, decrement it by one
        MOVX    @DPTR,A         ; Save it back in the counters timer
        CJNE    A,#ZERO,20$     ; If it still isn't zero then  go on to the next channel
        CALL    END_MSG         ; Otherwise, close out the buffer and check out the next channel

20$:    INC     DPTR            ; Look at the next channel
        INC     R7              ; Increment the channel number
        DJNZ    R0,10$          ; Look at the next timer byte if not done with all the channels
                                ; Finished with all the peripheral channels

        JNB     RX_7,25$        ; If not currently receiving on the host port, continue elsewhere
        MOVX    A,@DPTR         ; Otherwise check the timer for a time out
        DEC     A               ; If we are here, the timer is active, decrement the count
        MOVX    @DPTR,A         ; Stoer it back
        CJNE    A,#ZERO,25$     ; No time out, continue elsewhere
        SETB    SEND_NACK       ; Time out, send a NACK
        CLR     RX_7            ; Clear in receiver or host flag
        CLR     CHANNEL_RCVD    ; Clear channel received flag
        CLR     SIZE_RCVD       ; Clear size received flag
```

```
; Now check for a time out to turn on a channel that was turned off

25$:    MOV     DPTR,#PORT_TIME_OUT     ; Addr. of the timers for the ports
        MOV     R0,#NUM_PORTS           ; Check all the ports
        MOV     R7,#ZERO                ; Start with channel zero

30$:    MOVX    A,@DPTR         ; Get the current channels timer
        XRL     A,#ZERO         ; Is this channels timer zero? (ie. inactive)
        JZ      40$             ; Yes, point to the next channel

        DEC     A               ; Counter was not zero, decrement it by one
        MOVX    @DPTR,A         ; Save it back in the counters timer
        CJNE    A,#ZERO,40$     ; If it still isn't zero then  go on to the next channel
        CALL    READ_COMMAND    ; Read the command register to
        ORL     A,#BIT2         ; Set up to enable the receiver again
        CALL    WRITE_COMMAND   ; Write it out to the port

40$:    INC     DPTR            ; Look at the next channel
        INC     R7              ; Increment the channel number
        DJNZ    R0,30$          ; Look at the next timer byte if not done with all the channels
                                ; Finished with all the channels


; Now check the timer for the time out waiting for an ACK/NACK from the host

        JNB     WAIT_ACK_NACK,50$ ; We're not waiting for an ACK/NACK, so exit

        MOV     DPTR,#ACK_NACK_TIMER ; Address of the ACK/NACK timer
        MOVX    A,@DPTR         ; Get the timer
        DEC     A               ; Decrement the timer
        MOVX    @DPTR,A         ; Store it back
        CJNE    A,#ZERO,50$     ; It's not zero yet, so leave
        CLR     WAIT_ACK_NACK   ; It is zero, clear the wait flag
        MOV     R7,#HOST_PORT   ; Working on the host channel
        CALL    BUMP_FRONT_TX   ; Bump the front pointer of the transmit queue
        CLR     TX_7            ; Clear the flag indicating we're transmitting on the host port

        JB      SYS_STARTUP,42$ ; If it was the system startup, do not place the error in the LEDs
        MOV     A,#HOST_GONE    ; Put the error code for no response from host
        CALL    LIGHT_LED       ; Send the error code
        SETB    NO_HOST         ; Set the flag to indicate the host went away

42$:    CLR     SYS_STARTUP     ; Clear the system startup flag

50$:    RESTORE_REGS            ; Restore the background picture
        RETI                    ; Return from the interrupt
        SUBTTL  TIMER1_INT
        PAGE

;;;;;;;;;;;;;;;;;;;;;;;;;;;;;;;;;;;;;;;;;;;;;;;;;;;;;;;;;;;;;;;;;;;;;;;;;;;;;;
;
```

```
;        TITLE:   TIMER1_INT
;
;        DESCRIPTION:
;
;
;        INPUT:   RX_TIME_OUT       ; Table of timers, one per channel
;
;        OUTPUT:  RX_TIME_OUT(CHANNEL) = RX_TIME_OUT(CHANNEL)-1
;                 BUFFER IN CLOSED IF RX_TIME_OUT(CHANNEL)=0
;
;;;;;;;;;;;;;;;;;;;;;;;;;;;;;;;;;;;;;;;;;;;;;;;;;;;;;;;;;;;;;;;;;;;;;;;;;;;;;;;;;

TIMER1_INT:
         PUSH     ACC               ; Save the accumulator
         PUSH     PSW               ; Save the Program Status Word
         PUSH     DPH
         PUSH     DPL

         MOV      PSW,#BANK_1       ; Switch to register bank 1

         MOV      TH1,#HIGH T1_COUNT       ; Reload the timer value
         MOV      TL1,#LOW T1_COUNT

         MOV      DPTR,#KA_TIMER    ; Address of the timer byte for the keep alive

         MOVX     A,@DPTR           ; Get the keep alive timer
         DEC      A                 ; Decrement the timer

         CJNE     A,#ZERO,10$       ; Is the timer zero? (timed out) No
         SETB     SEND_KA           ; Yes, set the bit to send the keep alive

5$:      MOV      A,#KA_COUNT       ; And reset the keep alive timer to ten seconds

10$:     MOVX     @DPTR,A           ; Save it back in the keep alive timer

20$:     POP      DPL
         POP      DPH
         POP      PSW               ; Restore the Program Status Word
         POP      ACC               ; Restore the accumulator
         RETI                       ; Return from the interrupt

         END
```

```
NNNNNNNNNN    44444444444444444444444444444444444444444444444444444444444444444444444444444444444444444444    NNNNNNNNNN
NNNNNNNNNN    4444444444444444444444444  Digital Equipment Corporation - VAX/VMS Version V4.5  4444444444444444444444444    NNNNNNNNNN
NNNNNNNNNN    44444444444444444444444444444444444444444444444444444444444444444444444444444444444444444444    NNNNNNNNNN
```

NEWMAN

UART

....SRC;2

File _$12$DUA14:[RSMSS.DRS]UART.SRC;2 (1160,8910,0), last revised on 10-AUG-1987 11:14, is a 78 block sequential file owned by UIC [DOC,RSMSQUEUE]. The records are variable length with implied (CR) carriage control. The longest record is 0 bytes.

Job DIAGINTS (571) queued to SYS$PRINT on 10-AUG-1987 11:12 by user NEWMAN, UIC [DOC,RSMSQUEUE], under account at priority 100, started on printer _MILES$LPC0: on 10-AUG-1987 11:16 from queue SYS$PRINT.

NNNNNNNNN 444444444444444444444444444444444444444444444444444444444444444444444444444444444444444444444444 NNNNNNNNN
NNNNNNNNN 44444444444444444444444 Digital Equipment Corporation - VAX/VMS Version V4.5 44444444444444444444444 NNNNNNNNN
NNNNNNNNN 444444444444444444444444444444444444444444444444444444444444444444444444444444444444444444444444 NNNNNNNNN

```
---     VAX/VMS  VAX/VMS  VAX/VMS  VAX/VMS  VAX/VMS  VAX/VMS  VAX/VMS  VAX/VMS  VAX/VMS  VAX/VMS  VAX/VMS  VAX/VMS
     VAX/VMS  VAX/VMS  VAX/VMS  VAX/VMS  VAX/VMS  VAX/VMS  VAX/VMS  VAX/VMS  VAX/VMS  VAX/VMS  VAX/VMS  VAX/VMS
        VAX/VMS  VAX/VMS  VAX/VMS  VAX/VMS  VAX/VMS  VAX/VMS  VAX/VMS  VAX/VMS  VAX/VMS  VAX/VMS  VAX/VMS  VAX/VMS
     VAX/VMS  VAX/VMS  VAX/VMS  VAX/VMS  VAX/VMS  VAX/VMS  VAX/VMS  VAX/VMS  VAX/VMS  VAX/VMS  VAX/VMS  VAX/VMS
        VAX/VMS  VAX/VMS  VAX/VMS  VAX/VMS  VAX/VMS  VAX/VMS  VAX/VMS  VAX/VMS  VAX/VMS  VAX/VMS  VAX/VMS  VAX/VMS

NNNNNNNNNN    44444444444444444444444444444444444444444444444444444444444444444444444444444444444444444444    NNNNNNNNNN
NNNNNNNNNN    4444444444444444444444444  Digital Equipment Corporation - VAX/VMS Version V4.5  4444444444444444444444444    NNNNNNNNNN
NNNNNNNNNN    44444444444444444444444444444444444444444444444444444444444444444444444444444444444444444444    NNNNNNNNNN

                         N   N  EEEEE  W   W  M   M   AAA   N   N
                         N   N  E      W   W  MM MM  A   A  N   N
                         NN  N  E      W   W  M M M  A   A  NN  N
                         N N N  EEEE   W   W  M   M  A   A  N N N
                         N  NN  E      W W W  M   M  AAAAA  N  NN
                         N   N  E      WW WW  M   M  A   A  N   N
                         N   N  EEEEE  W   W  M   M  A   A  N   N

                      UU      UU    AAAAAA    RRRRRRRR    TTTTTTTTTT
                      UU      UU    AAAAAA    RRRRRRRR    TTTTTTTTTT
                      UU      UU  AA      AA  RR      RR      TT
                      UU      UU  AA      AA  RR      RR      TT
                      UU      UU  AA      AA  RR      RR      TT
                      UU      UU  AA      AA  RR      RR      TT
                      UU      UU  AA      AA  RRRRRRRR        TT
                      UU      UU  AA      AA  RRRRRRRR        TT
                      UU      UU  AAAAAAAAAA  RR  RR          TT
                      UU      UU  AAAAAAAAAA  RR  RR          TT
                      UU      UU  AA      AA  RR    RR        TT
                      UU      UU  AA      AA  RR    RR        TT
                      UUUUUUUUUU  AA      AA  RR      RR      TT
                      UUUUUUUUUU  AA      AA  RR      RR      TT

                        SSSSSSSS  RRRRRRRR      CCCCCCCC      ;;;;      222222
                        SSSSSSSS  RRRRRRRR      CCCCCCCC      ;;;;      222222
                      SS          RR      RR  CC              ;;;;    22      22
                      SS          RR      RR  CC              ;;;;    22      22
                      SS          RR      RR  CC                              22
                      SS          RR      RR  CC                              22
                        SSSSSS    RRRRRRRR    CC              ;;;;          22
                        SSSSSS    RRRRRRRR    CC              ;;;;          22
                              SS  RR  RR      CC              ;;;;        22
                              SS  RR  RR      CC              ;;;;        22
                ....          SS  RR    RR    CC                ;;      22
                ....          SS  RR    RR    CC                ;;      22
                ....    SSSSSSSS  RR      RR    CCCCCCCC        ;;    2222222222
                ....    SSSSSSSS  RR      RR    CCCCCCCC        ;;    2222222222
```

```
File _$12$DUA14:[RSMSS.DOS]UART.SRC;2 (1160,8910,0), last revised on 10-AUG-1987 11:14, is a 78 block sequential file owned by UIC
[DOC,RSMSQUEUE].  The records are variable length with implied (CR) carriage control.  The longest record is 0 bytes.

Job DIAGINTS (371) queued to SYS$PRINT on 10-AUG-1987 11:12 by user NEWMAN, UIC [DOC,RSMSQUEUE], under account   at priority 100,
started on printer _MILES$LPC0: on 10-AUG-1987 11:16 from queue SYS$PRINT.

NNNNNNNNNN    4444444444444444444444444444444444444444444444444444444444444444444444444444444444444444444444444    NNNNNNNNNN
NNNNNNNNNN    44444444444444444444444  Digital Equipment Corporation - VAX/VMS Version V4.5  44444444444444444444444    NNNNNNNNNN
NNNNNNNNNN    4444444444444444444444444444444444444444444444444444444444444444444444444444444444444444444444444    NNNNNNNNNN

        TITLE   UART INTERRUPT ROUTINE
;
; COPYRIGHT (C) 1986
; DIGITAL EQUIPMENT CORPORATION, MAYNARD, MASSACHUSETTS 01754
;
; THIS SOFTWARE IS FURNISHED  UNDER A LICENSE FOR USE ONLY ON A SINGLE
; COMPUTER   SYSTEM AND   MAY BE   COPIED ONLY WITH   THE INCLUSION OF THE
; ABOVE COPYRIGHT NOTICE.  THIS SOFTWARE, OR ANY OTHER COPIES THEREOF,
; MAY NOT BE PROVIDED OR  OTHERWISE MADE AVAILABLE TO ANY OTHER PERSON
; EXCEPT FOR USE ON SUCH SYSTEM AND TO ONE WHO AGREES TO THESE LICENSE
; TERMS.  TITLE TO AND  OWNERSHIP OF THE  SOFTWARE  SHALL AT ALL TIMES
; REMAIN IN DEC.
;
; THE INFORMATION IN THIS SOFTWARE IS SUBJECT TO CHANGE WITHOUT NOTICE
; AND SHOULD  NOT BE CONSTRUED  AS A COMMITMENT  BY DIGITAL  EQUIPMENT
; CORPORATION.
;
; DEC ASSUMES  NO  RESPONSIBILITY  FOR  THE USE OR  RELIABILITY OF ITS
; SOFTWARE ON EQUIPMENT WHICH IS NOT SUPPLIED BY DEC.

        NLIST
        INCLUDE MACRO.SRC
        INCLUDE EQUATES.SRC
        INCLUDE EXTERNAL.SRC
        LIST

        RSECT   PRCODE
        INTERN  UART_SERVICE,RX_ERROR,END_MSG,BUMP_FRCNT_TX,DE_QUE_TX


        EXTERN  CHANADR1,CHANAD,INC_BUF,CLEAR_BIT,SET_BIT,TEST_BIT
        EXTERN  LIGHT_LED,PUSH_MSG,WRITE_COMMAND,READ_COMMAND

        SUBTTL  UART_SERVICE
        PAGE
;;;;;;;;;;;;;;;;;;;;;;;;;;;;;;;;;;;;;;;;;;;;;;;;;;;;;;;;;;;;;;;;;;;;;;;;;;;;;;;;
;
;       TITLE:  UART_SERVICE
;
;       DESCRIPTION:    This Routine is the interrupt handler for the DC349.
;                       There are 4 parts to this interrupt handler, Rx and Tx
;                       for channels 0 thru 6, and Rx and Tx for channel 7.
```

```
;                       Channel 7 is handled seperately because it is the host
;                       channel, and extra calculations are required on
;                       incoming and outgoing data on this channel (checksum,
;                       headers, ACK/NACK,etc.)  Register bank 3 is used.
;
;       INPUT:  None
;
;       OUTPUT: Data byte is read/written from/to the appropriate channel.
;               More specific data is given in each subroutine.
;
;;;;;;;;;;;;;;;;;;;;;;;;;;;;;;;;;;;;;;;;;;;;;;;;;;;;;;;;;;;;;;;;;;;;;;;;;;;;;;;;
;
;       CHANGES:        BL2
;               9/11/86         Changed the subroutine name GET_BUF to INC_BUF.
;                               The old name was a misnomer.
;
;               9/12/86         Added the section of code for the Host port.
;
;               9/15/86         Created the subroutines QUE_BUFFER,READ_CHAR,
;                               SAVE_BUF, and GET_BUF.
;;;;;;;;;;;;;;;;;;;;;;;;;;;;;;;;;;;;;;;;;;;;;;;;;;;;;;;;;;;;;;;;;;;;;;;;;;;;;;;;

UART_SERVICE:

        SAVE_REGS       ; Save the ACC, PSW, DPTR, and P2

        MOV     PSW,#BANK_3                     ; Select register bank #3

        MOV     DPTR,#INT_SUM_REG
        MOVX    A,@DPTR                 ; Read the interrupt summary register
        RRC     A                       ; Shift the lower bit out into the carry flag
        ANL     A,#0FH                  ; Mask out everything except for the port #
        MOV     R7,A                    ; Save the channel number in R7
        RL      A                       ; Multiply it by 2 (Some pointers are 2 bytes wide)
        MOV     R6,A                    ; Save it in R6
        JNC     RX_CHAR                 ; If carry is not set, then receive a character

        LJMP    TX_CHAR                 ; Else, transmit a character

RX_CHAR:
        SETB    IN_RX                   ; Flag indicating in the receiver interrupt
        CJNE    R7,#HOST_PORT,10$       ; Was this for the host port?
        LJMP    HOST_CHAR               ; Yes, go handle it

10$:    MOV     DPTR,#DATA_SUM_REG_P    ; Addr. of the data set change summary register
        MOVX    A,@DPTR                 ; See if a device was plugged/unplugged
        ANL     A,#5EH                  ; Make sure it's only on the channels with dev. present bits
        JZ      40$                     ; No, it was a normal receive

        MOV     P2,#IO_PAGE             ; There was a change in a device state
```

```
        MOV     R1,#LOW BASE_STATUS     ; Lower address of the status register
        CALL    CHANADR1                ; Calc. address for this channel
        MOVX    A,@R1                   ; Read the status to determine if the device is connected
        JB      ACC.6,20$               ; The device was removed, clear the config bit

        CALL    SET_BIT                 ; Device is present, set the config bit
        ORL     CONFIG_BYTE,A
        SJMP    30$

20$:    CALL    CLEAR_BIT               ; Device was removed
        ANL     CONFIG_BYTE,A           ; Clear the config byte

30$:    MOV     DPTR,#DIAG_PACKET+4     ; Addr of the config byte in the diagnostic packet
        MOV     A,CONFIG_BYTE           ; Byte to place in the packet
        MOVX    @DPTR,A                 ; Store the byte

        MOV     DPTR,#DEV_CHNG_PACKET+2 ; Addr. of the config byte in the device change message
        MOVX    @DPTR,A                 ; Store the config byte

        MOV     DPTR,#DEV_CHNG_PACKET   ; Address of the buffer to send to the host
        MOV     A,#CMD_PORT             ; Store it in the Rx queue of the command port
        SETB    PUSH_RX_TX              ; Place in the Rx queue
        CALL    PUSH_MSG                ; Place it in the queue

        MOV     DPTR,#DATA_SUM_REG_W    ; Write addr. of the data set change summary  reg.
        CALL    SET_BIT                 ; Set the corresponding bit for the current channel in the ACC
        MOVX    @DPTR,A                 ; To clear it in the data summary reg.
        LJMP    UART_RET

40$:    MOV     A,RX_IN_PROCESS         ; Get the receiving flags for the channes
        LCALL   TEST_BIT                ; Are we in the middle of receiving a packet?
        JC      RX_CONTINUE             ; Yes, continue with the current packet.
                                        ; No, this is the start of a new packet.

        CALL    QUE_BUFFER              ; Put the beginning address of the buffer
                                        ; into the rear of the queue, and in the DPTR
        JNC     50$                     ; Queue was not full, continue
                                        ; The queue was full, DPTR= beginning addr of last msg.
        CALL    HANDLE_OVRFLOW          ; Turn off the receiver, set up the overflow msg.
        SJMP    UART_RET                ; Return from the interrupt

50$:    LCALL   SET_BIT
        ORL     RX_IN_PROCESS,A         ; Set the flag to indicate we are receiving on this channel

        MOV     A,R7                    ; Get the port number
        MOVX    @DPTR,A                 ; And store it in the buffer as the header
        CALL    INC_BUF                 ; Point to the next byte in the buffer
        MOV     A,#1
        MOVX    @DPTR,A                 ; Init the size counter to 1
        CALL    INC_BUF                 ; Point to the next byte in the buffer
```

```
        CALL    READ_CHAR               ; Read the character from the DC349

        MOVX    @DPTR,A                 ; Save the byte in the buffer
        CALL    INC_BUF                 ; Point to the next buffer

END_RX:
        CALL    SAVE_BUF                ; Save the current buffer address

        CALL    INIT_CTR                ; Init the timer value for this channel
        CJNE    R7,#SPARE_PORT,10$      ; If the channel is the spare port,
        CALL    END_MSG                 ; Then end the message buffer (spare port has single byte packets)

10$:    SJMP    UART_RET                ; Return

RX_CONTINUE:
        CALL    GET_BUF                 ; Get the current buffer location
        CALL    READ_CHAR               ; Read the character
        MOVX    @DPTR,A                 ; Save the character in the buffer
        CALL    INC_BUF                 ; Point to the next free buffer location
        CALL    SAVE_BUF                ; Save the current buffer location

        CALL    FRONT_BUFFER            ; Get the address of the front of the current buffer
        CALL    INC_BUF                 ; Increment the DTPR to point to the size byte
        MOVX    A,@DPTR                 ; Read the size byte
        INC     A                       ; Increment the size byte
        MOVX    @DPTR,A                 ; Store it back in the buffer
        CJNE    A,#MAX_DATA_PACK,10$    ; If SIZE=Maximum,
        CALL    END_MSG                 ; THEN end the message buffer
        SJMP    UART_RET

10$:    LCALL   INIT_CTR                ; ELSE init the timer variable for this channel

UART_RET:
        CLR     IN_RX                   ; Not in receiver int. anymore (or any int for that fact)
        RESTORE_REGS                    ; Restore P2, DPTR, PSW, and the ACC
        RETI


        PAGE
HOST_CHAR:
        JB      RX_7,HOST_CONTINUE      ; Already receiving a packet, continue

        JNB     NO_HOST,5$              ; If the host did not previously go away,go read the char
        CLR     NO_HOST                 ; The host is back now, indicate the host is here
        MOV     A,#ZERO                 ; Clear out the no host error in the LEDs
        CALL    LIGHT_LED               ; Send it to the LEDs

5$:     CALL    READ_CHAR               ; Read the character from the port
        JNB     READ_ERROR,10$          ; No error, continue
                                        ; ERROR
        SETB    SEND_NACK               ; Set the flag to send a nack to the host
```

```
        SJMP    UART_RET                ; Return

10$:    CJNE    A,#SOH,20$              ; Was the byte read SOH? No continue
        CALL    QUE_BUFFER              ; Get a buffer
        JNC     15$                     ; No problem
        CALL    HANDLE_OVRFLOW          ; Overflow, turn off the receiver, put in the que an overflow msg.
        SJMP    UART_RET

15$:    MOV     RX_CHECKSUM,#SOH        ; Yes, init the checksum to 1
        SETB    RX_7                    ; Set the flag for receiving on host channel
        CALL    INIT_CTR                ; Init the timer for this channel
        CALL    SAVE_BUF                ; Save the buffer address
        SJMP    UART_RET                ; Return

20$:    CJNE    A,#ACK,30$              ; Was the byte read an ACK? No continue
        JNB     WAIT_ACK_NACK,UART_RET  ; Yes, are we waiting for an ACK? No, return
        CLR     WAIT_ACK_NACK           ; Yes, clear the wait indicator
        CLR     SYS_STARTUP             ; Clear the system startup flag
        MOV     NACK_COUNT,#ZERO        ; Clear out the number of NACK's we rcvd
        CALL    BUMP_FRONT_TX           ; Remove the msg just sent from the queue
        CLR     TX_7                    ; Clear the flag to enable transmitting to the host
        SJMP    UART_RET                ; Return

30$:    CJNE    A,#NACK,40$             ; Was the byte read a NACK? No ERROR
        JB      WAIT_ACK_NACK,32$       ; Yes, are we waiting for an ACK/NACK? Yes,
        JNB     TX_7,UART_RET           ; No, Are we currently transmitting? No, return
        CALL    END_SEND                ; Yes, end the current message that we are sending

32$:    CLR     SYS_STARTUP             ; Clear the system startup flag
        CLR     WAIT_ACK_NACK           ; Clear the wait indicator
        INC     NACK_COUNT              ; Increment the number of times we got a NACK
        MOV     A,NACK_COUNT
        CJNE    A,#MAX_NACK +1,35$      ; Have we exceeded the max # of NACK's? No
        CALL    BUMP_FRONT_TX           ; Yes, get rid of the last msg transmitted
        MOV     NACK_COUNT,#ZERO        ; Clear out the number of NACK's we rcvd
35$:    CLR     TX_7                    ; Clear the flag to enable transmitting to the host
        SJMP    UART_RET                ; Return

40$:    SETB    SEND_NACK               ; Unknown byte was sent, send a NACK to the host
        SJMP    UART_RET

HOST_CONTINUE:                          ; In the middle of a message
        JB      CHANNEL_RCVD,10$        ; If the channel number was not received
        SETB    CHANNEL_RCVD            ; THEN set the flag to indicate it was
        CALL    GET_BUF                 ; Get the addr of the buffer in the DPTR
        CALL    READ_CHAR               ; Read the destination channel
        JB      READ_ERROR,25$          ; If there was an error, set the flag to send a NACK

        MOVX    @DPTR,A                 ; Otherwise, save the channel number in the buffer
        CALL    INC_BUF                 ; Increment the Buffer pointer to the next location
```

```
        SJMP    CALC_C                  ; Calc. the checksum, and save the current buffer addr.

10$:    JB      SIZE_RCVD,20$           ; ELSE IF the size byte was not received
        SETB    SIZE_RCVD               ; THEN set the flag to indicate it was
        CALL    GET_BUF                 ; Get the current buffer addr. in the DPTR

        CALL    READ_CHAR               ; Read the size byte
        JB      READ_ERROR,25$          ; If there was an error, set the flag to send a NACK

        MOVX    @DPTR,A                 ; Save the size byte
        CALL    INC_BUF                 ; Increment the buffer pointer
        MOV     HOST_SIZE,A             ; Save the size byte
        SJMP    CALC_C                  ; Calculate the checksum and save the current buffer addr.
20$:    MOV     A,#ZERO
        CJNE    A,HOST_SIZE,30$         ; If the size is zero
        CALL    READ_CHAR               ; THEN read the checksum byte
        JB      READ_ERROR,25$          ; If there was an error, set the flag to send a NACK

        CLR     C                       ; Make sure the carry is clear
        SUBB    A,RX_CHECKSUM           ; Subtract the calculated checksum
        JNZ     25$                     ; Error - send a NACK
        SETB    SEND_ACK                ; No error, set the bit to send an ACK

        CALL    END_MSG                 ; End the message buffer

        LJMP    UART_RET                ; Return
25$:    SETB    SEND_NACK               ; Set the bit to send a NACK
        CLR     RX_7                    ; Clear the receive in process flag
        CLR     CHANNEL_RCVD            ; Clear the flag to indicate the channel number was received
        CLR     SIZE_RCVD               ; Clear the flag to indicate the size byte was receivd
        LJMP    UART_RET                ; Return

30$:    MOV     A,HOST_SIZE             ; Get the size byte
        DEC     A                       ; And Subtract one
        MOV     HOST_SIZE,A             ; Save it

        CALL    GET_BUF                 ; Get the buffer address of where to store it

        CALL    READ_CHAR               ; Read the character
        JB      READ_ERROR,25$          ; If there was an error, set the flag to send a NACK

        MOVX    @DPTR,A                 ; Store the byte
        CALL    INC_BUF                 ; Increment the buffer pointer
CALC_C:
        ADD     A,RX_CHECKSUM           ; Add the byte to the running checksum
        ADDC    A,#ZERO                 ; Add in the carry flag
        MOV     RX_CHECKSUM,A           ; Save the running checksum byte
        CALL    INIT_CTR                ; Init the timer for this channel
        CALL    SAVE_BUF                ; Save the current buffer address
        LJMP    UART_RET
```

```
        PAGE
;;;;;;;;;;;;;;;;;;;;;;;;;;;;;;;;;;;;;;;;;;;;;;;;;;;;;;;;;;;;;;;;;;;;;;;;;;;;;;;
;
;       DESCRIPTION:    This section of code handles the transmition to the
;                       peripherals and the host.  This code also handles
;                       sending an ACK/NACK to the host in response to a
;                       message.
;
;       INPUT:  R7 - Channel number.
;
;       OUTPUT: Byte sent to the appropriate device.
;
;;;;;;;;;;;;;;;;;;;;;;;;;;;;;;;;;;;;;;;;;;;;;;;;;;;;;;;;;;;;;;;;;;;;;;;;;;;;;;;

TX_CHAN:
        CJNE    R7,#HOST_PORT,10$       ; Transmit to a peripheral (port 0-6)
        LJMP    TX_HOST                 ; Transmit for the host (port 7)

10$:    MOV     A,TX_IN_PROCESS         ; Get the transmitting flags for the channes
        LCALL   TEST_BIT                ; Are we in the middle of transmitting a packet?
        JC      40$                     ; Yes, continue with the current packet.
                                        ; No, this is the start of a new packet.
        MOV     A,#FRONT_TX_QUE_PTR
        ADD     A,R7                    ; Get the pointer for the front of the queue
        MOV     R1,A                    ; Use R1 as the pointer
        MOV     A,#REAR_TX_QUE_PTR      ; Get the pointer for the rear of the queue
        ADD     A,R7
        MOV     R0,A                    ; Use R0 as the pointer
        MOV     A,@R1
        XRL     A,@R0                   ; Compare to make sure there actually is something in the queue
        JNZ     12$                     ; There is, continue
        CALL    TX_OFF                  ; There isn't, turn this transmitter off!
        LJMP    UART_RET

12$:    LCALL   SET_BIT                 ; Set the bit for the channel to indicate transmitting a packet
        ORL     TX_IN_PROCESS,A         ; Restore the flags for transmitting a packet

        LCALL   DE_QUE_TX               ; Get the addr of the buffer to send into TX_BUFFERS and the DPTR

; The DPTR now has the address of the first byte in the buffer (which is the TX size)

        MOVX    A,@DPTR                 ; Get the size of the buffer to transmit
        MOV     TX_SIZE,A               ; This is the local storage for the size

        LCALL   INC_BUF                 ; Point to the first byte in the buffer

15$:    CJNE    A,#ZERO,20$             ; Was the size count zero?
                                        ; Yes, there were no bytes to send, reset all the pointers
        LCALL   END_SEND                ; End of this buffer, reset to the init case
        LJMP    UART_RET                ; RETURN
```

```
20$:                                    ; The byte count was not zero
        LCALL   SEND_BYTE               ; Send the byte to the port

        DJNZ    TX_SIZE,30$             ; Decrement the size and jump if it's not zero
        LCALL   END_SEND                ; End of the buffer, re-adjust the pointers
        LJMP    UART_RET                ; Return

30$:    LCALL   SAVE_TX_SIZE            ; Save the size of the buffer to transmit

        LCALL   INC_BUF                 ; Point to the next location to send
        LCALL   SAVE_BUF                ; Save it away for the next time in
        LJMP    UART_RET                ; Return

40$:    LCALL   GET_BUF                 ; Get the addr of the next byte to send
        LCALL   GET_TX_SIZE             ; Get the number of bytes left to send
        SJMP    15$                     ; Check the size and send the byte


TX_HOST:
        MOV     DPTR,#TEMP_SEND         ; Init the DPTR to the location for sending
                                        ; single bytes (ie. ACK, NACK, SOH)
        JB      TX_7,TX_HOST_CONT       ; We've already sent out SOH (in the middle of a packet)

        JNB     SEND_ACK,10$            ; Don't need to send an "ACK"
        MOV     A,#ACK                  ; Set up to send an ACK
        CLR     SEND_ACK                ; Clear the flag
        CALL    TX_OFF                  ; Turn off the transmitter
        SJMP    30$                     ; Send it
10$:    JNB     SEND_NACK,20$           ; Don't need to send a "NACK", go send the msg.
        MOV     A,#NACK                 ; Set up to send an NACK
        CLR     SEND_NACK               ; Clear the flag
        CALL    TX_OFF                  ; Turn off the transmitter
        SJMP    30$                     ; Send it

20$:                            ; Make sure something is in the queue first!!
        MOV     A,#FRONT_TX_QUE_PTR
        ADD     A,R7                    ; Get the pointer for the front of the queue
        MOV     R1,A                    ; Use R1 as the pointer
        MOV     A,#REAR_TX_QUE_PTR      ; Get the pointer for the rear of the queue
        ADD     A,R7
        MOV     R0,A                    ; Use R0 as the pointer
        MOV     A,@R1
        XRL     A,@R0                   ; Compare to make sure there actually is something in the queue
        JNZ     25$                     ; There is, continue
        CALL    TX_OFF                  ; There isn't, turn this transmitter off!
        LJMP    UART_RET

25$:    SETB    TX_7                    ; 1st time in (Send the msg, not ACK/NACK)
        MOV     A,#SOH
        MOV     TX_CHECKSUM,#SOH        ; Init the checksum to 1
```

```
30$:    MOVX    @DPTR,A                 ; Store the byte to send to the host
        LCALL   SEND_BYTE               ; Send it

        CALL    INIT_KA                 ; Init the keep alive timer
        LJMP    UART_RET                ; Return

TX_HOST_CONT:                           ; A msg packet has already been started, continue
        JB      CHANNEL_SENT,10$        ; Has the channel # been sent already?
        LCALL   DF_QUE_TX               ; No, get the buffer addr. to send in the DPTR and TX_BUFFERS
        LCALL   SEND_BYTE               ; Send the channel number
        ADD     A,TX_CHECKSUM           ; Add in the channel # to the checksum
        ADDC    A,#ZERO                 ; Add in the carry
        MOV     TX_CHECKSUM,A           ; and save it
        SETB    CHANNEL_SENT            ; Set the flag for channel sent
        SJMP    END_TX_HOST_CONT        ; Return - Save the buffer first

10$:    JB      SIZE_SENT,20$           ; Size of the msg been sent out yet?
        SETB    SIZE_SENT               ; Set the flag to indicate the size was sent
        LCALL   GET_BUF                 ; Get the buffer addr in DPTR
        LCALL   SEND_BYTE               ; Send the size byte to the host
        MOV     TX_SIZE,A               ; Put the size byte in local storage
        ADD     A,TX_CHECKSUM           ; Add in the size to the checksum
        ADDC    A,#ZERO                 ; Add in the carry flag
        MOV     TX_CHECKSUM,A           ; and save it
        LCALL   SAVE_TX_SIZE            ; Save the size in a global location
        SJMP    END_TX_HOST_CONT        ; Clean up before exiting

20$:    LCALL   GET_TX_SIZE             ; Size has been sent, get the size in local mem
        CJNE    A,#ZERO,30$             ; Any more msg bytes to send?
        MOV     A,TX_CHECKSUM           ; No, just the checksum
        MOVX    @DPTR,A                 ; Save the checksum
        LCALL   SEND_BYTE               ; Send the checksum to the host
        LCALL   END_SEND                ; Turn off the transmitter, etc.
        CALL    INIT_KA                 ; Init the keep alive timer
        LJMP    UART_RET                ; Return

30$:    LCALL   GET_BUF                 ; Get the buffer addr in DPTR
        LCALL   SEND_BYTE               ; Size was not zero, sent the msg byte
        ADD     A,TX_CHECKSUM           ; Add it into the checksum
        ADDC    A,#ZERO                 ; Add in the carry flag
        MOV     TX_CHECKSUM,A           ; and save it
        DEC     TX_SIZE                 ; Decrement the size count by one
        CALL    SAVE_TX_SIZE            ; Save the size in the table

END_TX_HOST_CONT:
        LCALL   INC_BUF                 ; Point to the next location in the msg buffer
        LCALL   SAVE_BUF                ; Save the buffer address
        LJMP    UART_RET

        SUBTTL  DF_QUE_TX
```

```
        PAGE
;;;;;;;;;;;;;;;;;;;;;;;;;;;;;;;;;;;;;;;;;;;;;;;;;;;;;;;;;;;;;;;;;;;;;;;;;;;;;;;;
;
;       TITLE:  DE_QUE_TX
;
;       DESCRIPTION:    This subroutine will take the address from the front
;                       of the channels transmit queue and place it in the DPTR
;                       and in TX_BUFFERS(channel). TX_BUFFERS is used to
;                       store the next byte to send so we don't lose the
;                       beginning address of the buffer. This is done so we
;                       can retransmit the buffer if we get a NACK.
;
;       INPUT:  R7 - channel number.
;
;       OUTPUT: DPTR := Address of the start of the buffer.
;               TX_BUFFERS(channel) := Address of the start of the buffer.
;
;       REGISTERS DESTROYED:    A, R0, R1
;;;;;;;;;;;;;;;;;;;;;;;;;;;;;;;;;;;;;;;;;;;;;;;;;;;;;;;;;;;;;;;;;;;;;;;;;;;;;;;;

DE_QUE_TX:
        MOV     A,#BASE_TX_PAGE         ; Set up the que pointer page
        ADD     A,R7                    ; Offset to the appropriate que
        MOV     P2,A                    ; Set the upper address bits for the que

        MOV     A,#FRONT_TX_QUE_PTR     ; Get the address of the table of queue pointers
        ADD     A,R7                    ; Add the channel number into the ACC
        MOV     R1,A                    ; Put it into R1
        MOV     A,@R1                   ; Get the FRONT pointer for the channel queue
        ADD     A,#2                    ; Point to the next free location
        MOV     R0,A                    ; Place it in R0 to use as an indirect pointer

        MOVX    A,@R0                   ; Get the low order address of the byte to send
        MOV     DPL,A                   ; Store it in the DPL
        INC     R0                      ; Point to the high address byte
        MOVX    A,@R0                   ; Get the high order address of the byte to send
        MOV     DPH,A                   ; Store it in the DPH

        CJNE    R7,#CMD_PORT,10$        ; If the channel is not the command port, continue
        SJMP    20$                     ; Else return

10$:    MOV     P2,#TABLE_PAGE          ; Set up to store the starting addr. in TX_BUFFERS

        MOV     A,#LOW TX_BUFFERS       ; Beginning address of the buffer
        ADD     A,R6                    ; Add in the offset to the table
        MOV     R0,A                    ; Use R0 as the pointer

        MOV     A,DPL
        MOVX    @R0,A                   ; Save the low order address
        INC     R0                      ; Point to the next location
        MOV     A,DPH
```

```
        MOVX    @R0,A                   ; Save the high order address

20$:    RET

        SUBTTL  SEND_BYTE
        PAGE
;;;;;;;;;;;;;;;;;;;;;;;;;;;;;;;;;;;;;;;;;;;;;;;;;;;;;;;;;;;;;;;;;;;;;;;;;;;;;;;;
;
;       TITLE:  SEND_BYTE
;
;       DESCRIPTION:    This subroutine sends a byte pointed to by the DPTR
;                       to the appropriate channel.
;
;       INPUT:  R7 - channel number
;               DPTR - Address of the byte to send
;
;       OUTPUT: Byte is transmitted
;
;;;;;;;;;;;;;;;;;;;;;;;;;;;;;;;;;;;;;;;;;;;;;;;;;;;;;;;;;;;;;;;;;;;;;;;;;;;;;;;;

SEND_BYTE:
        MOV     P2,#IO_PAGE             ; Upper address of the DC349 page
        MOV     R1,#LOW BASE_STATUS     ; Lower address of the status register
        LCALL   CHANADR1                ; Adjust the address for this channel
WAIT:   MOVX    A,@R1                   ; Wait for the transmitter ready bit to be set
        JNB     ACC.0,WAIT              ; Read it again if it isn't set
                                        ; It's set, send the byte!!
        MOVX    A,@DPTR                 ; Get the byte to send into the accumulator
        MOV     R1,#LOW BASE_TX
        LCALL   CHANADR1                ; Get the address of the TX register for this channel
        MOVX    @R1,A                   ; Send the sucker
        RET

        SUBTTL  END_SEND
        PAGE
;;;;;;;;;;;;;;;;;;;;;;;;;;;;;;;;;;;;;;;;;;;;;;;;;;;;;;;;;;;;;;;;;;;;;;;;;;;;;;;;
;
;       TITLE:  END_SEND
;
;       DESCRIPTION:    This subroutine is used when the last byte is sent to
;                       the device.  It increments the FRONT_TX_QUE_PTR,
;                       clears the TX_IN_PROCESS flag (for the channel),
;                       and turns off the transmitter interrupt for that channel.
;
;       INPUT:  R7 - channel number
;
;       OUTPUT: FRONT_TX_QUE_PTR(CHANNEL) := FRONT_TX_QUE_PTR(CHANNEL) + 2
;               TX_IN_PROCESS (CHANNEL) := 0
;
;;;;;;;;;;;;;;;;;;;;;;;;;;;;;;;;;;;;;;;;;;;;;;;;;;;;;;;;;;;;;;;;;;;;;;;;;;;;;;;;
```

```
END_SEND:

; Turn off the interrupt for this channel before leaving
        CALL    TX_OFF

        CJNE    R7,#HOST_PORT,10$       ; Clear the following flags only if it's for channel 7
;; NOTE: The transmit in process flag will be cleared when an ACK/NACK is received or an ACK/NACK time out

        CLR     CHANNEL_SENT            ; Clear the flag for indicating the channel number was sent
        CLR     SIZE_SENT               ; Clear the flag for indicating the size of the msg was sent
        SETB    WAIT_ACK_NACK           ; Set the flag to wait for an ACK/NACK from the host
        MOV     DPTR,#ACK_NACK_TIMER    ; Address of the timer byte
        MOV     A,#ACK_NACK_COUNT       ; Time out value to wait for an ACK/NACK
        MOVX    @DPTR,A                 ; Store the timer
        SJMP    20$

10$:    CALL    BUMP_FRONT_TX           ; Bump the front pointer for channels 0 thru 6
        LCALL   CLEAR_BIT
        ANL     TX_IN_PROCESS,A         ; Clear the transmit in process flag

20$:    RET

        SUBTTL  SAVE_TX_SIZE
        PAGE
;;;;;;;;;;;;;;;;;;;;;;;;;;;;;;;;;;;;;;;;;;;;;;;;;;;;;;;;;;;;;;;;;;;;;;;;;;;;;;;;
;
;       TITLE:  SAVE_TX_SIZE
;
;       DESCRIPTION:    This subroutine will save the TX_SIZE into the table
;                       TX_SIZE_TBL offset by R7 (channel number).
;
;       INPUT:  R7 - Channel number
;               TX_SIZE - Size of the buffer to send
;
;       OUTPUT: TX_SIZE_TBL(R7) := TX_SIZE
;
;       REGISTERS DESTROYED:    A, R0
;;;;;;;;;;;;;;;;;;;;;;;;;;;;;;;;;;;;;;;;;;;;;;;;;;;;;;;;;;;;;;;;;;;;;;;;;;;;;;;;

SAVE_TX_SIZE:
        PUSH    ACC
        MOV     P2,#TABLE_PAGE
        MOV     A,#LOW TX_SIZE_TBL      ; Address of where to store the size
        ADD     A,R7                    ; Channel offset
        MOV     R0,A                    ; Use R0 as the pointer
        MOV     A,TX_SIZE
        MOVX    @R0,A                   ; Store the size
        POP     ACC
        RET
```

```
        SUBTTL  GET_TX_SIZE
        PAGE
;;;;;;;;;;;;;;;;;;;;;;;;;;;;;;;;;;;;;;;;;;;;;;;;;;;;;;;;;;;;;;;;;;;;;;;;;;;;;;;;
;
;       TITLE:  GET_TX_SIZE
;
;       DESCRIPTION:    This subroutine will fetch the size (number of msg
;                       bytes left to transmit from the table TX_SIZE_TBL
;                       offset by R7 (channel number), and place it into
        PAGE
;;;;;;;;;;;;;;;;;;;;;;;;;;;;;;;;;;;;;;;;;;;;;;;;;;;;;;;;;;;;;;;;;;;;;;;;;;;;;;
;
;       TITLE:  GET_TX_SIZE
;
;       DESCRIPTION:    This subroutine will fetch the size (number of msg
;                       bytes left to transmit from the table TX_SIZE_TBL
;                       offset by R7 (channel number), and place it into


;                       TX_SIZE.
;
;       INPUT:  R7 - Channel number
;
;       OUTPUT: TX_SIZE := TX_SIZE_TBL(R7)
;               A := TX_SIZE_TBL(R7)
;
;       REGISTERS DESTROYED:    A, R0
;;;;;;;;;;;;;;;;;;;;;;;;;;;;;;;;;;;;;;;;;;;;;;;;;;;;;;;;;;;;;;;;;;;;;;;;;;;;;;

GET_TX_SIZE:
        MOV     P2,#TABLE_PAGE
        MOV     A,#LOW TX_SIZE_TBL      ; Address of where to get the size
        ADD     A,R7                    ; Channel offset
        MOV     R0,A                    ; Use R0 as the pointer
        MOVX    A,@R0                   ; Get the size byte
        MOV     TX_SIZE,A               ; And place it in the local storage
        RET

        SUBTTL  END_MSG
        PAGE
;;;;;;;;;;;;;;;;;;;;;;;;;;;;;;;;;;;;;;;;;;;;;;;;;;;;;;;;;;;;;;;;;;;;;;;;;;;;;;
;
;       TITLE:  END_MSG
;
;       DESCRIPTION:    This subroutine will close out a msg buffer for the
;                       channel indicated in R7.  It does this by
;                       clearing the RX_IN_PROCESS flag, and bumping the
;                       rear receive queue pointer for that channel.
;
;       INPUT:  R7 = channel number.
;
;       OUTPUT: (REAR_RX_QUE_PTR) = (REAR_RX_QUE_PTR)+2
;               RX_IN_PROCESS(channel)=0
;
```

```
;       REGISTERS DESTROYED: A, R1 of bank 2
;;;;;;;;;;;;;;;;;;;;;;;;;;;;;;;;;;;;;;;;;;;;;;;;;;;;;;;;;;;;;;;;;;;;;;;;;;

END_MSG:
        MOV     A,R1
        PUSH    ACC
        MOV     A,R0
        PUSH    ACC

        MOV     A,#REAR_RX_QUE_PTR      ; Get the address of the table for the rear of the que pointers
        ADD     A,R7                    ; Point to this channels pointer REAR pointer
        MOV     R1,A
        INC     @R1                     ; End of message, bump the rear pointer by two
        INC     @R1
        CALL    CLEAR_HIT
        ANL     RX_IN_PROCESS,A         ; Clear the bit indicating that we are receiving on this channel

        MOV     P2,#TABLE_PAGE          ; Upper addr. of the table page
        MOV     A,#LOW RX_TIME_OUT      ; Lower address of the timer table
        ADD     A,R7                    ; Offset to the appropriate channels timer byte
        MOV     R0,A                    ; Use R0 as the pointer
        MOV     A,#ZERO                 ; Clear the accumulator
        MOVX    @R0,A                   ; Clear the timer value for this channel
        CJNE    R7,#HOST_PORT,10$           ; Clear the following flags only if it's for channel 7
        CLR     CHANNEL_RCVD                ; Clear the flag to indicat the channel number was received
        CLR     SIZE_RCVD                   ; Clear the flag to indicate the size of the msg was received

10$:    POP     ACC
        MOV     R0,A                        ; RESTORE R0
        POP     ACC                         ; AND R1
        MOV     R1,A
        RET

        subttl  QUE_BUFFER
        PAGE
;;;;;;;;;;;;;;;;;;;;;;;;;;;;;;;;;;;;;;;;;;;;;;;;;;;;;;;;;;;;;;;;;;;;;;;;;;
;
;       TITLE:  QUE_BUFFER
;
;       DESCRIPTION:    This subroutine will get the current buffer address
;                       for the channel, put it in the end of the receive
;                       queue, and in the DPTR.
;
;       INPUT:  R7 - Channel number
;
;       OUTPUT: DPTR - Current buffer address.
;               Queue(R7)(REAR) - Current buffer address.
;
;;;;;;;;;;;;;;;;;;;;;;;;;;;;;;;;;;;;;;;;;;;;;;;;;;;;;;;;;;;;;;;;;;;;;;;;;;

QUE_BUFFER:
        MOV     A,#BASE_RX_PAGE             ; Set up the que pointer page
        ADD     A,R7                        ; Offset to the appropriate que
```

```
        MOV     P2,A                    ; Set the upper address bits for the que

        MOV     A,#REAR_RX_QUE_PTR      ; Get the address of the table of queue pointers
        ADD     A,R7                    ; Add the channel number into the ACC
        MOV     R1,A                    ; Put it into R1

        MOV     A,#FRONT_RX_QUE_PTR     ; Get the table of front queue pointers
        ADD     A,R7                    ; Add in the channel offset
        MOV     R0,A                    ; Place it into R0 for use as an indirect pointer
        MOV     A,@R1                   ; Get the REAR pointer
        ADD     A,#NEXT_PTR             ; Point to the next location
        XRL     A,@R0                   ; And compare it to the front queue pointer
        JZ      10$                     ; The que is full, exit with an error

        MOV     A,@R1                   ; Get the REAR pointer for the channel queue
        ADD     A,#2                    ; Point to the next free location
        MOV     R0,A                    ; Place it in R0 to use as an indirect pointer

        MOV     DPTR,#RX_BUFFERS        ; Get the current buffer address for this channel
        MOV     A,R6                    ; Get the channel number * 2 as a pointer
        ADD     A,DPL                   ; Point to the appropriate buffer pointer
        MOV     DPL,A                   ; Put it back into the DPTR
        MOVX    A,@DPTR                 ; Get the low order byte of the buffer
        MOVX    @R0,A                   ; Place it in the location pointed to by the REAR of the queue
        INC     DPTR                    ; Point to the high order byte
        INC     R0                      ; Point to the high order byte of the Receive queue
        MOVX    A,@DPTR                 ; Get the high order buffer address byte
        MOVX    @R0,A                   ; Save it in the Receive queue

        MOV     DPH,A                   ; Put the buffer address into the data pointer
        DEC     R0
        MOVX    A,@R0                   ; Get the low order byte
        MOV     DPL,A                   ; And store it into the low order byte of the data pointer
        CLR     C                       ; No error
        RET

10$:    MOV     A,@R1                   ; Get the rear pointer last used
        MOV     R0,A                    ; And place it in R0

        MOVX    A,@R0                   ; Get the low order addr of the buffer last used
        MOV     DPL,A                   ; And put it in the low byte of the data pointer
        INC     R0                      ; Point to the high order byte
        MOVX    A,@R0                   ; Get it
        MOV     DPH,A                   ; Place it in the high order byte of the data pointer
        SETB    C                       ; No room left in the queue
        RET

        SUBTTL  READ_CHAR
        PAGE
;;;;;;;;;;;;;;;;;;;;;;;;;;;;;;;;;;;;;;;;;;;;;;;;;;;;;;;;;;;;;;;;;;;;;;;;;;;;;;;;;;;;;;;;;;;;;
;
```

```
;       TITLE:  READ_CHAR
;
;       DESCRIPTION:    This subroutine will read a byte from the DC349
;                       channel indicated in R7.
;
;       INPUT:  R7 - Channel number
;
;       OUTPUT: A - Byte read
;
;;;;;;;;;;;;;;;;;;;;;;;;;;;;;;;;;;;;;;;;;;;;;;;;;;;;;;;;;;;;;;;;;;;;;;;;;;;;;;;;

READ_CHAR:
        CLR     READ_ERROR              ; Clear the bit that says there was a read error
        MOV     P2,#IO_PAGE             ; Point to the DC_349
        MOV     R1,#LOW BASE_STATUS     ; Get the lower byte of the base address of the status register
        CALL    CHANADR1                ; Adjust it to the status register for this channel
        MOVX    A,@R1                   ; Read the status register
        JB      ACC.5,5$                ; Framing error, set the bit to report it to the host
        JB      ACC.4,5$                ; Overrun error
        JNB     ACC.3,10$               ; Parity error (Jump if no error)

5$:     LCALL   RX_ERROR                ; Handle the receive error

10$:    MOV     P2,#IO_PAGE             ; Set up P2 in case we went through RX_ERROR (easier than saving the port)
        MOV     R1,#LOW BASE_RX         ; Read the byte that was received, even if there was an error
        LCALL   CHANADR1
        MOVX    A,@R1
        RET

        SUBTTL  SAVE_BUF
        PAGE
;;;;;;;;;;;;;;;;;;;;;;;;;;;;;;;;;;;;;;;;;;;;;;;;;;;;;;;;;;;;;;;;;;;;;;;;;;;;;;;;
;
;       TITLE:  SAVE_BUF
;
;       DESCRIPTION:    This subroutine saves the next free location of the
;                       current channels buffer in RX_BUFFERS or TX_BUFFERS.
;
        PAGE
;;;;;;;;;;;;;;;;;;;;;;;;;;;;;;;;;;;;;;;;;;;;;;;;;;;;;;;;;;;;;;;;;;;;;;;;;;;;;;;;
;
;       TITLE:  SAVE_BUF
;
;       DESCRIPTION:    This subroutine saves the next free location of the
;                       current channels buffer in RX_BUFFERS or TX_BUFFERS.
;
```

```
;       INPUT:  R7 - Channel number
;               IN_RX - Flag to distinguish if in the receiver interrupt
;                       = 1 is receiver, = 0 is transmitter
;
;       OUTPUT: RX_BUFFERS(R6) = DPTR
;
;;;;;;;;;;;;;;;;;;;;;;;;;;;;;;;;;;;;;;;;;;;;;;;;;;;;;;;;;;;;;;;;;;;;;;;;;;;;;;;

SAVE_BUF:
        PUSH    ACC
        MOV     P2,#TABLE_PAGE          ; Page for the buffer pointers

        JNB     IN_RX,10$               ; If not in the receiver, then get the transmitter buffers
        MOV     A,#LOW RX_BUFFERS       ; Low order address for the receiver buffers
        SJMP    20$

10$:    MOV     A,#LOW TX_BUFFERS       ; Low order address for the transmitter buffers

20$:    ADD     A,R6                    ; Point to the appropriate entry in
        MOV     R1,A                    ; the table
        MOV     A,DPL
        MOVX    @R1,A                   ; Save the low order byte for the next
        MOV     A,DPH                   ; free location in the buffer
        INC     R1                      ; Point to the high byte
        MOVX    @R1,A                   ; Save the high order byte
        POP     ACC
        RET

        SUBTTL  GET_BUF
        PAGE
;;;;;;;;;;;;;;;;;;;;;;;;;;;;;;;;;;;;;;;;;;;;;;;;;;;;;;;;;;;;;;;;;;;;;;;;;;;;;;;
;
;       TITLE:  GET_BUF
;
;       DESCRIPTION:    This subroutine gets the next free location of the
;                       current channels buffer from RX_BUFFERS.
;
;       INPUT:  R6 - Channel number times two
;               IN_RX - Flag to distinguish if in the receiver interrupt
;                       = 1 is receiver, = 0 is transmitter
;
;       OUTPUT: RX_BUFFERS(R6) = DPTR
;
;;;;;;;;;;;;;;;;;;;;;;;;;;;;;;;;;;;;;;;;;;;;;;;;;;;;;;;;;;;;;;;;;;;;;;;;;;;;;;;

GET_BUF:
        PUSH    ACC
        MOV     P2,#TABLE_PAGE          ; Page for the buffer pointers

        JNB     IN_RX,10$               ; If not in the receiver, then get the transmitter buffers
        MOV     A,#LOW RX_BUFFERS       ; Low order address for the receiver buffers
        SJMP    20$

10$:    MOV     A,#LOW TX_BUFFERS       ; Low order address for the transmitter buffers

20$:    ADD     A,R6                    ; Point to the appropriate entry in
        MOV     R1,A                    ; the table
```

```
        MOVX    A,@R1                   ; Get the low order byte for the next
        MOV     DPL,A                   ; free location in the buffer
        INC     R1                          ; Point to the high byte
        MOVX    A,@R1                       ; Get the high order byte
        MOV     DPH,A
        POP     ACC
        RET

        SUBTTL  RX_ERROR
        PAGE
;;;;;;;;;;;;;;;;;;;;;;;;;;;;;;;;;;;;;;;;;;;;;;;;;;;;;;;;;;;;;;;;;;;;;;;;;;;;;;;;;;;;
;
;       TITLE:  RX_ERROR
;
;       DESCRIPTION:    This subroutine is called when an error is encountered
;                       upon reading the status register for a port.  The
;                       subroutine will clear the error in the status register
;                       of the DC349, and set the error bit in the header
;                       for that msg. if it is on port 0-6.  If the error
;                       is encountered on the host port, a flag is set
;                       to indicate an error was seen.
;
;       INPUT:  R7 - Channel number
;               P2 - Upper addr. of the DC349
;
;       OUTPUT: IF R7 <> 7 THEN HEADER or'ed 08H        (error bit is set)
;               ELSE READ_ERROR = 1                     (flag for host error)
;
;;;;;;;;;;;;;;;;;;;;;;;;;;;;;;;;;;;;;;;;;;;;;;;;;;;;;;;;;;;;;;;;;;;;;;;;;;;;;;;;;;;;

RX_ERROR:
        PUSH    DPH
        PUSH    DPL

        MOV     R1,#LOW BASE_CMD_R      ; Lower read address for the base command register
        LCALL   CHANADR1                ; Adjust it to the command register for this channel
        MOVX    A,@R1                   ; Read the command register

        ORL     A,#RERR_BIT             ; Set the reset error bit in the command register
        CALL    WRITE_COMMAND           ; Reset the errors

        MOV     R4,#50H                 ; Time delay
10$:    DJNZ    R4,10$

        MOVX    A,@R1                   ; Read the command reg. back
        ANL     A,#NOT RERR_BIT         ; Reset the "reset error" bit

        CALL    WRITE_COMMAND           ; Reset the errors

        JNB     DIAG_TEST,15$           ; If it's not diagnostics, continue
        SETB    READ_ERROR              ; Otherwise set the read_error flag
```

```
        SJMP    ERROR_END               ; And return

15$:    CJNE    R7,#HOST_PORT,20$       ; Error on the host port?
        SETB    READ_ERROR              ; Yes, set the flag.
        SJMP    ERROR_END               ; Return

20$:                                    ; Error on a peripheral port
        CALL    FRONT_BUFFER            ; Get the address of the 1st byte in the buffer

        MOVX    A,@DPTR                 ; Get the header byte
        ORL     A,#HDR_ERROR_BIT        ; Set the error bit in the header
        MOVX    @DPTR,A                 ; Store the header back in the buffer

ERROR_END:
        POP     DPL
        POP     DPH
        RET

        subttl  FRONT_BUFFER
        page
;;;;;;;;;;;;;;;;;;;;;;;;;;;;;;;;;;;;;;;;;;;;;;;;;;;;;;;;;;;;;;;;;;;;;;;;;;;;;;;
;
;       TITLE:  FRONT_BUFFER
;
;       DESCRIPTION:    This subroutine will get the address of the first
;                       byte in the current channels buffer.  This first
;                       byte is the header byte.
;
;       INPUT:  R7 - Channel number
;
;       OUTPUT: DPTR
;
;;;;;;;;;;;;;;;;;;;;;;;;;;;;;;;;;;;;;;;;;;;;;;;;;;;;;;;;;;;;;;;;;;;;;;;;;;;;;;;

FRONT_BUFFER:
        MOV     A,#BASE_RX_PAGE         ; Set up the que pointer page to get the header byte
        ADD     A,R7                    ; Offset to the appropriate que
        MOV     P2,A                    ; Set the upper address bits for the que

        MOV     A,#REAR_RX_QUE_PTR      ; Get the address of the table of queue pointers
        ADD     A,R7                    ; Add the channel number into the ACC
        MOV     R1,A                    ; Put it into R1
        MOV     A,@R1                   ; Get the READ pointer for the channel queue
        ADD     A,#2                    ; Point to the next free location
        MOV     R0,A                    ; Place it in R0 to use as an indirect pointer

        MOVX    A,@R0                   ; Get the low address of the header byte
        MOV     DPL,A                   ; Put the buffer address into the data pointer
        INC     R0
        MOVX    A,@R0                   ; Get the high order byte
        MOV     DPH,A                   ; And store it into the high order byte of the data pointer
```

```
        RET

        SUBTTL  INIT_CTR
        PAGE
;;;;;;;;;;;;;;;;;;;;;;;;;;;;;;;;;;;;;;;;;;;;;;;;;;;;;;;;;;;;;;;;;;;;;;;;;;;;;;;;
;
;       TITLE:  INIT_CTR
;
;       DESCRIPTION:    This subroutine moves the value in RX_DEF_T_O(R7)
;                       into RX_TIME_OUT(R7).  This inits the timer for the
;                       channel indicated in R7.  The value (in RX_DEF_T_O)
;                       is set up to defaults on power up, and modified by
;                       a command to change that channels baud rate.
;
;       INPUT: R7 - Channel number
;              RX_DEF_T_O - Table of time out values
;
;       OUTPUT: RX_TIME_OUT(R7) - Time out value for the channel in R7.
;
;;;;;;;;;;;;;;;;;;;;;;;;;;;;;;;;;;;;;;;;;;;;;;;;;;;;;;;;;;;;;;;;;;;;;;;;;;;;;;;;

INIT_CTR:
        MOV     P2,#TABLE_PAGE          ; Upper address of the tables
        MOV     A,#LOW RX_DEF_T_O       ; Source table
        ADD     A,R7                    ; Offset to the appropriate channel
        MOV     R1,A                    ; Use R1 as the pointer

        MOV     A,#LOW RX_TIME_OUT      ; Destination table
        ADD     A,R7                    ; Offset to the appropriate channel
        MOV     R0,A                    ; Use R0 as the pointer

        MOVX    A,@R1                   ; Get the time out value
        MOVX    @R0,A                   ; and store it in the timer table
        RET

        SUBTTL  BUMP_FRONT_TX
        PAGE
;;;;;;;;;;;;;;;;;;;;;;;;;;;;;;;;;;;;;;;;;;;;;;;;;;;;;;;;;;;;;;;;;;;;;;;;;;;;;;;;
;
;       TITLE:  BUMP_FRONT_TX
;
;       DESCRIPTION:    This subroutine is called to bump the front of the
;                       of the transmitter queue. Bumping the front of the
;                       transmitter queue gets rid of the buffer that was
;                       just transmitted.  The channel number is passed in R7.
;
;       INPUT:  R7 - Channel number
;
;       OUTPUT: FRONT_TX_QUE_PTR(R7)=FRONT_TX_QUE_PTR(R7)+2
;
;;;;;;;;;;;;;;;;;;;;;;;;;;;;;;;;;;;;;;;;;;;;;;;;;;;;;;;;;;;;;;;;;;;;;;;;;;;;;;;;
```

```
BUMP_FRONT_TX:
        MOV     A,#FRONT_TX_QUE_PTR
        ADD     A,R7                    ; Get the pointer for the front of the queue
        MOV     R1,A                    ; Use R1 as the pointer
        MOV     A,#REAR_TX_QUE_PTR      ; Get the pointer for the rear of the queue
        ADD     A,R7
        MOV     R0,A                    ; Use R0 as the pointer
        MOV     A,@R1
        XRL     A,@R0                   ; Compare to make sure there actually is something in the queue
        JZ      10$                     ; There isn't, return

        INC     @R1
        INC     @R1                     ; Bump the pointer by two
10$:    RET

        SUBTTL  TX_OFF
        PAGE
;;;;;;;;;;;;;;;;;;;;;;;;;;;;;;;;;;;;;;;;;;;;;;;;;;;;;;;;;;;;;;;;;;;;;;;;;;;;;;;;
;
;       TITLE:  TX_OFF
;
;       DESCRIPTION:    This subroutine turns off the transmitter for the
;                       channel specified in R7.
;
;       INPUTS: R7 - Channel number
;
;       OUTPUT: Transmitter interrupt (R7) is off.
;
;;;;;;;;;;;;;;;;;;;;;;;;;;;;;;;;;;;;;;;;;;;;;;;;;;;;;;;;;;;;;;;;;;;;;;;;;;;;;;;;

TX_OFF:
        PUSH    ACC
        CALL    READ_COMMAND            ; Read the command register for this channel

        ANL     A,#NOT  TXIE_BIT        ; Clear the transmitter interrupt enable bit

        CALL    WRITE_COMMAND           ; Write the command register for this channel

        CALL    READ_COMMAND
        CJNE    A,#27,10$
        NOP

10$:    POP     ACC
        RET

        SUBTTL  INIT_KA
        PAGE
;;;;;;;;;;;;;;;;;;;;;;;;;;;;;;;;;;;;;;;;;;;;;;;;;;;;;;;;;;;;;;;;;;;;;;;;;;;;;;;;
;
```

BEST AVAILABLE COPY

```
;       TITLE:  INIT_KA
;
;       DESCRIPTION:    This subroutine will reload the keep alive timer
;                       to it's full 10 second time out.
;
;       INPUT:  None
;
;       OUTPUT: KA_TIMER := KA_COUNT
;
;;;;;;;;;;;;;;;;;;;;;;;;;;;;;;;;;;;;;;;;;;;;;;;;;;;;;;;;;;;;;;;;;;;;;;;;;;;;;;

INIT_KA:
        MOV     DPTR,#KA_TIMER          ; Address of the keep alive timer
        MOV     A,#KA_COUNT             ; Reset the keepalive counter
        MOVX    @DPTR,A                 ; Whenever we send something to the host
        RET

        SUBTTL  HANDLE_OVRFLOW
        PAGE
;;;;;;;;;;;;;;;;;;;;;;;;;;;;;;;;;;;;;;;;;;;;;;;;;;;;;;;;;;;;;;;;;;;;;;;;;;;;;;
;
;       TITLE:  HANDLE_OVRFLOW
;
;       DESCRIPTION:    This routine is called after QUE_BUFFER finds a queue
;                       overflow condition.  It will turn off the receiver
;                       for that port, set the timer with the default time
;                       count to turn on the port again, and it will overwrite
;                       the last packet with a "Device Overflow Error" packet.
;
;       INPUT:  DPTR = Last entry in the queue
;               R7 = Channel number
;
;       OUTPUT: QUEUE(REAR)(R7)= Device overflow packet
;               RECEIVER IS OFF
;               Port off timer(R7) = Time out value
;
;;;;;;;;;;;;;;;;;;;;;;;;;;;;;;;;;;;;;;;;;;;;;;;;;;;;;;;;;;;;;;;;;;;;;;;;;;;;;;

HANDLE_OVRFLOW:
        MOV     A,R7                    ; Set up the header byte with the channel number
        ORL     A,#HDR_SYS_ERR          ; And the system error bit set
        MOVX    @DPTR,A                 ; Place the header in the buffer
        CALL    INC_BUF                 ; Bump the data pointer
        MOV     A,#1                    ; Size of the data in the buffer is one
        MOVX    @DPTR,A                 ; Store the size byte
        CALL    INC_BUF                 ; Bump the data pointer
        MOV     A,#QUE_OVERFLOW_ERR     ; Put the queue overflow error into the buffer
        MOVX    @DPTR,A                 ; Store the error byte
        CALL    INC_BUF                 ; Bump the data pointer
        CALL    SAVE_BUF                ; Save the next free buffer location
```

```
CALL    READ_COMMAND             ; Read the command register and
ANL     A,#NOT BIT2              ; Clear the receiver enable bit
CALL    WRITE_COMMAND            ; Turn off the receiver for this port
MOV     P2,#HIGH PORT_TIME_OUT   ; Set up the timer so it will turn the port
MOV     A,#LOW PORT_TIME_OUT     ; back on after it's time out
ADD     A,R7                     ; Offset to this channels timer
MOV     R0,A                     ; Use R0 as the indirect pointer
MOV     A,#PORT_OFF              ; Timer value
MOVX    @R0,A                    ; Set up the timer
RET

END
```

What is claimed is:

1. In a system including a host processor and a peripheral repeater having a processor and at least one connector, a method of determining which of a plurality of different types of peripherals having a peripheral type are plugged into said connector, comprising:

(a) sensing any change in the connection of a peripheral to said connector by the peripheral repeater;

(b) generating an interrupt at said peripheral repeater processor when a change is sensed;

(c) upon initial start-up of the system, each time a change from not plugged in to plugged in is detected, and in response to an interrupt, interrogating the connector by said host to obtain a result including the peripheral type if a peripheral is present; and (d) storing in a table the type of peripheral which is plugged in to allow different types of peripherals to be interchangeably coupled to said connector during system start-up and in system operation.

2. The method according to claim 1 wherein a plurality of connectors are provided for a plurality of peripherals and further including sensing said change in the connection for any of said plurality of connectors, interrogating said connectors and updating said table with said results to allow interchangeability of different types of peripherals during system operation.

3. The method according to claim 2 wherein said peripheral repeater receives inputs from said peripherals and resends them to said host processor and receives inputs from said host and resending them to said peripherals and further comprising:

(a) sending a single message to said host processor from said peripheral repeater processor indicating which peripheral connector has caused the interrupt; and (b) interrogating said connector, through said peripheral repeater, from said host processor.

4. In a system including a processor and at least one connector for providing an input to said processor, an apparatus for detecting which of a plurality of different peripherals is plugged into said connector comprising:

(a) means for detecting a current path through said connector for indicating that a peripheral is plugged into said connector, said means providing an output;

(b) said processor including means responsive to said output for sending interrogation commands to said connector; and (c) means for storing data, coupled to said processor, for storing a type of peripheral plugged into said connector wherein different types of peripherals can be interchangeably coupled to the connector during system operation.

5. Apparatus according to claim 4 wherein said output comprises an interrupt and said means for detecting including means for generating an interrupt when a change in said current path is sensed.

6. Apparatus according to claim 5 wherein said system includes a host processor and a peripheral repeater having a processor, said peripheral repeater receiving inputs through a plurality of said connectors for a plurality of peripherals and resending them to said host and receiving inputs from said host and resending them to said peripherals and further including said means for detecting which is adapted to sense said change in the current path at any of said connectors, and wherein said means for detecting includes a register for storing a number associated with the connector where a change was sensed and said means for storing includes locations for storing a peripheral type for each of said connectors and further wherein:

(a) said means for generating said interrupt is located at said peripheral repeater processor; and (b) said means for sending interrogation commands comprises said host processor.

* * * * *